United States Patent
Smith et al.

(10) Patent No.: US 7,917,391 B2
(45) Date of Patent: Mar. 29, 2011

(54) INTEGRATED MARKETING PORTAL FOR BUSINESSES

(75) Inventors: Patrick D. Smith, Washington, DC (US); Thomas D. McGarry, Silver Spring, MD (US); Brian D. Kraff, Bethesda, MD (US)

(73) Assignee: Market Hardware, Inc., Bethesda, MD (US)

( * ) Notice: Subject to any disclaimer, the term of this patent is extended or adjusted under 35 U.S.C. 154(b) by 1379 days.

(21) Appl. No.: 11/379,251

(22) Filed: Apr. 19, 2006

(65) Prior Publication Data

US 2007/0250705 A1 Oct. 25, 2007

(51) Int. Cl.
*G06Q 30/00* (2006.01)
(52) U.S. Cl. .................................... 705/14.63
(58) Field of Classification Search ............... 705/14.63
See application file for complete search history.

(56) References Cited

U.S. PATENT DOCUMENTS

| | | | |
|---|---|---|---|
| 7,031,875 B2 * | 4/2006 | Ellenby et al. | 702/150 |
| 7,113,150 B2 * | 9/2006 | Thomason | 345/6 |
| 2002/0042819 A1 * | 4/2002 | Reichert et al. | 709/217 |
| 2002/0065739 A1 * | 5/2002 | Florance et al. | 705/26 |
| 2002/0077118 A1 * | 6/2002 | Zellner et al. | 455/456 |

OTHER PUBLICATIONS

Bowers Barbara, "Point, click, claim", Bests Review, Nov. 2000.*
Shugan, Steven, "The impact of advancing technology on marketing and academic research", Marketing Science, Fall 2004.*

* cited by examiner

*Primary Examiner* — Mark Fadok
(74) *Attorney, Agent, or Firm* — Miles & Stockbridge P.C.; Mark A. Catan

(57) ABSTRACT

A method for creating solicitations based on geolocalization and observation. At remote terminal, a need is identified and a solicitation based on that need is created at a server based on commands sent over a network, such as a wireless network. In an example embodiment, a roofing company worker passing through a residential area spots a roof in need of work and based on the location of the spotter, transmits a command to a server to generate a mailing (e.g., email or regular mail) to the address responsively to the GPS data and other data.

8 Claims, 50 Drawing Sheets

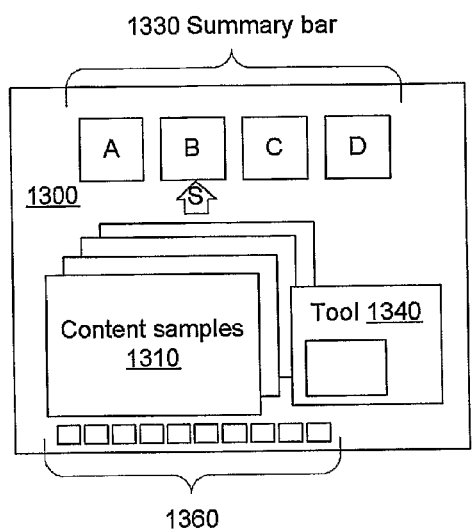
Fig. 29A
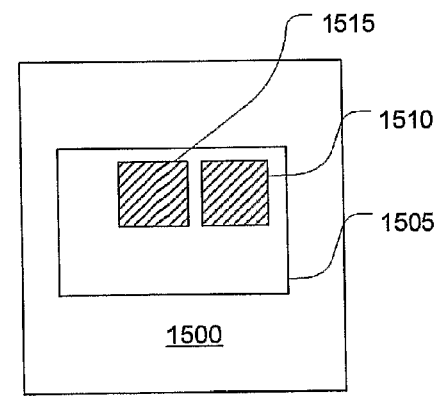
Fig. 29B
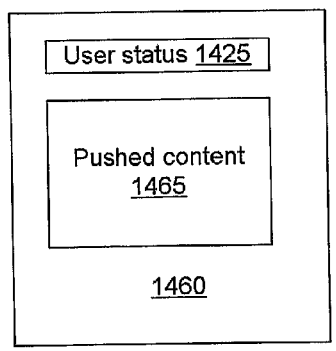
Fig. 30
Fig. 31

INTEGRATED MARKETING PORTAL FOR BUSINESSES

BACKGROUND

Some of the most valuable of a business's intangible assets fall within the domain of "marketing:" relationships with reliable materiel and service providers, customer data, trademarks, marketing materials, internal and external business procedures and systems, and other kinds of know-how. Unpacking these categories, one finds myriad different issues, ranging from a distinct logo design and other trade and service marks to knowledge of the most useful customer data and demographic trends. Each individual company generally develops such intangible assets through a mix of borrowing from known models and researching and developing its own home-grown solutions. The purpose of the present invention is to provide a tool to help with both kinds of development, particularly in the initial stages when a new company is simply overwhelmed by the number of tasks to be completed and the paucity of skilled staff available to address them.

The business world is full of companies who sell assistance of one form or another to help start-ups build and implement a marketing system. The ones that leverage Internet technology effectively, generally have a narrow (vertical) product-oriented focus that requires the user to employ many such services to fulfill all of his/her requirements. Examples of these are:

A database service provider may offer online tools for customer relationship development and management, tasks lists. Generally, these consist of blank boxes that provide none of the intelligence or content required to make them useful; for example, customer and prospect lists.

A printing service may provide templates for brochures, stationery, and promotional items and even artwork, fonts, and such. A printer may offer tools to allow a business customer to design right on an Internet browser, selecting clip art, adding text content, and uploading images to be printed. But the services offer little help in creating content of selecting a "look" because the intelligence is limited to template groupings, such as layouts by industry.

An interactive image display system may display printed publications and provide a user interface to create and modify them. The system may provide batch printing and may be implemented through an interactive web site allowing users to design and order printed materials such as business cards, wedding invitations, and bar mitzvah invitations. U.S. Pat. No. 6,529,214, filed May 14, 1999.

Retailers may provide cross-selling pages. For example, when a user buys a product, information about that user, such as what s/he searched for, decided to buy, bought previously, etc. may be used with collaborative filtering to make recommendations for future purchases. In a sense, the software stands in the shoes of a salesperson who garners knowledge from different sources to sell to a consumer. Such a technique may displace the need for some kinds of know-how.

A graphic art company may do design work through an Internet portal by obtaining a profile generated by a customer and then having graphic artists do design work behind the scenes. This is basically the same service a store-front might provide, except that the Internet is used to keep prices low. Profiling may take account of: the company name, preferred symbols, slogans, colors, an abstract by the customer explaining what the company and anything that makes it unique and examples of graphics liked and disliked by the customer.

An online service may filter their sales lead data according to preferences defined by their customers and sell the resulting lists to the customer for a per-record fee. Generally the more tailored the list, the more expensive. Such services may also provide facilities for direct e-mail marketing. Criteria may include geographic location, industry, size, special data, and target job title, for example.

Email marketing services including facilities for updating and maintaining the integrity of opt-in email lists. Clients can host their own lists on a service's server and the server will automate the processes of mailing and maintenance of the list.

Web site integration: Some web ISPs have integrated their services to provide more comprehensive value added services including design of the site, prepackaged promotion templates (based on web advertising and email), labor-intensive content creation such as Flash® media, promotion in search engines, email marketing along with traditional hosting services. Web-Based Sales Lead and Marketing Programs (i.e. promotions and sweepstakes)

Application development tools for creating business model applications that rely on heavily on network and Internet services may exploit templates that carry some degree of "business intelligence" in the degree of differentiation among the templates.

Business documents may be purchased from a vendor with an online library organized by different categories of businesses. For example, the library may contain basic business plans, employee handbooks, mission statements, documentation, procedure manuals, MIS tools, etc. These need to be modified by the purchaser to fit them to the specifics of the client's business.

Web hosting services often provide facilities for the creation and maintenance of mailing lists and for the use of them to send newsletters. But these services do not include services related to content creation. Many web hosting services also provide customizable web site templates.

In another prior art area, computer systems are used to support collaborating parties using network-linked computer terminals. For example, the parties may be a salesperson and a sales prospect, where the system allows the parties to present the optional features of, and discuss, an article for purchase.

Many prior art software systems have been proposed to support collaboration between parties. In fact a term of art, "collaborationware" has been coined to identify this class of software. One class of collaborationware helps businesspersons and/or technical personnel work together on sets of information. These sets of information range from complex legal contracts to the design of a jet. Such systems are generally shells that support the sharing of all sorts of desired information. For example, application files such as spreadsheets and documents can be modified and revisions of these saved for analysis.

A common feature of such systems is support for live interaction. Features such as chat "environments" and whiteboards allow participants who are geographically separate to interact and share information. The present invention falls into this genre, but is tailored for a specific purpose, which is to facilitate the sale of something where the parties include a sales prospect (or repeat customer) and a salesperson. A brief review of related art follows.

U.S. Pat. No. 5,944,791 describes a system with a pilot computer terminal and a passenger computer terminal. The pilot computer controls the downloading of web pages to the passenger terminals. The system allows the content to be "sanitized" in the process. Content comes from various web pages. The facility does not include any particular content other than that to support the process of piloting (and passengering).

U.S. Pat. No. 5,951,652 describes a method of synchronizing data from web pages between terminals.

U.S. Pat. No. 5,995,951 describes a system to allow networked users to collaborate in decision making. Members share proposals and comment on them and the system keeps track of the proposals, responsive comments, and revisions to the proposals, and shares them among the group.

U.S. Pat. No. 6,144,991 describes a system that defines a guide and a client who interact on a real-time basis over the Internet. The guide has a special browser that displays locally and remotely displayable frames. The client has a standard browser. The remotely displayable frames are shown on both terminals synchronously. The guide selects available Web data, for example when a client requests it by transmitting a request (e.g., by a chat window) and the guide loads the requested data into the conventional browser. The client and guide can share a pointer and whiteboard. In addition, the guide and client can interact with a shared pointer and a shared whiteboard. Moreover, the guide can record the live session for later playback by other clients. Also, a plurality of clients may be simultaneously interacting with the guide and each other.

The patent describes a sales and marketing environment where a user can get personal assistance in finding information on a Web site. A real-time, interactive session is constructed that allows the client to ask questions (with a chat window) and the salesperson shows the client web content. The salesperson and user can share collaborationware tools and facilitate the user making a purchase.

A network-based design system is disclosed in U.S. Pat. No. 6,247,011 entitled "Computerized Prepress". The patent describes a document authoring tool that is downloaded from a server to a client browser. The design created in the client is uploaded to the server where it is processed by a translation program into a prepress printing file format.

Another system is disclosed in co-pending and co-owned U.S. Pat. No. 6,650,433 entitled "Managing Print Jobs". The system discloses an editor for creating and editing designs in the client browser. The system provides access to a number of pre-configured templates that can be customized.

US Pat. Publication No. 2004/0085330 describes a network-based design tool with graphical components of a face, arranged in tab-accessible groups, that may be assembled to create caricatures. A client browser can use the interface in a client-server configuration and the result can be printed at the server side.

Other client-server applications that allow graphical designs, such as business cards, to be created, using a thin-client editor, and ordered from a printer associated with the server are described in U.S. Pat. No. 6,631,375, US Pat. Publication No. 2004/0190011, and US Pat. Publication No. 2004/0000246. In these documents, batches of product based on the design can be ordered immediately upon completion of the design from the same entity—printer—hosting the server and making the design software available.

U.S. Pat. No. 6,240,444 describes a system in which multiple terminals share view the same web content synchronously using browsers. Messages are also shared.

U.S. Pat. No. 6,263,365 describes a system with a pilot terminal which controls the browser of one or more passenger terminals. The pilot and passenger terminals use a piece of software in addition to a browser, such as an applet. The pilot terminal initiates the loading of web content on the pilot and passenger terminals. This may facilitate discussion of the same content during a conference call. The pilot transmits a URL to a control site, which retrieves the web content. The control site may remove or modify the content ("sanitize") and cause the passenger terminal's control software to download the resulting content. Links in the content sent by the control site to the pilot are modified to cause them to invoke further content through the control site so the filtering process keeps repeating.

U.S. Pat. No. 6,295,551 describes a call center system that allows a representative and a user to jointly browse Web content while conversing in real time. A user may initiate the session by accessing a web page associated with the call center. A call center server downloads a user applet to the user's computer. An applet on the user's computer communicates state information the browser display the server. A service applet creates a service view that includes the user view and a control for the representation of the user view. A representative may alter the user view by operating web controls. The service applet communicates the state changes to the server and the user's applet polls the server to update the user view correspondingly. The user applet also conveys state information to the representative computer's so it can show the user's view appropriately. Multiple users and multiple representatives may conduct a single conference in this way.

U.S. Pat. No. 6,345,239 describes a system for demonstrating business capabilities. Data is organized in a demonstration format and transmitted over the network in that format to other sites. The system supports real time information sharing and various embodiments are described.

U.S. Pat. No. 6,611,822 describes a goal based learning system that employs an expert system to distribute rule-based educational content. The system generates a simulated environment through a collaborative training session over a network. The system allows application sharing, whiteboarding, media sharing, newsgroup information sharing, chatroom initiation and discussion group initiation.

U.S. Pat. No. 6,668,273 describes a collaborative web browsing session system that allows a presenter to direct audio and visual components of a browser on other computers. An attendee logs into a control site computer and relinquishes web browser control to the presenter. The session created by the presenter is witnessed by the attendee. The presentation includes a predetermined set of web pages and slides. A region of the presenter's display may be added to the content viewed by the attendee. To do this, the presenter captures the part of the screen ("screen grab") and transmits it to the attendee. The content is transmitted via a control site, not directly,

BRIEF DESCRIPTION OF THE DRAWINGS

FIGS. 23A-23K are state diagram pairs showing the states of the user interface and object after execution of various respective commands.

FIGS. 29A and 29B are figurative illustrations of leader and follower screens according to one of the inventive embodiments.

FIG. 30A illustrates a tool for iteratively generating a list search results and pushing them to a user according to one of the inventive embodiments.

FIG. 30B illustrates a sample control flow based on FIG. 5A.

FIG. 31 illustrates a portion of a leader screen according to one of the inventive embodiments showing content displayed to the follower and an indicator showing the status of the follower's screen.

DESCRIPTION OF THE INVENTION

Figure 1:
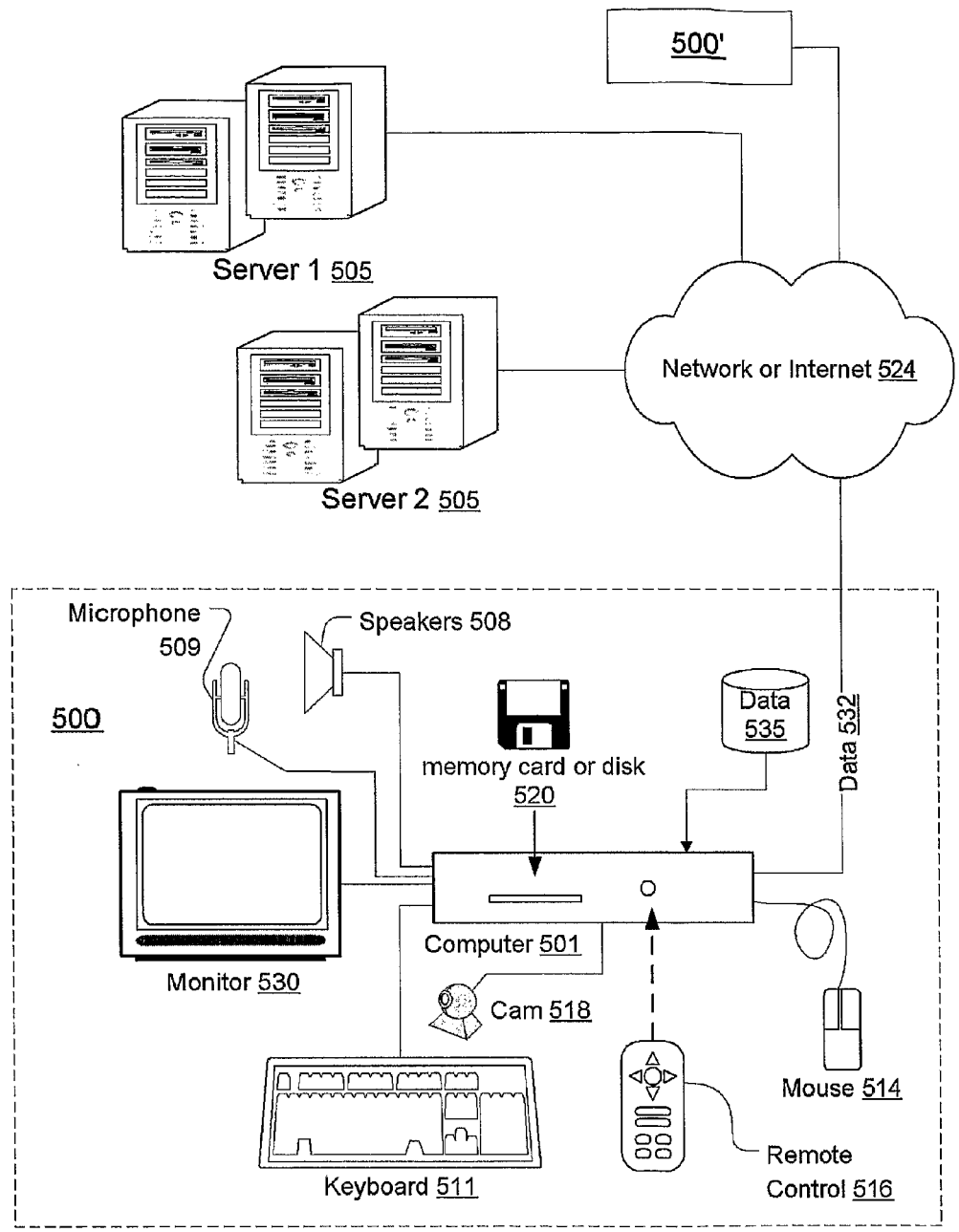
FIG. 1 illustrates various features of an operating environment for embodiments of the invention.

Referring to FIG. 1, the invention will be described as implemented on a computer system 500, preferably a system connected to a network or Internet. Hardware elements of such systems are well-known. A computer 501 displays data via a display 530. The computer 501 may be equipped to receive and send data over a data link 532 including programs such as plug-ins and virtual machine software as well as all types of textual and media content. The computer 501 may be a "thin client," i.e., one where most of the processing is done outside the computer or the computer may do all or most of the processing. The data link 532 could be a broadband connection, a telephone line or some other connection. Alternatively, no connection may be provided and the computer 501 may be operable as a standalone system. The computer 501 may have a mass storage device 535, for example a hard disk, to store data, program applications, and other information including information encoding the preferences of one or more users. Information may be stored and input and output via removable media such as a memory card or disk 520. The network or Internet fabric 524 may provide connection to one or more servers 505 or a remote dedicated computer 500' such as computer 501 for bilateral or multilateral data sharing such as in a peer to peer network. One or more of various types of input and output devices may be used such as a speaker 508, keyboard 511, a remote control 516, a mouse 514, a video camera 518, the display 530, and a microphone 509.

Figure 2A:
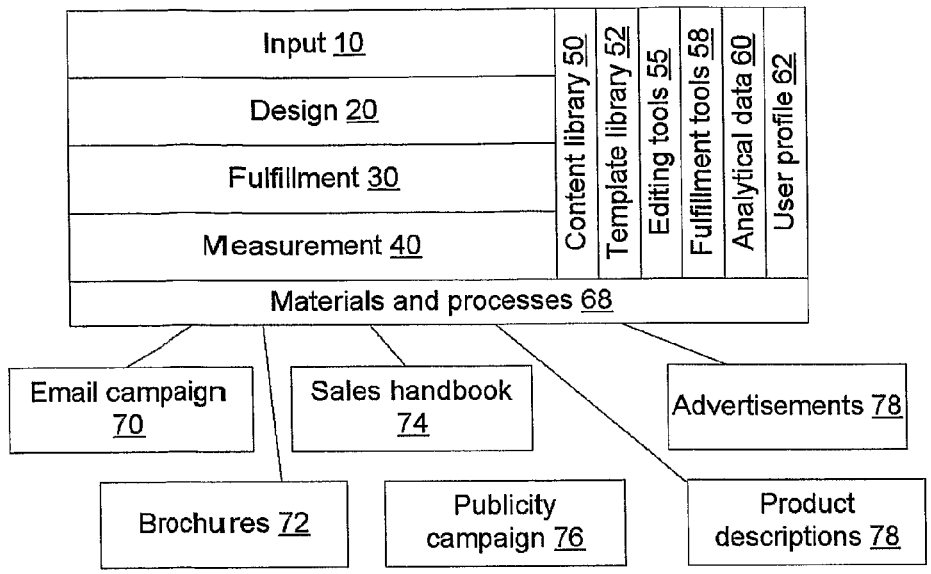
FIG. 2A illustrates, in overview fashion, process and content elements compatible with embodiments of the invention.

Referring to FIG. 2A, a marketing system provides for several stages 10-40 of processes to assist a business user with a wide range of needs. An example application is illustrated in FIG. 2A for the creation, use, and evaluation marketing materials and the programs that employ them. A user's company would access one or more applications on a stand-alone computer, a network, or Internet server which supports various processes which are shown by category in FIG. 2A. These processes 10-40 permit a user to create, implement, and monitor the performance of materials and programs that use those materials (Materials and processes 68). Examples of such outputs are: an email campaign 70, brochures 72, sales handbook 74, publicity campaign 76, advertisements 78, product descriptions 79.

For example, they may permit a user to upload images (Input 10) and use them as source material to design a logo (Design 20), design a hypertext markup language (html) email letter using the logo (Design 20), set up and deploy an email marketing campaign (Fulfillment 30), and monitor its performance (Measurement 40). The categories 10-40 indicate sets of interactive processes, essentially a toolbox, to allow a user to perform these various tasks.

In addition to tools, various data and software may be provided such as a content library 50. Examples of the latter include source material that can be edited and integrated into various creations made by the user or for the user or off the shelf items including, but not limited to graphical objects, text objects, fonts, software tools, data sets such customer lists or demographic data, etc. A couple of specific examples include an image library of decorative shapes and symbols and a text library of vignettes describing various common problems the user's customers may. encounter. Examples of text content include descriptions of problems such as deciding what to make for dinner, the problems of communicating with the home office when on the road, and adapting to complicated technology. Such vignettes could be integrated into and modified into web pages or brochures that discuss the unique solutions of a user's company's offerings.

A template library 52 may provide document templates for making a newsletter or process templates for implementing a distribution program including online registration, web advertising, mailing, etc. Examples of such templates include page layouts, customizable software tools, print layouts for printable documents, database templates for storing information such as customer or lead data. Editing tools 55 may be provided for modifying materials from the content library 50 or input by the user. Fulfillment tools 58 or processes may be provided to make use of the results of the design processes, such as by providing an email newsletter distribution tool. Finally, analytical data 60, such as customer data, demographic data, mailing lists, etc. may be provided to support the various processes. Profile data 62 may be derived from direct input by the user or passively derived from user interaction and employed to define the specific requirements, preferences, etc. of the user and the user's business.

Figure 3:
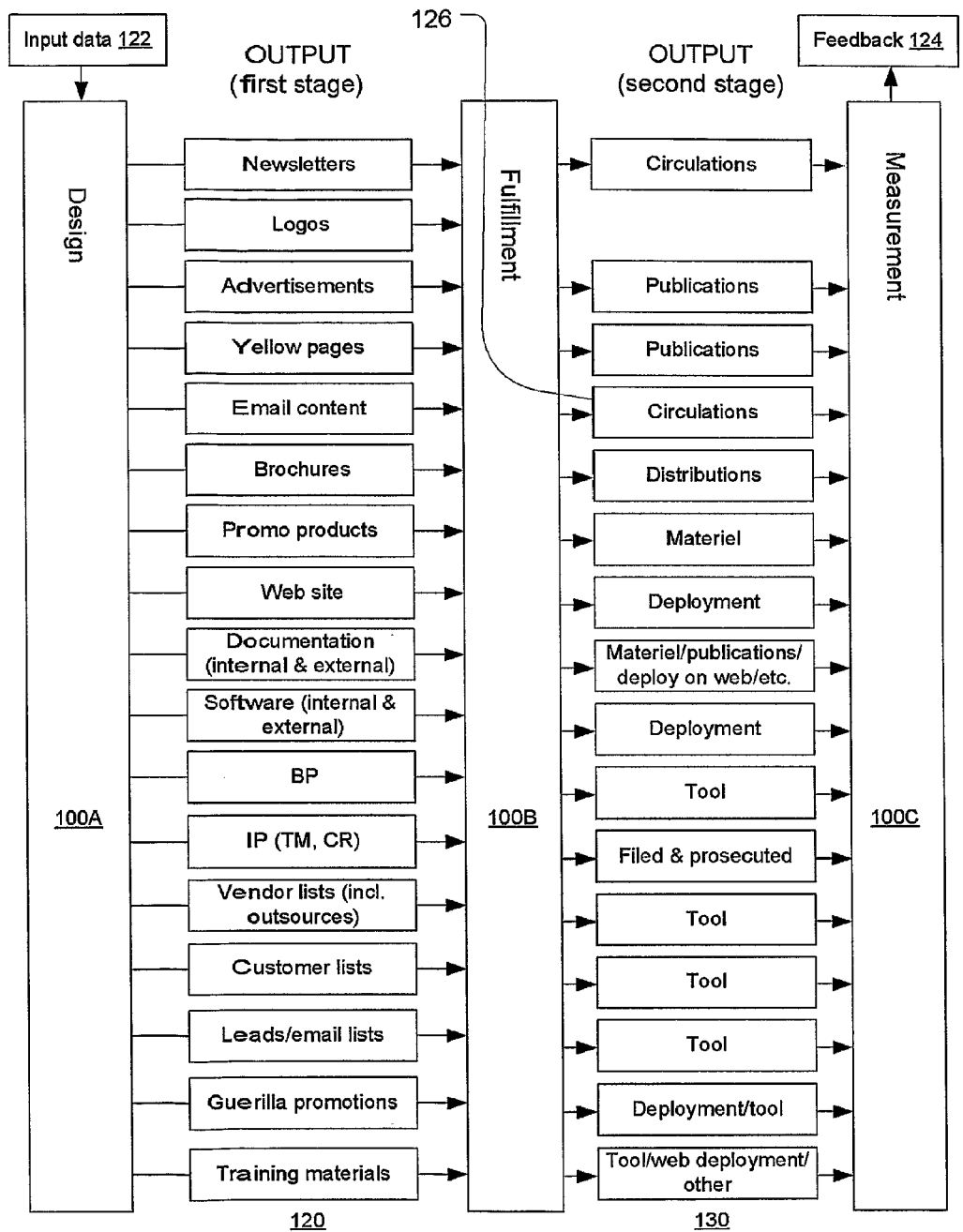
FIG. 3 is an illustration for discussing content flow and deliverables that may be produced according to embodiments of the invention.

Referring to FIG. 3, in an embodiment on supporting a user's marketing efforts, the design processes 100A, in the aggregate, may yield such outputs 120 as newsletters, logos, advertising copy, formatted emails, brochures, promotional products, web sites, a marketing plan, a sales training manual, etc. as indicated at 120. The fulfillment processes or tools 100B may take-in those outputs 120 and employ, distribute, or otherwise exploit them in a manner that suits the user. For example, a fulfillment tool might be an email newsletter manager that stores a distribution list, manages opt-out requirements, periodically solicits contributions from collaborating employees and consultants, and automates the sending of emails all resulting in circulations as indicated at 126. Other outputs 130 would include printed publications, where the corresponding fulfillment tool is an interface to a printing service that accepts online upload of printable copy. An end-service or tool could provide for circulating the publication. Still more examples include software such as training software for salespeople, collaboration software that allows sales people in the field to communicate with a home office, etc.

The inventive service, and a user's interaction with it, will be discussed with reference to an example of a user who is the CEO of a startup company. The user begins using the system with a long list in-hand of previously conceived business needs that relate to marketing. In addition, the user is ill-prepared with regard to other matters and options and seeks guidance from the system based on his basic business definition and stored marketing templates provided by the system in the template library 52 (FIG. 2A). For example, the CEO might wish to create a company name and logo, design some literature for promoting the company, create an email campaign and a web site, etc. and also identify additional options to consider.

Figure 2B:
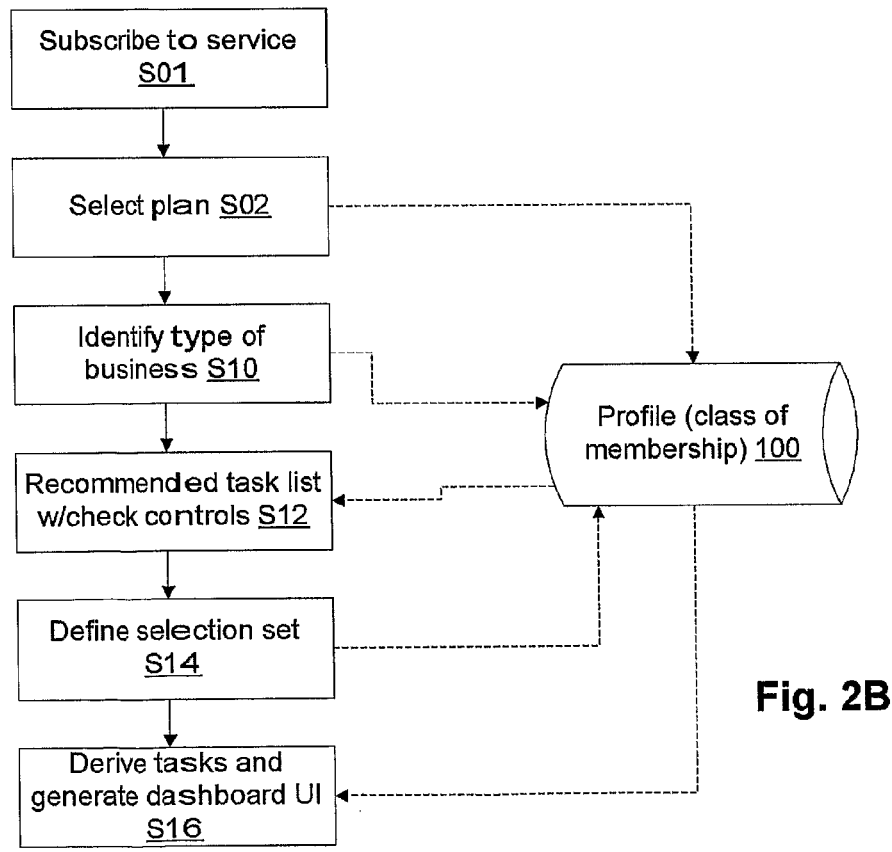
FIG. 2B is a flowchart and data flow diagram illustrating a set up procedure according to an embodiment of the invention.

Referring to FIG. 2B, the CEO signs up with the service S01 or, alternatively, purchases and installs software on a stand-alone system to gain access to the system. In a preferred embodiment, the system is a server-based application that is accessed via a browser capable of running applets such as a virtual machine program and multimedia plug-ins. The user then selects S02 from among a number of predefined plans that provide varying suites of features. For example, one cost plan might be defined for subscribers who only desire a small subset of the tools and content available through the service and another defined for users who want to use the service for nearly all their marketing requirements with various levels between. The result of this selection is made part of a profile 100, the data flow being indicated figuratively by dashed lines. Alternatively, the user may pay a fee for each deliverable. For example, the user may purchase a logo the user selects or designs using the system for a fixed price.

The profile 100 may be a database that stores all the customization data gleaned from the user as the user works his/her way through the system. This data may be passively derived or actively derived. For example, the word "customization" is often applied to the process of accepting option selections from a user and storing those for future reference. This is an active process where the user directly controls the preferences s/he selects. The term "personalization" is often applied to a passive process in which inferences are made about the user's preferences, concerns, objects of interest, etc. based on the user's interactions with a system. For example, a personalization system may store much of the user's inputs, the time of day when the user interacts with the system, the frequency with which certain processes are invoked and then make inferences from these data at a later time. This may be done by storing user data and applying a machine-recognition process to the data at decision points or by doing the same thing beforehand and classifying the user's behavior and storing indicia resulting from the classification. There are various known techniques for obtaining and storing customization and personalization data at all levels of a system and these will not be elaborated on in detail here. Examples include template-matching, network predictors such as Bayesian and neural networks.

Figure 4A:
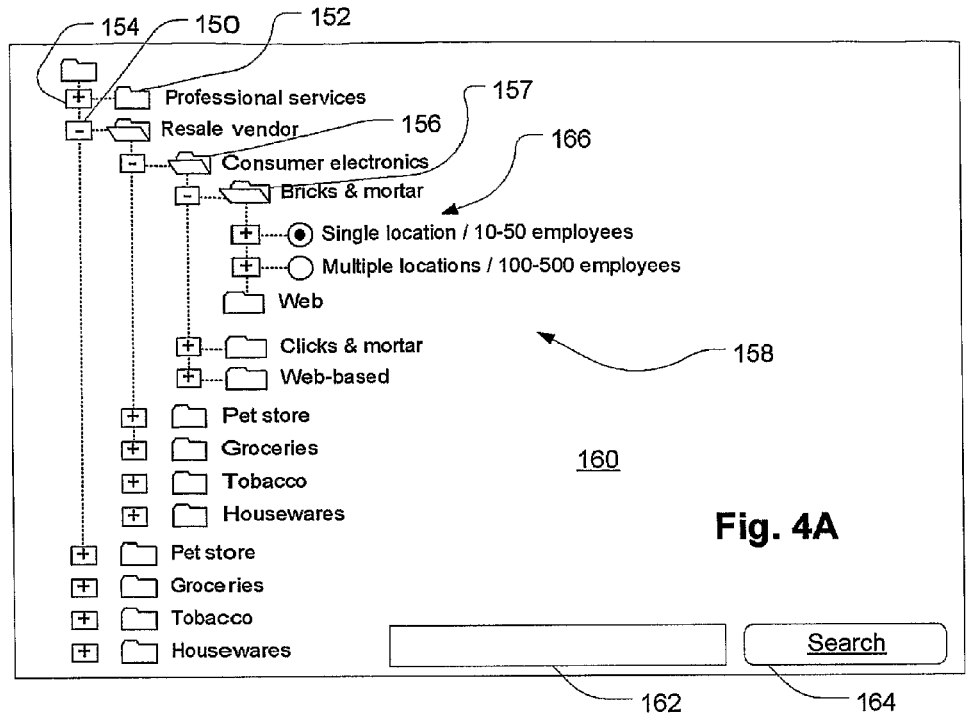
FIG. 4A illustrates an example of a selection interface for indicating a type of user.

In step S10, the user then indicates his/her class of business. This is a customization datum and is stored in the profile 100. FIG. 4A illustrates a user interface 160 that may be used to navigate a tree 158 of business classes to allow a user to identify and indicate one closest to the user's. The user interface 160 employs typical navigation controls to expand 154 and collapse 150 an outline representation of the tree 158 using closed-folder icons 152 and opened-folder icons 156. A radio control 166 shows a selection from among multiple options branching from an open folder 157. To help identify closest matches, the interface may provide a search text box 162 and button control 164 to allow for close approximations to be expanded and reviewed before a selection is made.

An alternative to the interface of FIG. 4A is a search-return list of close matches with selection controls that allows the selection of one. Still another alternative applicable to interfaces of both types is to allow multiple selections, which might be used to combine options as will be clear from the discussion below.

Figure 4B:
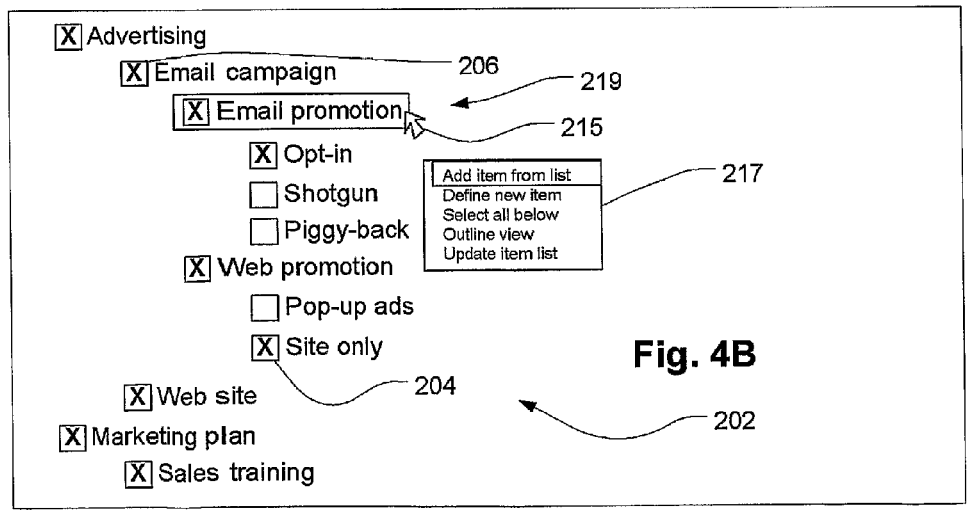
FIG. 4B illustrates an example of a selection/customization interface for setting up tasks and other elements of embodiments of the invention.

Still referring to FIG. 2B, the one or more business types are stored in the profile 100 from the result of step S10 and in step S12, a recommended task list is generated. An embodiment of the latter is illustrated in FIG. 4B. From the one or more business class identifiers selected in step S10, a template of appropriate tasks is read from a database (figuratively represented by template library 52 FIG. 2A) and a list generated and shown in outline fashion as at 202. Each task item represents a task, for example as indicated at 204, or a group of tasks, for example as indicated at 206. A group of tasks may be selected or rejected en masse by selecting or rejecting the item that subtends the group. Ultimately, by working with the user interface of FIG. 4B, a list of selected tasks results.

Items may be added to the list by means of a suitable control, for example by selecting, for example by means of a pointer 215, a group header item, for example the one indicated at 219, and right-clicking a mouse (not shown) a menu offering various options may be invoked. One of the options may include defining a new task for the group. This may invoke a new user interface, which is not shown, that allows the user to define a task using tool or content primitives stored in the system as will be discussed below.

Each item, for example 204, has a check box to permit its inclusion or exclusion in a final list of tasks. The result may be stored in the profile 100. The tasks may include myriad different items from a logo to an email marketing campaign. The proposed list associated with each vertical business class is preferably over-inclusive so that all potentially-desired options are provided. Each list element may be hyperlinked to an explanation of the associated item which contrasts it with other options in the list and its suitability for different types of users.

Returning to FIG. 2B, once the task list is filled out, a selection set is defined in step S14 and stored in the profile 100. This list may ultimately be used throughout the system to redefine the overall user interface (step S16) for the particular user as will become clear through the following illustrative examples.

Figure 4C:
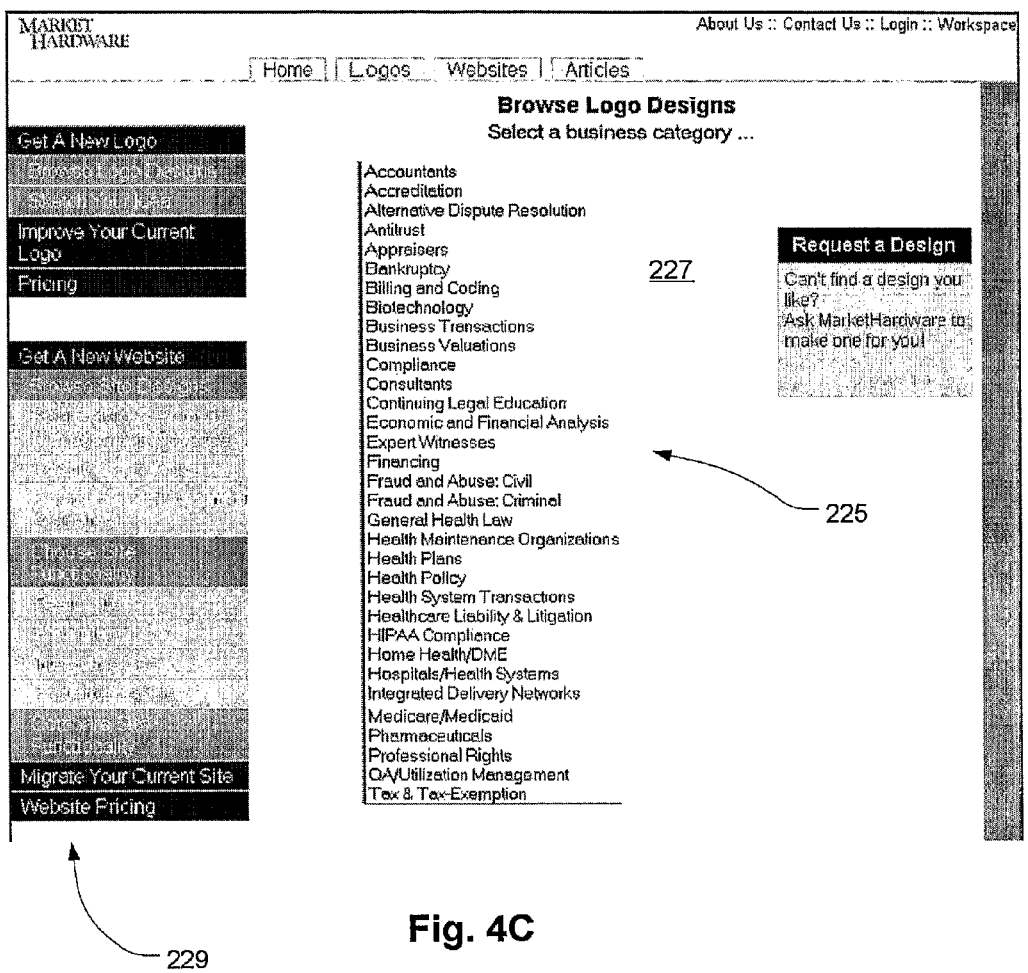

Rather than creating a detailed profile which includes specified business categories of the user's business, the user may make specific categorical selections for a current operation as a content filter for browsing. Thus, the step S10 of FIG. 2B is not essential. Referring to FIG. 4C, at various points where appropriate, content may be limited by specifying a vertical business category of interest. In an example interface 227 used for displaying logo designs, pick list 225 allows the user to make one or more selections from various business categories. Logos relating only to the selected category or categories may then be displayed and edited as discussed elsewhere in the instant specification. Also shown in FIG. 4C is a navigation bar 229 that allows users to invoke various other functions such as reviewing web site templates, comparing content, evaluating pricing, features, etc.

Figure 5:
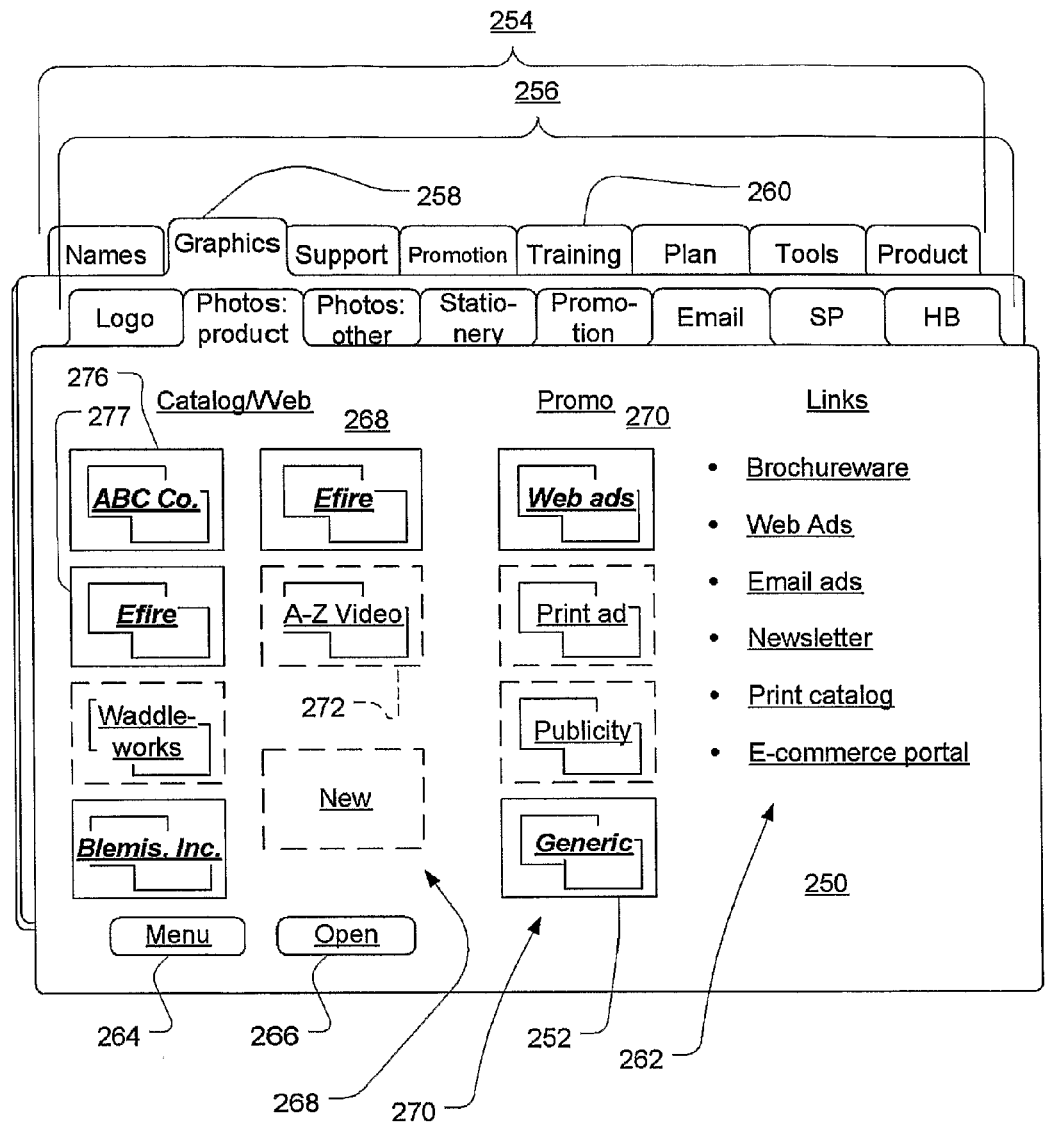
FIG. 5 illustrates an example of a user interface that may be used to access, at a high level of grouping, for review, editing, deleting, organization, and other manipulations, photographic content, including features that allow navigation to other kinds of content and tasks.

Referring now to FIG. 5, a user interface 250 using a familiar file drawer metaphor feature in which tabs, for example 258 and 260, indicate a selection set. In this case, each "folder" contains a set of tasks and/or task groups. There are two levels of folders shown, the first 254 subtends the second 256 in hierarchical fashion so that all the tabs in the second level that are currently selected 256 belong the tab 258 on the first higher level. If the tab 260 were currently selected, a completely different set of tabs would appear at the second level indicated at 256. In the illustrated example, each of the tasks, in this case, groupings of tasks as represented by icons, for example as indicated at 272, 276, and 252, represents content to be added to an inventory of product photos that are required to fulfill certain marketing processes, also tasks, but not shown in the current file, that have been selected by the user at steps S10-S14 in FIG. 2B. In this example, the "tasks" correspond to content, but the tasks may also represent software or human processes to be implemented, tools to be configured, materials to be printed, etc. The tasks may indicate a single task or item of content or a grouping. In the present example, each group icon 276, 277, 252 and others is selectable and may be opened to reveal the interface shown in FIG. 6 to be discussed below.

Each grouping (e.g., represented by icons 276, 277, 252 and others) may defined according to any suitable organizational structure. In the current example, task groups ordered into category collections corresponding to catalog and web product photos 268 and promotional photos 270, are broken down into further groupings represented by the icons, for example as indicated at 272, 276, and 252. In catalog and web product collection, they are grouped by the companies that make the products. In the promotional category, they are broken down by the medium used for distribution.

Some of the icons are shown with broken lines to indicate that they contain uncompleted tasks or, if they represent tasks rather than groups, uncompleted tasks as indicated for example at 272. Other icons have solid lines indicating they are, or contain, completed tasks, only, as indicated at 276. Links 262 are also shown to provide a direct connection to related tasks or task groupings such as ones that might utilize the inventory stockpiling task of the product photo collections represented by the icons 272, 276, and 252 and others. Other controls 264, 266 for navigating may also be provided Although a folder-type user interface is shown for navigation, it should be clear from the functional description that other interface and navigation devices may be used for a similar purpose. The same goes for the user interfaces of all the foregoing figures and others to be discussed below. The details of the interfaces are provided to make the discussion more readable.

Figure 6:
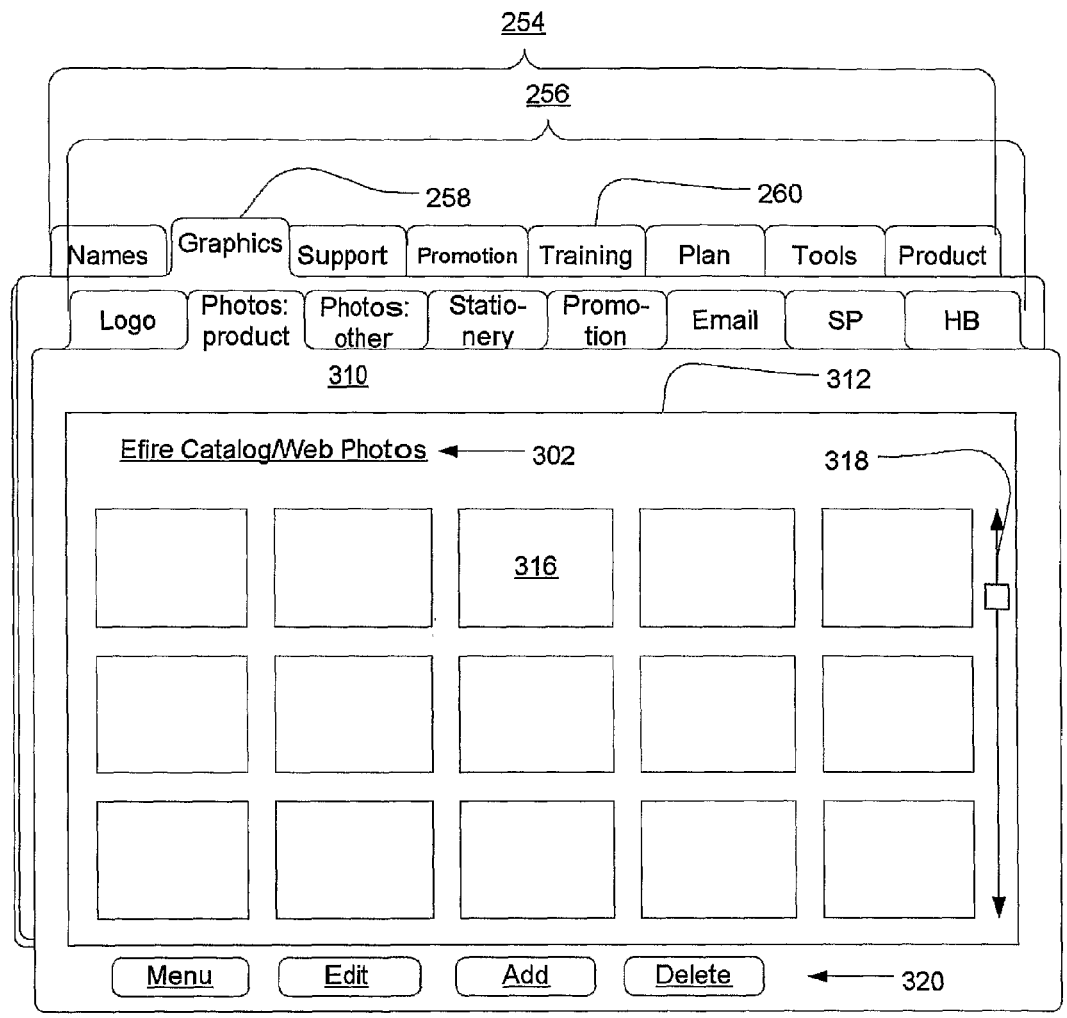
FIG. 6 illustrates an example of a user interface that may be used to access, at a lower level of grouping, for review, editing, deleting, organization, and other manipulations, photographic content, including features that allow navigation to other kinds of content and tasks.

FIG. 6 illustrates a user interface that may be generated upon receiving an expand command in association with one of the task groupings, for example by selecting or actuating the icon 277 of FIG. 5. A heading 302 indicates the grouping that has been expanded. The folder tab representations 254 and 256 are not changed, but the content of the folder is as if the icon 277 of FIG. 5 were expanded to the boundary 312 to fill the space provided by the folder 310. Here, there is a gallery of thumbnails, for example 316, each of which may represent a photo. A slider control 318 may be provided or other control for handling a large amount of content. Of course other display interfaces may be provided to allow access to objects or tasks. In the present example, a photo's icon may be selected and an editor invoked to edit or otherwise perform some action, such as delete, the photo object. For this purpose, and for navigation, controls 320 may be provided. Photos may be added using an associated control (not shown)which may invoke an upload interface (not shown) according to known techniques. The editor layer is not illustrated because the features of suitable photo editing software are well-known. These may be invoked through the system's application program interface (API) by a browser or browser plug-in in a manner that is known by those skilled in the software arts.

Figure 7:
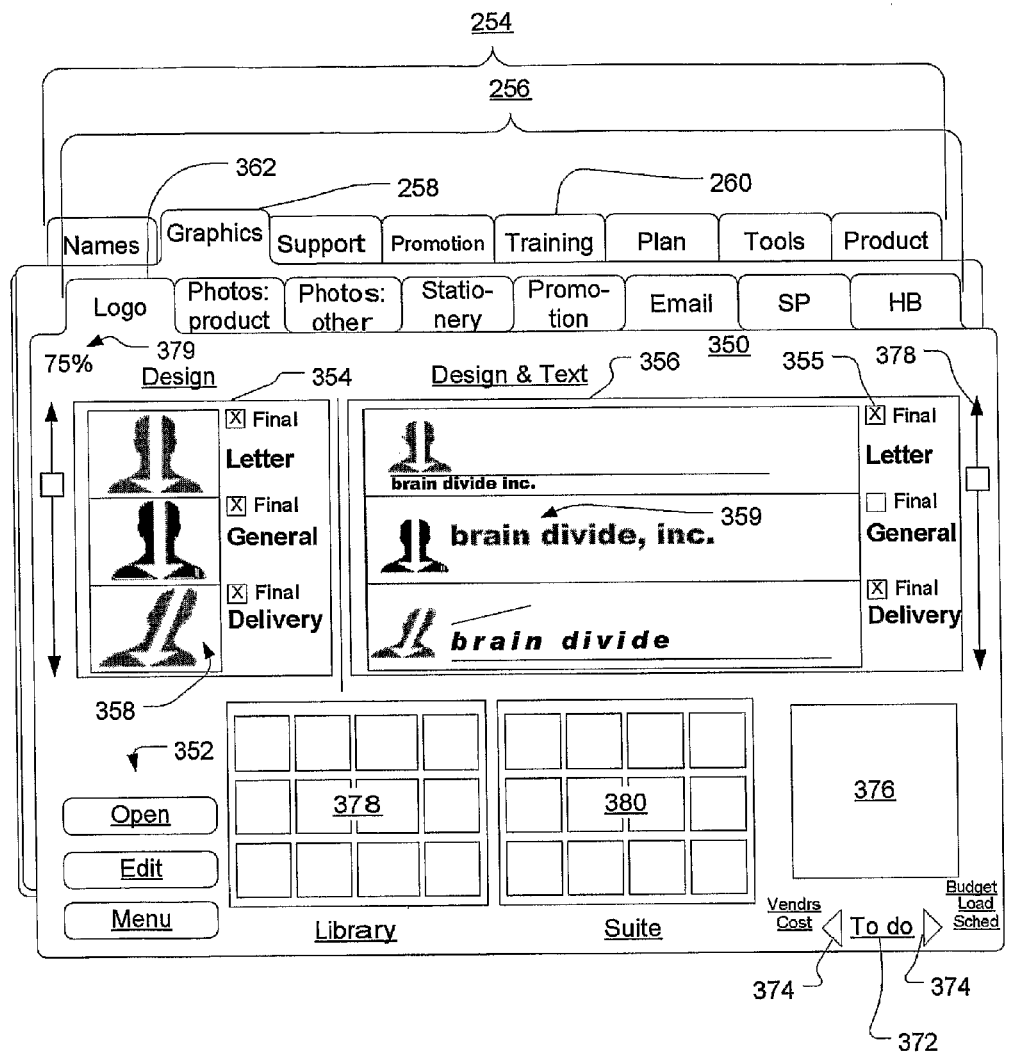
FIG. 7 illustrates an exemplary variation on the user interface of FIG. 6 in which the content is vector graphic content with additional navigation and manipulation features.

Referring now to FIG. 7, a user interface display for a set of logo graphic objects is shown under a logo tab 362. Thumbnail icons (e.g. 358) of graphic elements of logos are shown in one grouping 354 and with associated text and other elements (e.g., 359) in another grouping 356. A user can select and edit each of the logo graphic elements (e.g., 358) or combinations (e.g., 359) using known graphical user interface techniques, such as pointing and selecting or actuating, to invoke a viewer/editor (discussed with reference to FIGS. 11 and 14, below, and others). In this case, logos are preferably stored and edited as vector information so that they are more easily edited, scaled, and stored. Before discussing a user interface for editing logos, a preferred embodiment of a process and data architecture for the overall system will be discussed at a level of detail that is greater than with regard to FIGS. 2A, 2B, and 3 because the logo editing interface and function may be derived from elements of this architecture. Other controls are provided which will be discussed further below.

Figure 8A:
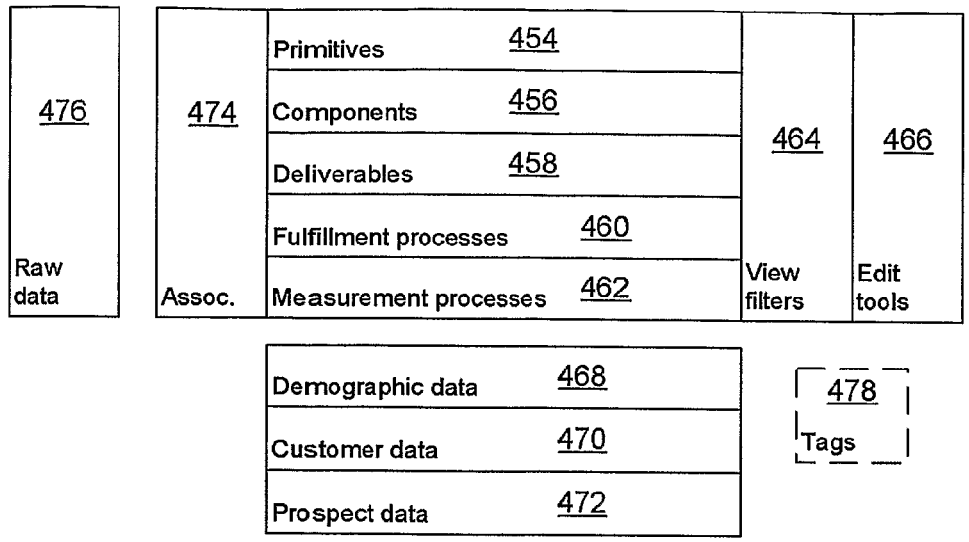
FIG. 8A illustrates a data domain model, that may characterize a data set usable with the inventive system, and devices that interact with the data set to provide some of the functions discussed herein.

Referring to FIG. 8A, a data-centric view of the invention is illustrated according one embodiment at 450 and referred to as a data domain model 450. The data domain model 450 describes, essentially, the universe of data the system supports and acts upon. The data domain 450 includes data objects identified as primitives 454, components 456, and deliverables 458 to indicate the possible levels of integration of various data elements such as graphical elements, software tool configurations, and text and the hierarchical dependency resulting therefrom. Generally, these refer to content and tools that the user configures for the user's particular marketing plan. Primitives 454 might be textual vignettes, fonts, and/or low level vector graphic objects that may be combined to create higher level objects (components 456 and deliverables 458) such as a logo or a newsletter story. The first higher level objects correspond to the components 456. Deliverables 458 are objects that are at the end point of integration such as a completed email or a finalized logo which has been built from one or more components 456. There is no bright line definition for the distinctions between primitives, components, and deliverables and more or fewer layers may be defined. Preferably these are stored as such to allow for simplified editing of deliverables 458 by simply altering associations between them and the one-way flow of dependent elements among the components and primitives comprising them. The associations that define how components 456 are derived from primitives 454 and deliverables 458 from components 456 are indicated as a distinct data set at 474, but this is intended as a purely conceptual separation.

The association data 474 is broken out for discussion purposes and not intended to indicate a particular data structure. For example, a particular set within the association data 474 may be all that is required to define a particular component in the component data 456 such as when a graphic is an assembly of primitive graphic elements, so the corresponding component is merely the association data required, such as position, orientation, color, etc. information which completes the definition of the component. In that case it will be realized that the association data and the component data overlap. However, it is possible for the distinction between association data and the component or deliverables data to refer to different bodies of data as when a primitive is never used outside the context of a particular component.

In addition to the creation, revision, storage and manipulation of content data and tools, the inventive system may store definitions of fulfillment 460 and measurement 462 processes. Fulfillment processes 460, as mentioned above, are generally software and/or related data that aid in using deliverables 458. An example is an email newsletter tool that takes email content (a deliverable) and manages the process of distributing the content subject to schedule data, opt-in/out feedback from recipients, mailing lists, etc. according to known sub-processes.

As is well-known to software developers, the distinction between programs and data is a blurry one if it exists at all. Since such fulfillment processes may be customizable, they are illustrated to that extent in the data domain model 440. The same goes for measurement processes 462. Measurement processes 462 encapsulate process definitions that measure the performance of the elements of the user's marketing plan, for example, an email campaign. An example is a database program that tracks the timing and number of opt-out requests from email recipients as a function of mailing list source data, email type and content descriptors, and other data. In the context of the model of FIG. 8A, the library of content, processes, etc. are simply data that are loaded into the data domain 450 before the user starts interacting with it. The library may be a separate data set (of classes) and the user's selection of an element thereof may cause an instance of it to be added to the data domain 450 such that the data domain 450 is not pre-populated. This is an implementation detail that is not relevant to understanding the invention.

The customization of the user interfaces such as illustrated so far in FIGS. 5-7, according to data entered in user interfaces described with reference to FIGS. 4A and 4B may be described as the configuration of view filters 464. These are configurable data elements and are included in the data domain 450. As well, edit tools 466 that permit the user to make modifications to the system may be configurable responsively to the user's individual needs. The domain 450 also includes customer 470, prospect 472, and demographic 468 data which may be used by fulfillment and measurement processes as well as integrated in deliverables, for example a marketing analysis or sales report (not indicated). Finally, raw data 476 may be uploaded or input by a user and integrated, possibly after transformation, at some point in the data domain 450. For example, the user may upload a bitmap image of a graphic the user wishes to convert into a logo design. The system may provide an image-processing component to break the image into blobs, which may be converted into closed border vector shapes and stored as primitives 454 with corresponding association data 474 from which a component may be derived together with other component data 456 corresponding to the component.

Much, if not all, of the data in the data domain may be tagged to allow the data to be identified and to permit the definition of associations 474. Thus, the data domain includes tags 478 which are illustrated as a separate set of data but are intimately associated with each data object 454-462 in the data domain 450. Tags may include unique identifiers, categories to which the data objects belong, etc. The details of tagging as a device for categorizing and partitioning data are well within the skills of those familiar with the programming arts and are not developed in the present application.

Figure 8B:
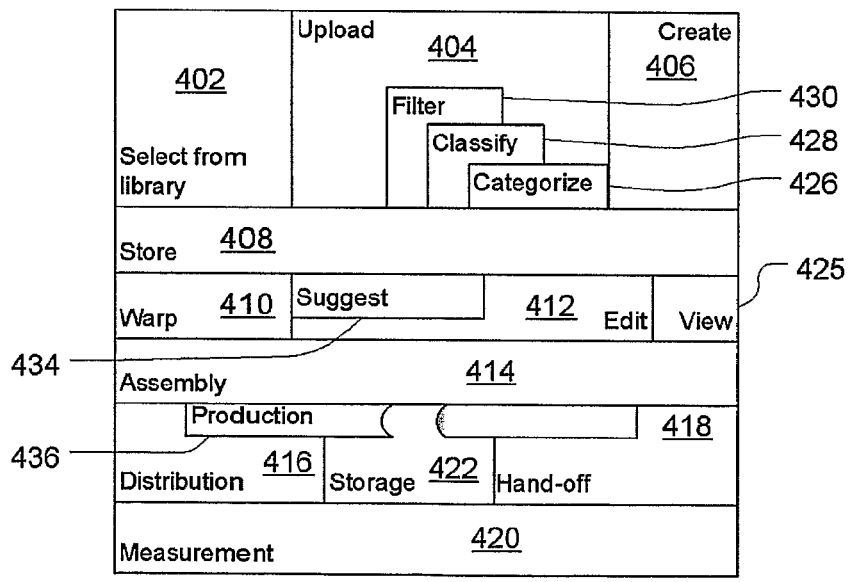
FIG. 8B illustrates a process and data flow stack for a system according to embodiments of the invention.

Referring to FIG. 8B, a process flow diagram 400 runs from the top down. The process may define a manual, semi-manual, or fully automated process. Data in the inventory of FIG. 8A (namely, primitives 454, components 456, and deliverables 458) are incorporated in the data domain 450 via three possible paths. The first path is where the user selects the data object from a library 408. As discussed with reference FIG. 8A, the library of components may be preinstalled or may be selected and incorporated as a result of a user interaction. This path is indicated at 402. Another way that data may be added to the data domain 450 is to create 406 a data object using an editor program such as a bitmap editor, vector graphic program, word processor, page layout tool, database configuration tool, report editor, or other tool. The "creation" may result in data at any level such as primitives 454, components 456, deliverables 458, etc. and may include dependencies by incorporating elements already defined in the data domain. For example, the primitives 454 may include basic geometric shapes that are then edited to create a component 456.

Figure 8C:
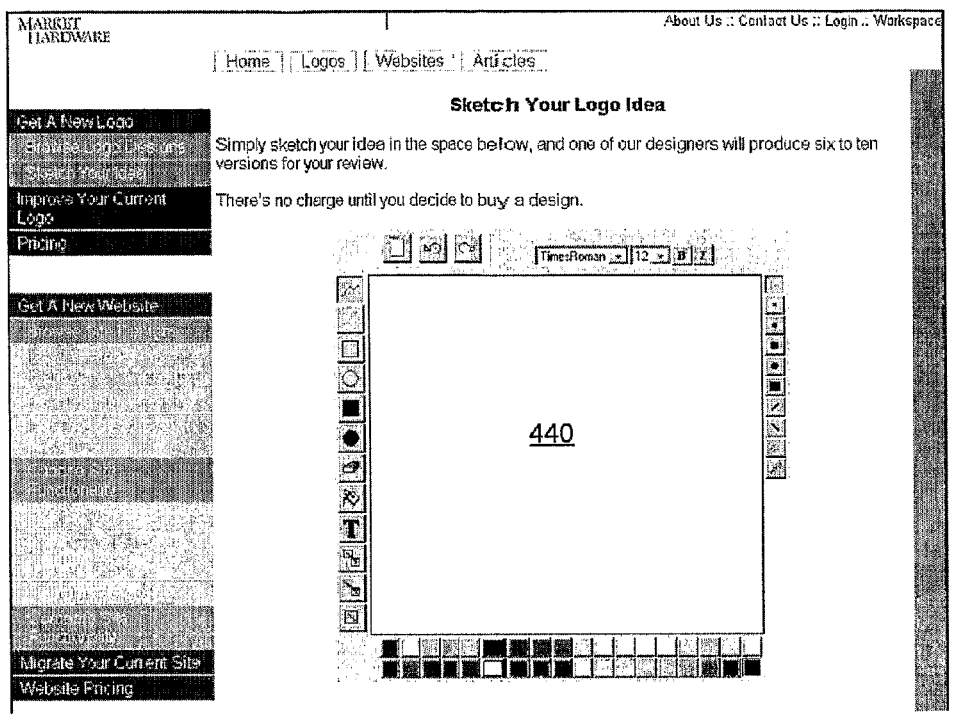

Other ways of allowing the user to generate or incorporate data objects into the system lie in-between the above categories but are not considered to be excluded. Users may create or upload material to be used as a selection guide or design guide either automatically in a back-end process or by a professional artist, editor, and/or software engineer, etc. For example, referring to FIG. 8C, the user may be provided a simple drawing program in which to sketch an idea for a graphic design. Pattern-matching software could then use the provided image as a template for retrieving similar finished designs from the data domain 450. The retrieved objects may then be edited by the user or used as is.

The third way that data may be integrated into the data domain 450 is by adding it through an interface other than an editing interface as indicated at 404. This may be done directly, if the data can be applied through another interface such as a network, data store such as a disk, ftp, or other means. The incorporation of data in the domain from other sources preferably results in the categorizing of the data. Also, some types of data are preferably converted to a form that enhances its integration with other elements. For example, crude bitmaps might be converted into vector graphic objects, as mentioned above or very large or complex data sets may be converted by or translated to a form that is compatible with favored formats or data sizes. Such processing is represented at the layer indicated by the numeral 430. A machine recognition process such as a network classifier or template comparison process may be used to filter larger unstructured free-form objects and break them into recognized elements (i.e., classify 428 them) them for importation. For example, a document file containing graphics, business addresses, telephone numbers, product information, etc. could be parsed by such processes and broken into constituent elements for importation. Finally, the elements may be subjected to a categorization process 426, which may result in their being partitioned in a mechanism such as tagging. Any of the above may be bypassed depending on the form of the data (for example, it could be tagged as in an extensible markup language (XML) file) or the particular design of the inventive system, for example one that creates identifiers for objects only after they have been selected for integration into components 456 or deliverables 458.

A storage process 408 may provide for the efficient storage of new inputted data. The storage process 408 may include sub-processes to interface with an edit process 412 to allow the viewing and accessing of data as well. Three modes of operating on data elements are indicated, warping 410, which refers to a higher level type of editing discussed below, suggesting 434, which provides design suggestions based on user proposals for edits, and traditional editing 412 where a user makes modifications to the data using the functionality familiar in commonly known editing filters and tools. The latter may be integrated in the system or external to it. All of these processes operate on data in the data domain to change the data and return it to storage. All are assumed in this representation to incorporate a viewing function to allow a user to observe. A separate viewing process 425 is provided. Features of an example of a viewing process 425 were discussed in reference to FIGS. 4-7.

An assembly process 414 may be provided to perform actions required to prepare stored data for fulfillment. The assembly process element 414 may encapsulate the software required to interface between fulfillment processes and the content parts of the data domain, i.e., primitives 454, components 456, and deliverables 458 (FIG. 8A). Different categories of fulfillment processes may be provided, including final production 436 such as printing on paper, distribution such as traditional (e.g., mail) and electronic distribution (e.g., email), storage 422 (e.g., web publication or archival storage), hand-off 418 or transfer to an outside agent for further processing, or shipping. Finally, various measurement processes 420 may be provided for collecting and analyzing performance of elements of the user's marketing plan.

Figure 9:
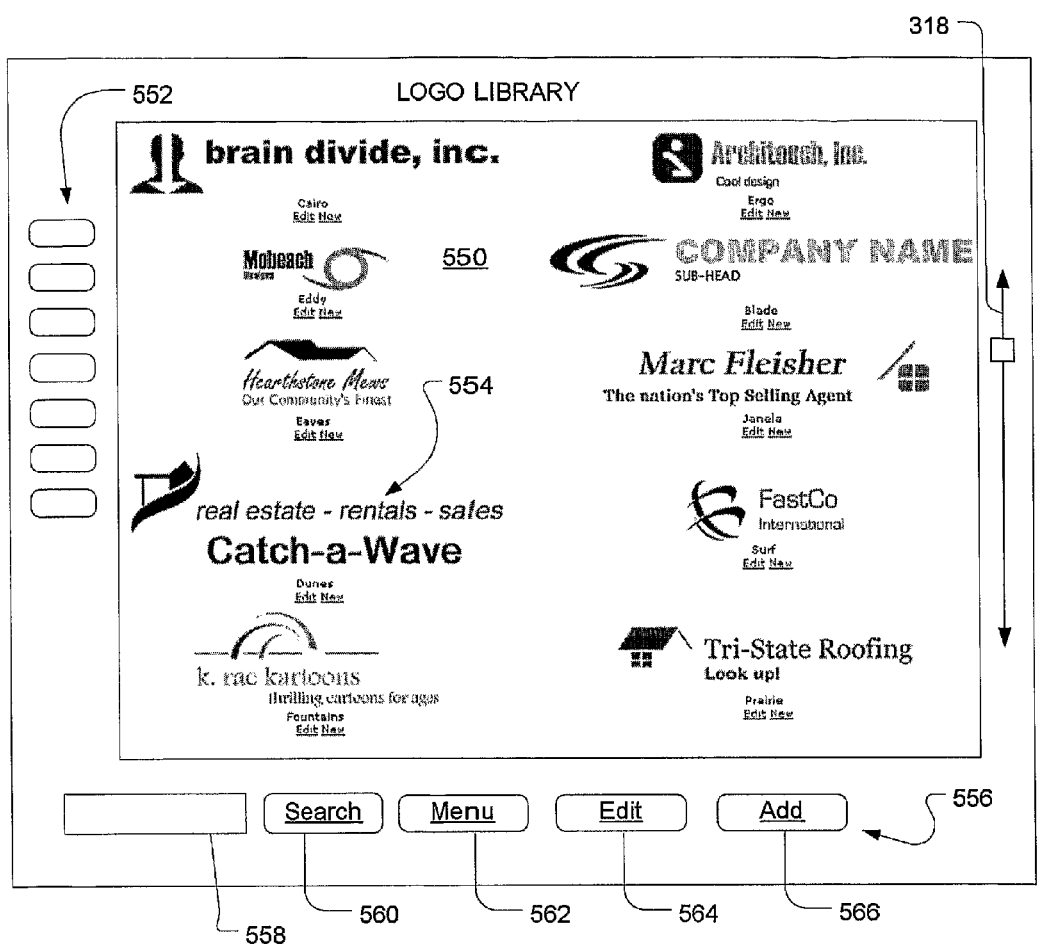
FIG. 9 illustrates a user interface for working with various kinds of content.

Referring now to FIG. 9, a display 550 shows a portion of a library of thumbnail icons representing stored logo component objects 554. The portion can be browsed using a scrolling control 318 or a search text control 558, 560. The subject matter displayed may be categorically organized and the currently displayed categories changed using navigation controls 552. Typical controls are shown at 556, an edit control 564 for accessing processes for editing, an add control 566 for including a selected object into the a portion of the data domain 450 containing items selected for use, or possible use, in the user's marketing plan (i.e., the user's "personal items"). Alternatively, where, by design choice, personal items and library objects are not segregated, the add control 566 may invoke an object editor, in this case a vector graphics program, and, after a change is made to the selected object, a new instance of the object, as edited, is stored in the data domain and appears in the display 550. The preferred embodiment, personal items are segregated to allow easier review.

Referring to FIG. 1A, the data domain 450 discussed with reference to FIG. 8 may be divided into three subdivisions for each type of data. A first subdivision 601 contains a library of source material for users to work with. The interface of FIG. 9 might be used for viewing data in this subdivision and for transferring it to another subdivision 602 which includes those selected for review. The subdivision 602 includes material that has been collected for further what-if analysis to avoid browsing through or searching through a large quantity of material as may be included within subdivision 601. Subdivision 604 includes material that has been specifically marked for use in a final version of a plan.

Figure 10A:
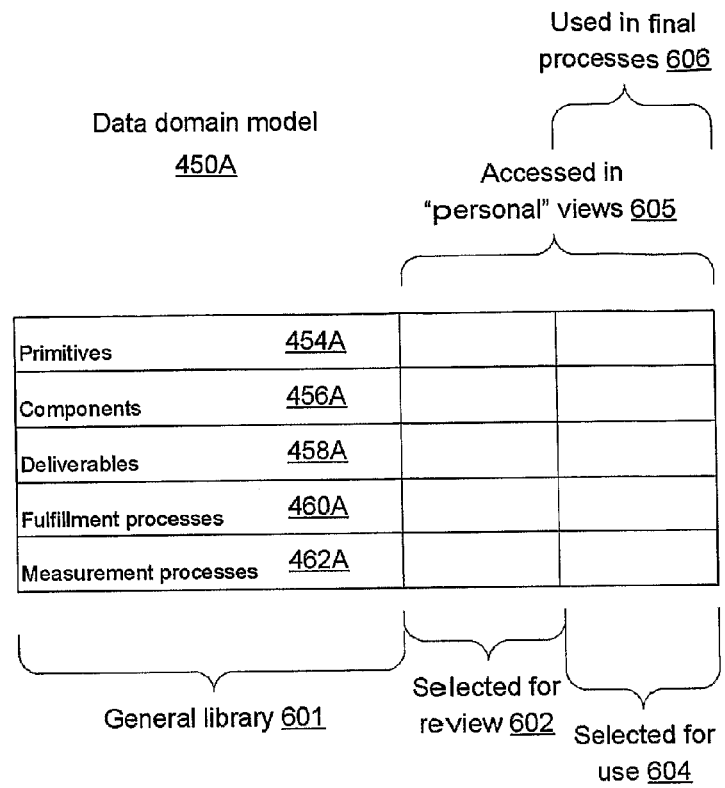
FIG. 10A illustrates a breakdown scheme for data in the data domain.
Figure 10B:
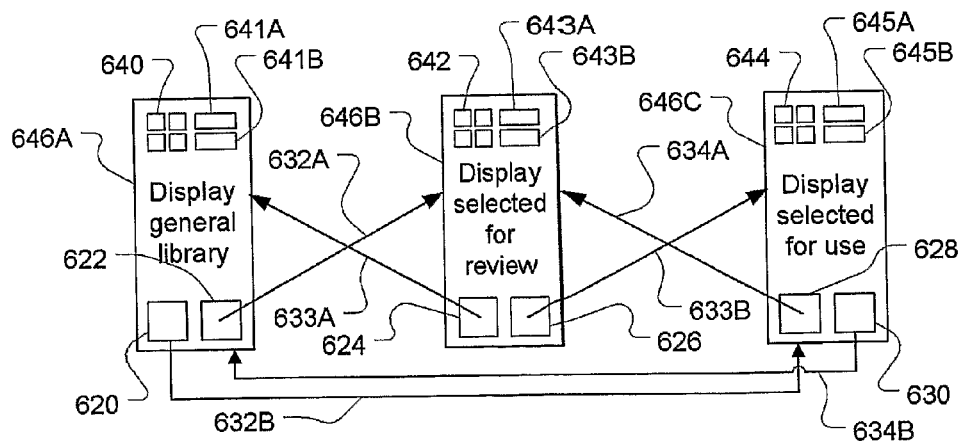
FIG. 10B illustrates in a compact fashion navigation functions according to embodiments of the invention.

Referring now to FIG. 10B, the elements in the subdivisions 601, 602, and 604 are preferably easily transferred between the subdivisions. Three user interface display screens may be provided, each of which may be current at a given time. A first corresponds to the general library 646A, a second corresponds to the group selected for review 646B, and a third corresponds to the group selected for use 646C. Each display 646A-C may display elements within the respective subdivision, preferably in a thumbnail fashion in a respective portion 640, 642, and 644 of the display. The thumbnail icons may provide a straightforward way to select the respective object in a current display.

Controls in the display may permit the user to move the selected object (one corresponding to a selected and highlighted icon) to another subdivision. For example, the display 646A may have a control 641A that sends the selected object (from among the icons 640) to the subdivision 602, as illustrated by arrow 632A, upon actuation. The display 646A may also have a control 641B that sends the selected object (from among the icons 640) to the subdivision 604, as illustrated by arrow 632B, upon actuation. The display 646A may also provide respective controls 622 and 620 for accessing the displays 646A or 646C which show objects in the selected-for-review subdivision 602 and selected-for-use subdivision 604, respectively. The latter functionality may be provided by an embedded window or by a switching to a different display.

Correspondingly, the display 646B may have a control 643A that sends the selected object (from among the icons 642) to the subdivision 601, as illustrated by arrow 633A, upon actuation. The display 646B may also have a control 643B that sends the selected object (from among the icons 642) to the subdivision 604, as illustrated by arrow 633B, upon actuation. The display 646B may also provide respective controls 624 and 626 for accessing the display 646A or 646C which show objects in the general library subdivision 601 and selected-for-use subdivision 604, respectively.

Also, correspondingly, the display 646C may have a control 645A that sends the selected object (from among the icons 644) to the subdivision 601, as illustrated by arrow 634B, upon actuation. The display 646C may also have a control 645B that sends the selected object (from among the icons 644) to the subdivision 602, as illustrated by arrow 634A, upon actuation. The display 646C may also provide respective controls 628 and 630 for accessing the displays 646A or 646B which show objects in the general library subdivision 601 and selected-for-review subdivisions 602, respectively.

Referring back to FIG. 7, the user interface depicted is for use in developing content. In this display, elements displayed, e.g. logo 359, may be filtered so that only those that have been selected for use are displayed, although their configuration may or may not be finalized. When a logo is completed, the user may use a check box, such as indicated at 355, or other suitable control, to indicate that status. The final/non-final status may be recorded by the system and persisted between user sessions. As discussed with reference to FIG. 8A, however, the data domain is much larger than simply a small set of selected elements. When the user interface of FIG. 7 is first accessed, in fact, the no elements may even be selected for use let alone finalized. However, based on the user responses to the interfaces of FIGS. 4A and 4B, the UI of FIG. 7 may provide the tabs under 254 and 256 placeholders (for example, empty boxes for each type of logo. The user then needs to access source material from which to build the required logos. The thumbnail window 378 and 380 are provided for that purpose.

Thumbnail window 378 displays some of, and provides access to, the content that is available from the general library of source material 601. Referring also to FIG. 10B, thumbnail window 378 may correspond to control 628 and display 350 to display 646C so that it may display some of, and provide access to, the content that is available from the general library 601. Selecting and invoking this thumbnail window 378 may open an interface to the respective source material 601 and generate an interface similar to that of FIG. 9. Once one of the thumbnail gallery UIs is invoked, any element displayed may be selected for transfer to a different grouping by any suitable means. For example, a menu may provide for the transfer of an item from the general library to the selected library.

Similarly, thumbnail window 380 may display some of, and provide access to, the content that is available from the wider library of material 602. Referring also to FIG. 10B, thumbnail window 380 may correspond to control 630 so that it may display some of, and provide access to, the content that is available from the broader set of material 602 that is pertinent to the user vertical or selected by the user for inclusion in it. Selecting and invoking either thumbnail window 378 or 380 may open an interface to the respective source material grouping 601/602 and generate an interface similar to that of FIG. 9.

Another view illustrated by the area 376 may be provided to show cumulative information about the portfolio of tools and content that exists, is under construction, or is yet to be created using the inventive system. This information may include a budget with balance sheet view and projected expenses based on selected tasks. Since the system provides an environment for proposing and selecting many services relating to a vertical business area, the information may be used to create a budget and balance sheet to help the user allocate costs most effectively. The view 376 may also provide a view of all vendors and expenses relating to the particular vendors whose services are involved in the completion of selected tasks to be completed, under construction, or yet to be completed. In addition, the view 376 may allow the calculation and summarization of time costs of the user company's own staff and a schedule for time management. All these functions may be provided by means of a project management system whose functional features need not be enumerated in detail here since such systems are known. However, in the present context, such a system may derive information from other areas of the inventive system and share user interface elements as discussed.

Figure 11:
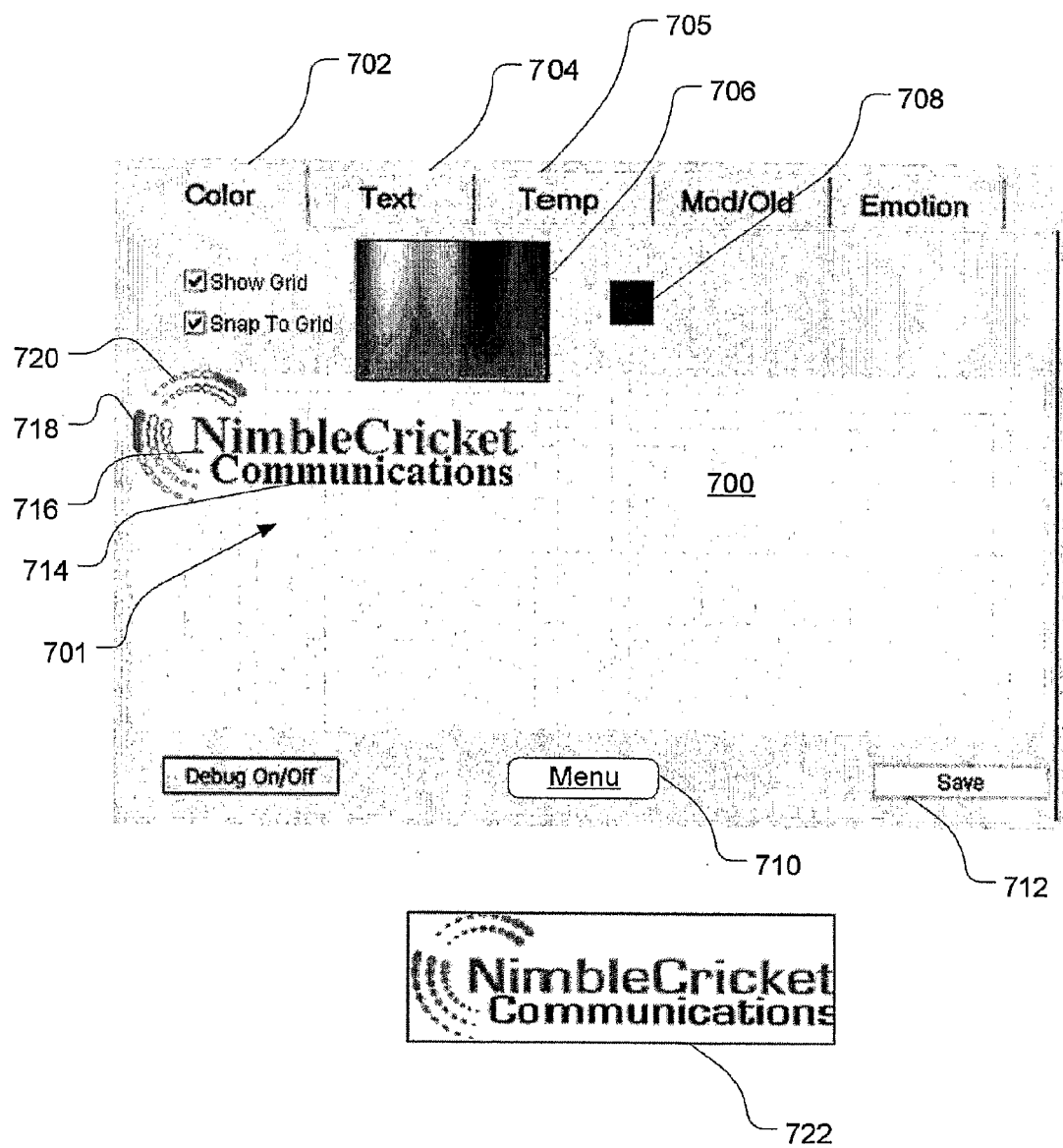
FIG. 11 illustrates a user interface for changing color features of graphical objects according to an embodiment of the invention.

Referring now to FIG. 11, when a logo 701 is selected for editing, an editing process may be invoked to make changes in the selected logo 701 or to create a new logo based on one selected from the library. The selected logo 701 appears in an editing window 700. The editing window 700 is framed by a tab navigation bar with tabs 702-705 indicating various kinds of editing functions that can be performed. The selected logo 701 consists of multiple primitives 714, 716, 718, and 720, each comprising a vector shape or formatted text. Each primitive can be selected individually or in a selection group and a change made to the selected primitive or primitives using a control, in the current case, color. These kinds of direct editing are well-known. But the preferred embodiment has important features that distinguish this interface as discussed further below with reference to Table 1 and FIGS. 12 and 13 as well as elsewhere in the instant specification.

Continuing with FIG. 11, to make color changes to the selected logo 701, the user selects the color tab. The user then selects one or more primitives in any manner appropriate for graphical user interfaces such as by pointing and clicking with a mouse. The selection items are highlighted and a color map control 706 is used to select a color by pointing at a portion of the color map control 706 and selecting. The new color is applied to the selected primitives. To provide a distinction between shapes with different borders and fill colors, suitable interface components can be provided. The above is shown for illustration only. When a change is made, a save control 712 can be selected to make the change permanent. At this point a preview image 722 may be generated. Alternatively, the preview image can be generated before saving by providing a preview button.

Preferably, the user interface is provided by way of a simple plug-in, for example a type that is free and used primarily to create graphics and animations on web sites. To allow the above functionality on a common Internet browser equipped with common plug-ins, a preferred architecture employs a standard format for structure data such as the Standard Vector Graphics (SVG) open XML standard and a two-way translation between the standard format and the format used for rendering and data manipulation provided by the plug-in. In the preferred embodiments described here, the following features are in evidence.

1. It is web-based in that the editing functions can be performed using an Internet browser with an animation-type plug-in such as Macromedia® Flash®.

2. It can apply changes at an elementary level, for example, parts of a graphic can be selected and changes applied to their fill or line color property. In further examples, other types of editing functions are discussed, but the level at which these work is finer than the level of a completed graphic design but coarser than the elementary level at which the elements are represented in the structure data, for example in standard vector graphic (SVG) format. The advantages are that this level of editing allows a user to change the look of a graphic design, to personalize the graphic, so to speak, without providing complexity that would make the interface inaccessible to the untrained or require the interface to very complex (which would in turn take a long time to download to the client device).

3. As discussed in more detail below, the editing functions include substitution and other high-level filters for users who are not proficient and editing graphics but who still insist upon a high quality result. In an embodiment, it is implemented using a standard animation plug-in that provides a native language where the native language is employed to translate between structure data and graphical display data, accept commands.

Figure 12:
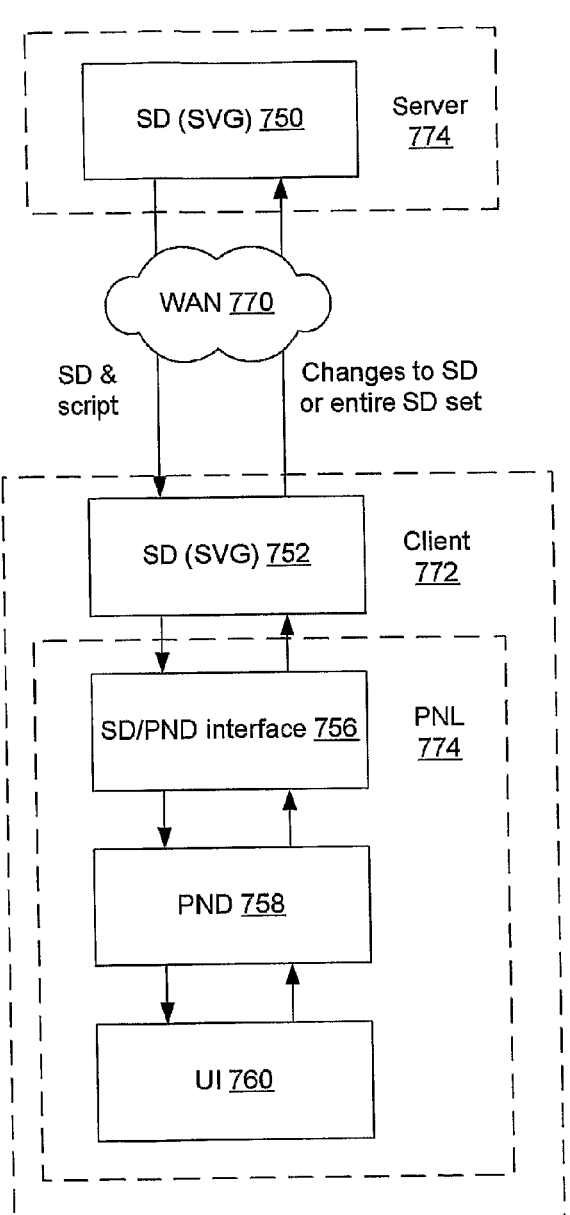
FIG. 12 illustrates back-end processing block diagram of a mechanism for supporting the interface of FIG. 11 as well as at least some other embodiments of the invention.
Figure 13:
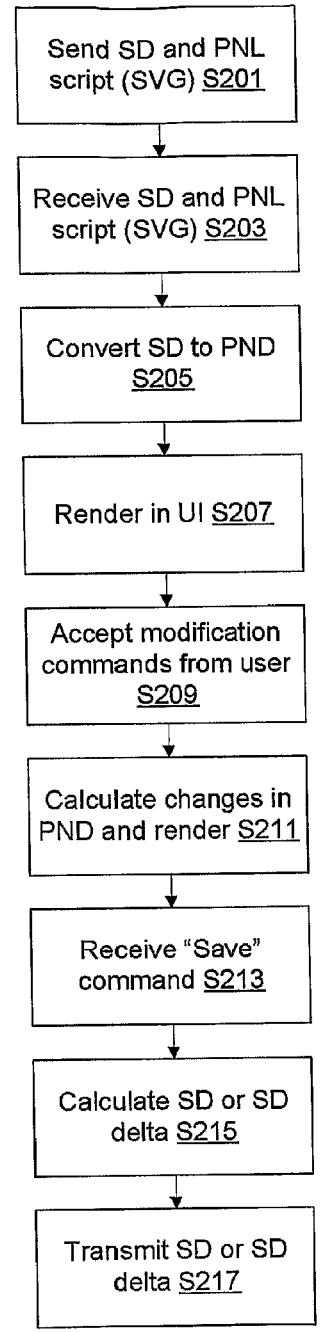
FIG. 13 illustrates a flow diagram describing a mode of operation of the mechanism of FIG. 12.

Referring now to FIGS. 12 and 13, the plug-in based architecture is described in more detail. Structure data that encapsulates the vector based definition of a graphical object (which may include text and bitmap objects) resides on a host server. When a user indicates a desire to work with a particular graphical entity, the user interface of FIG. 11 or similar is generated displaying the graphical entity derived from the corresponding structure data 750. To get to this point, the structure data 750 is transmitted from the server 774, along with a script that runs on the client-based plug-in, through some communication mechanism on a local computer, system or network—wired or wireless—such as a WAN 770 to the client 772 as indicated in step S201.

The structure data 752 is received by the client 772 in step S203 and resides temporarily on the client 772. The structure data 752 is then S205 translated to a plug-in native data (PND) format from which visual display area 700 of FIG. 11 may be rendered via the user interface 760 (e.g., such as shown in FIG. 11). The PND 758 format may be, for example one or more movie clips as defined in the Flash® PND 758. This is performed by a translation process (SD/PD interface 756) which may be provided in the PNL 774 and run on the client.

At this point, the PND 758 data (e.g., movie clips) hold at least some of the information about the objects to be edited. The PNL 774 script may accept commands through a user interface 760 (e.g., such as displayed in FIG. 11) for changes, as indicated in step S209, and render them to provide visual feedback confirmation of the effect of the command as well as make modifications to the PND 758 data to hold the changes S211. Alternatively, the changes can be stored in the PND 758 and the local SD 752 together. Preferably, the change is made to the PND only to permit fast operation and lower complexity in the PNL script.

When a save command is received S213 from the user through the interface 760 the structure data is calculated from the PND S215. Alternatively, as indicated at step S215, the changes in the structure data only can be calculated at that step. The changes (delta), or the revised structure data 752 in toto may then sent back through the WAN 770 to the server where they may be used to adjust the data domain 450 accordingly.

The following table indicates some of the advantages of the above scheme. Although in the embodiment described above, a PNL is used to implement the UI 760, it is possible to provide the same functionality using more direct methods such as available with Microsoft® Active-X® components and scripting languages such as Java®, JavaScript®, C#, etc.

Figure 14:
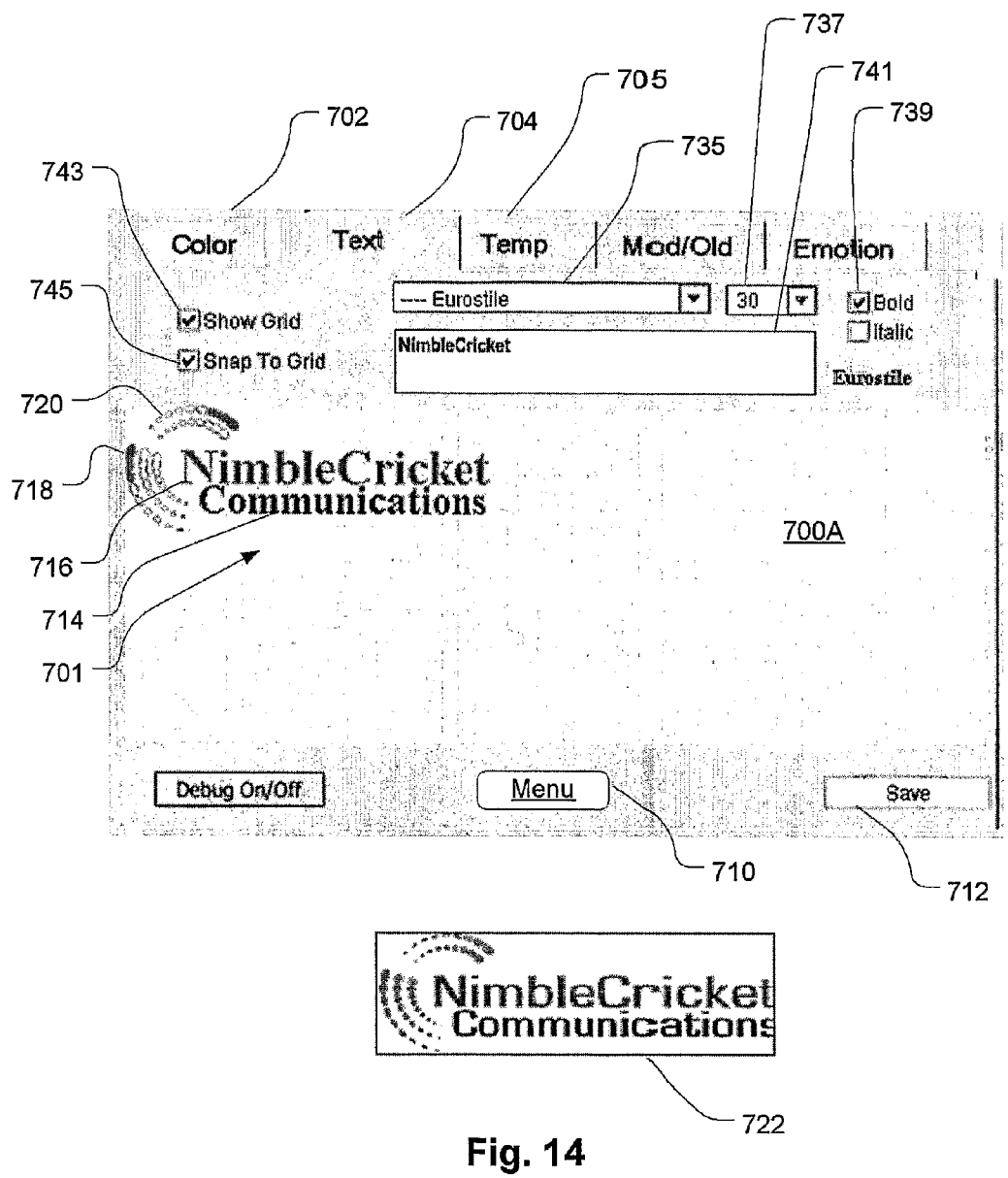
FIG. 14 illustrates a user interface for making textual changes to logo objects.

Referring now to FIG. 14, a selected logo 701 appears in an editing window 700 of a "tab" configured to allow the user to edit the text features of a logo 701. The editing window 700A is framed by the tab navigation bar with tab 704 shown currently selected. Again, the selected logo 701 consists of multiple primitives 714, 716, 718, and 720, each comprising a vector shape or formatted text. Each primitive can be selected individually or in a selection group and a change made to the selected primitive or primitives using a control, in the current case, the text. If a user selects a non-text element such as 718 and 720, an error bubble or other indication may be displayed to indicate the selection is not relevant in the text editing tab.

To make a text change, the text element 716 is selected and the text characteristic can be adjusted by various controls such as for font 735, size 737, text content 741, and style 739, for example. The above text-type changes are typical of those provided in a word processor except that the selection of text elements is done by selecting an entire text "box." Preferably the set of features that can be edited are limited to those that would be familiar to a relatively unskilled worker. This is because the system is aimed at executives not software or graphic arts specialists. The display also provides the capability to move the elements around on the edit window 700A to change the relative positions of the elements 714-720. Controls for displaying 743 and snapping 745 to a grid may be provided. When a change is made, a save control 712 can be selected to make the change permanent. At this point a preview image 722 may be generated. Alternatively, the preview image can be generated before saving by providing a preview button.

Figure 15:
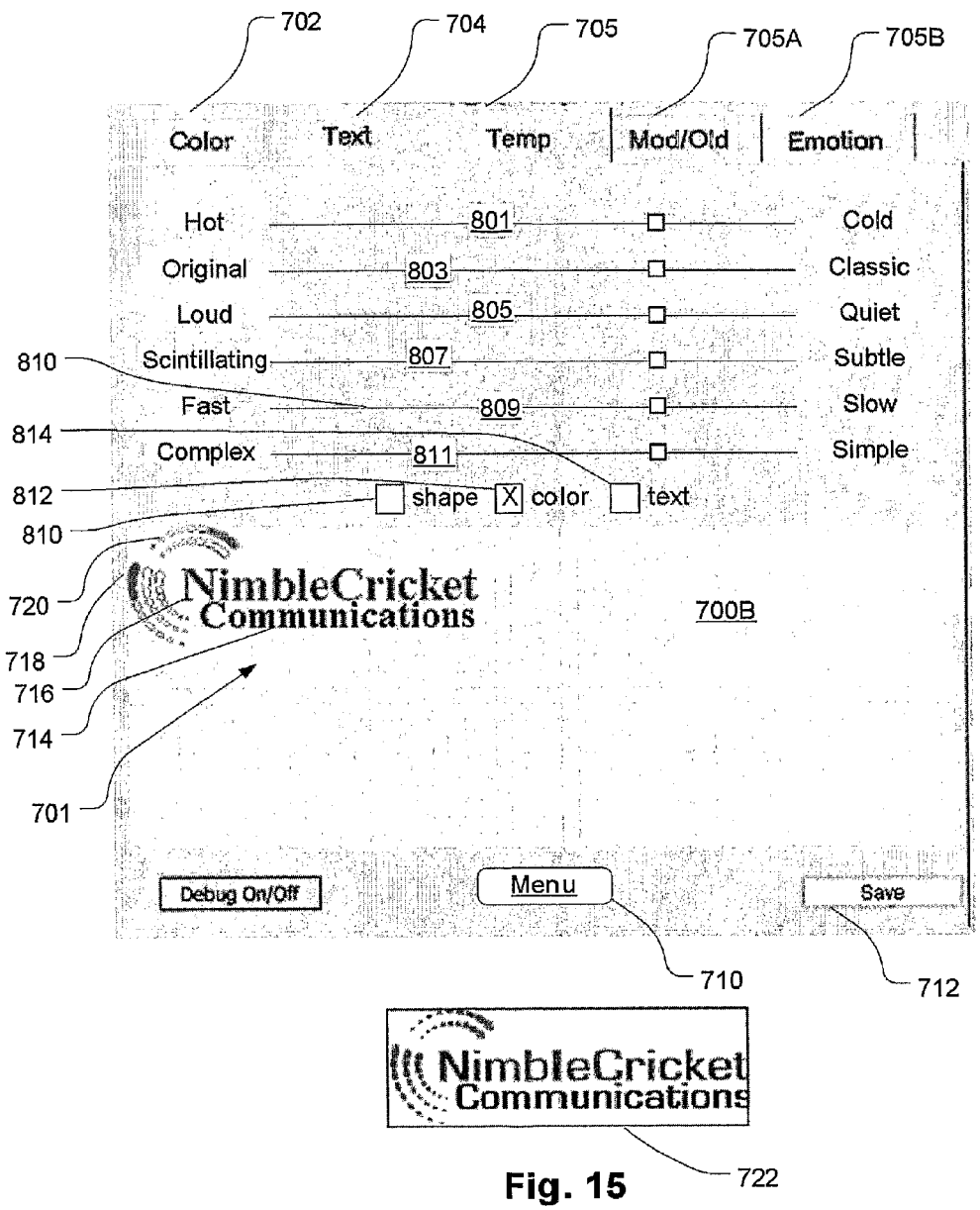
FIG. 15 illustrates a user interface for making various changes to logo objects using filters that act indirectly on selected logo features.

Referring now to FIG. 15, a UI for controlling high level filter functions applicable to shapes or text is provided. The functions, in the current embodiment, are divided into categories temperature, indicated by tab 705, modern 705A, and emotion 705B. Illustrated in FIG. 15 are controls under the temperature grouping. Six slider controls 801, 803, 805, 807, 809, and 811 are shown. Each of the sliders controls a respective one of intuitively meaningful parameters that are connected with the word "temperature." The groupings and the names of the controls as well as the underlying filter functions are subjective correlations, but the functions themselves operate at a high level and control multiple editable parameters in concert to achieve an indicated effect, as will be observed.

A change in the slider control 801, with one or more elements 714-720 selected, applies a corresponding value to lookup table associated with that control 801. The lookup table may indicate, for each value, a change in one or more parameters by way of a function or an absolute value of a parameter which may be a function of the current value of a parameter associated with the selected element(s), a fixed value, a statistic associated with the values of parameters of the currently-selected elements such as an average, or a pointer to a list of shapes, each list being associated with a respective one of the selected shapes. The effect of the control may be limited to a feature of a selected element or elements by means of check boxes 810-814.

As is well-known and common practice for vector graphics, data about each shape may be treated as a group of parameters (a data object) that define its position, orientation, the degree of curvature of the lines, the fill color and pattern, etc.—basically all the features of the object and its relationship to other objects. When a high-level filter, such as discussed immediately above, is applied to a selected shape, a client side or server side process may access a lookup table corresponding to the shape or other element. The element as a whole or one or more features of the element are each associated in the table with permitted substitution values (or whole elements) corresponding to the parameter governed by the slide control and the magnitude indicated by the slide control after the user has made a change.

A selected shape may be one of a series of shapes that are predetermined to be related but expressing different magnitudes of the parameter governed by the slide control (e.g. 801). For example, slide control 801 indicates a value that varies from hot to cold. If the shape indicated at 720, basically two concentric arcuate series of circular elements were selected, and the color check box 812 were checked, the slider might point to a position closer to hot than to cold if a color of the selected element were orange. If the slider were moved toward Hot, the color parameter orange could be changed to a color closer to red. If shape-only were selected, one of a series of related shapes might be placed in the same orientation to take the place of the one currently selected. Of course, the content of such a lookup table would inevitably a subjective one in the end, but it should be immediately clear from the examples that such a structure may be used to embody the kinds of sophisticated rules that are obvious to a graphics designer but opaque to an unskilled executive.

Figure 16:
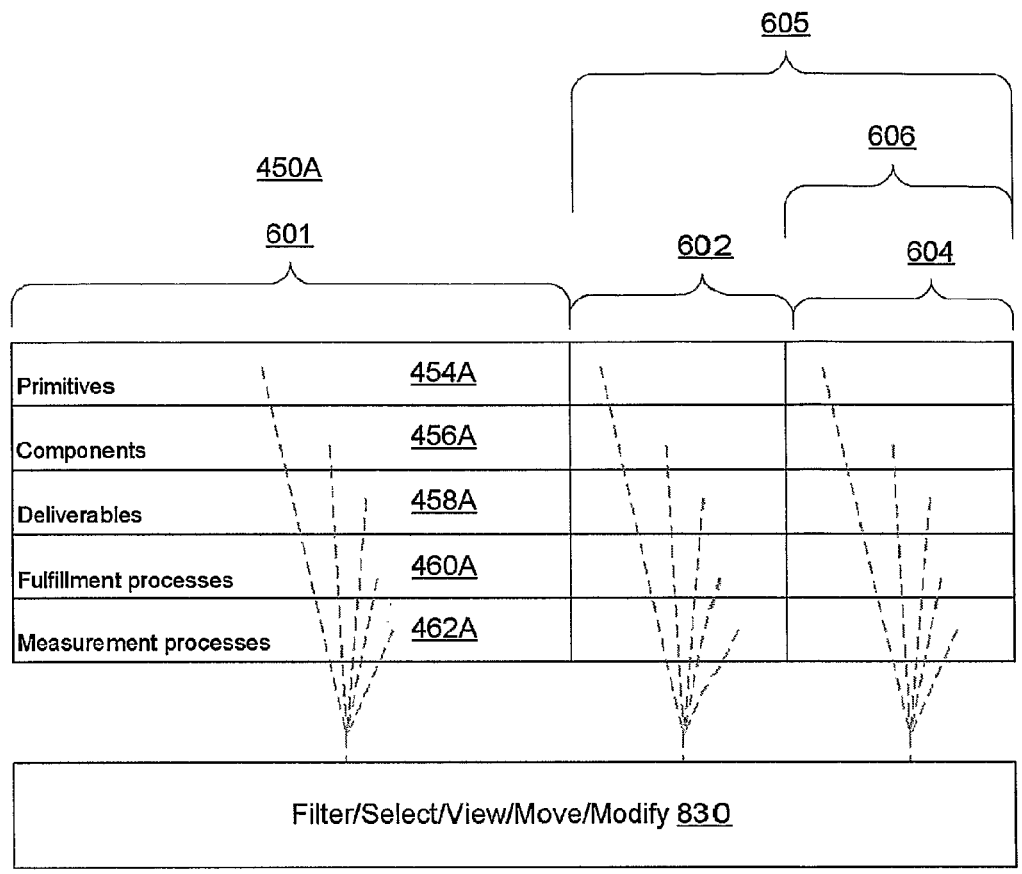
FIG. 16 illustrates a mechanism for refining a view of an inventory space by controlling a filter according to an embodiment of the invention.
Figure 17:
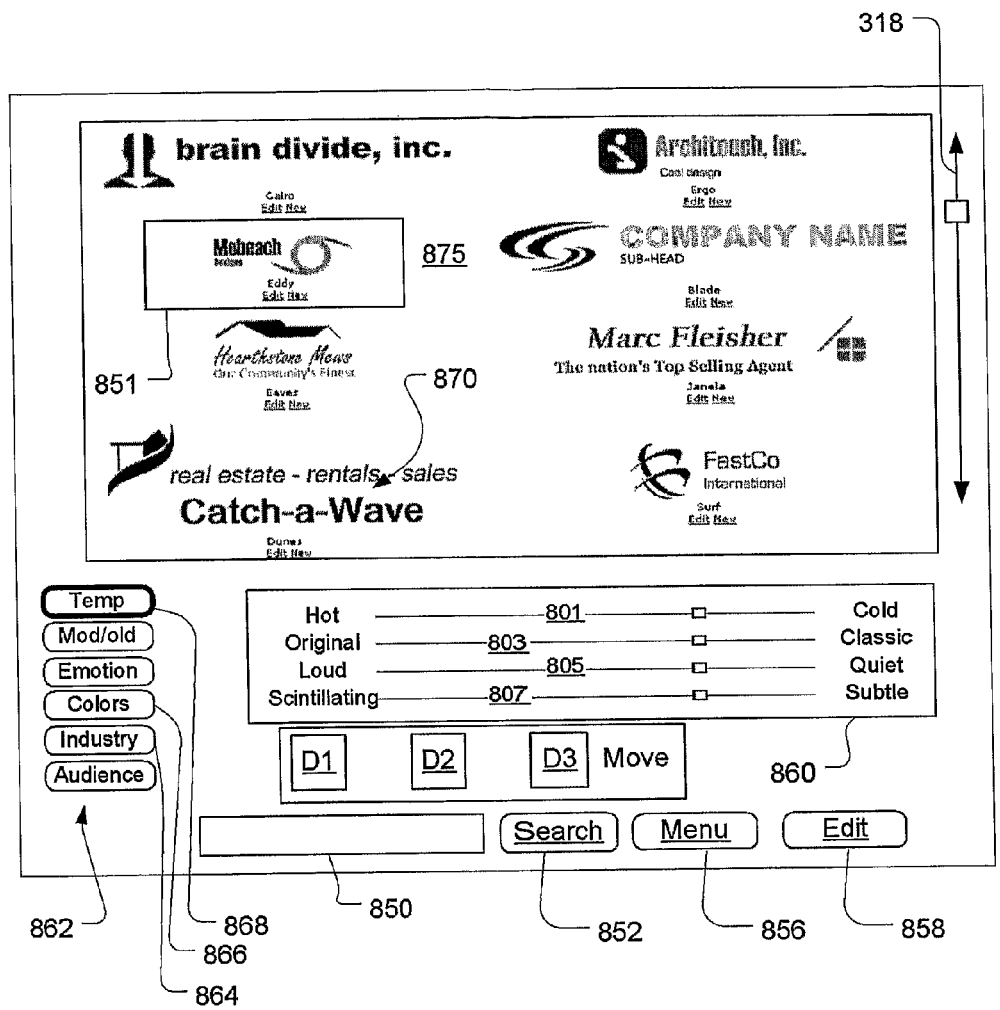
FIG. 17 illustrates a display of a user interface that is compatible with the embodiment of FIG. 16.

Referring now to FIGS. 16 and 17, selecting, transferring, and editing of objects in the data domain may be employ filtering mechanisms such as discussed with reference to FIGS. 11, 14, and 15. Each of these devices used for modifying (or as described, substituting) may also be used for providing a temporary filtered view of the objects stored in the data domain. A user interface process 830, an embodiment of which is illustrated at FIG. 17, generates a display of objects 875 selected based on various controls. For example a control 860 such as described with reference to FIG. 15 with sliders 801-807, etc. may be used to filter a current data set of the data domain 450. The set to be filtered may be selected from among the subdivisions 601, 602, and 604 by selecting a respective control D1, D2, D3. The resulting filtered set appears in the display window 875. Other control sets, by means of respective controls 862, may be employed in combination or instead of the controls 860 shown. Also, a search can be performed using key words or other types of text descriptors using a text control 850 and search button 852.

The filtering process 830 described immediately above and elsewhere may include selecting objects by comparing a selection profile generated by the user interface and selecting for display only those that match the criteria in the profile. Alternatively, the process 830 may also include applying selection profile properties to objects stored in the data domain to alter them such that they better match the criteria. For example, the user may select a color control selector control 866 to bring up a color selection control similar to that shown at 708 in FIG. 11. This step may be included in a selection profile along with other criteria such as may be made by way of sliders in control 860. When the selection profile is applied, a color indicated in a property of candidate objects in the data domain may be changed to match the color indicated in the selection profile. Of course this applied to other properties as well and as contemplated in the discussion of warping and other high level editing devices, above.

Thus, the selection profile may be applied to both filter and modify objects in the data domain. The selection profile may limit the selection set to one or more subdivisions 601, 602, 604 as well. The filtering process may also support the reclassification of objects such that they reside in a different subdivision 601, 602, 604. The filtering process may provide a temporary view, for example if a user is working on a design and requires source material for it. Automatic selection profile criteria may be incorporated in any selection profile by drawing upon information about the user, the user's application, industry, or other information incorporated initially or over time in the user's profile data 62 (FIG. 2A), 100 (FIG. 2B).

Note that in the discussion above, although references are made to the process of moving data from one place to another, such as from one subdivision 601, 602, 604 to another, it should be borne in mind that this is a figurative description and is not necessarily specific to actual storage of the moved content in a different location.

FIGS. 18A, 18B, 18C, 18D illustrate an embodiment of a procedure for allowing users to select, purchase, and temporarily lock or rent assets, such as graphic designs, logos, web site templates, etc.

Figure 19:
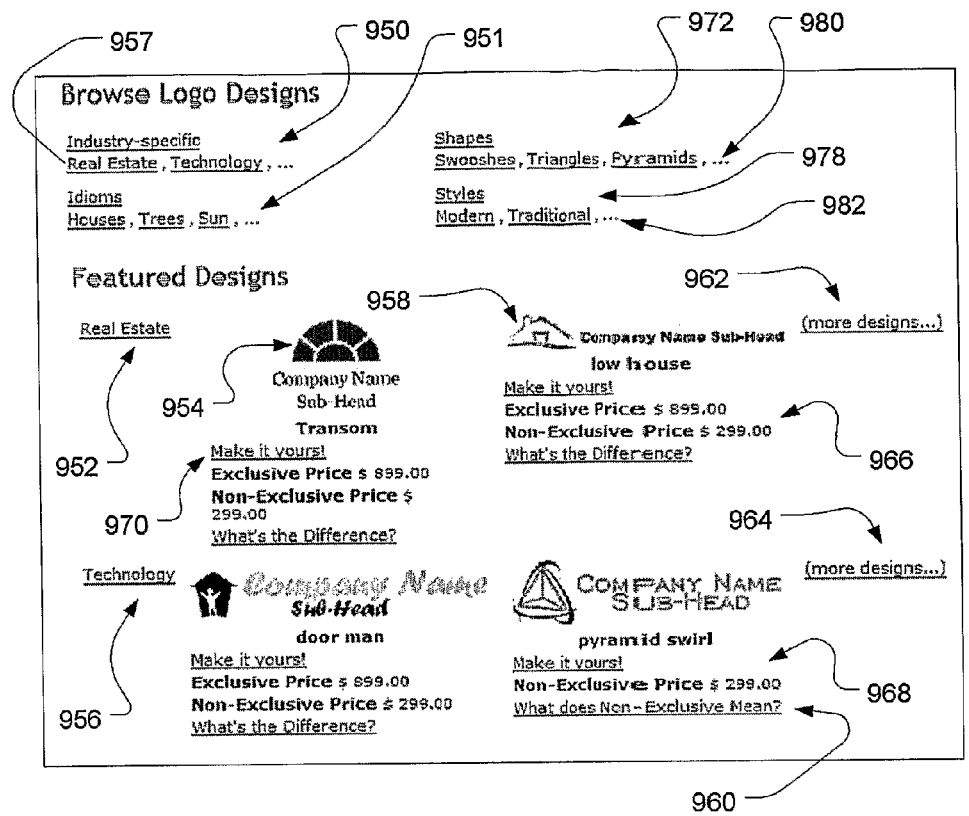
FIG. 19 is a screen display showing a top level-view state of a logo browsing operation to illustrate various features of embodiments of the invention.

FIG. 19 is a screen display showing a top level-view state of a logo browsing operation to illustrate various features of embodiments of the invention.

Figure 20:
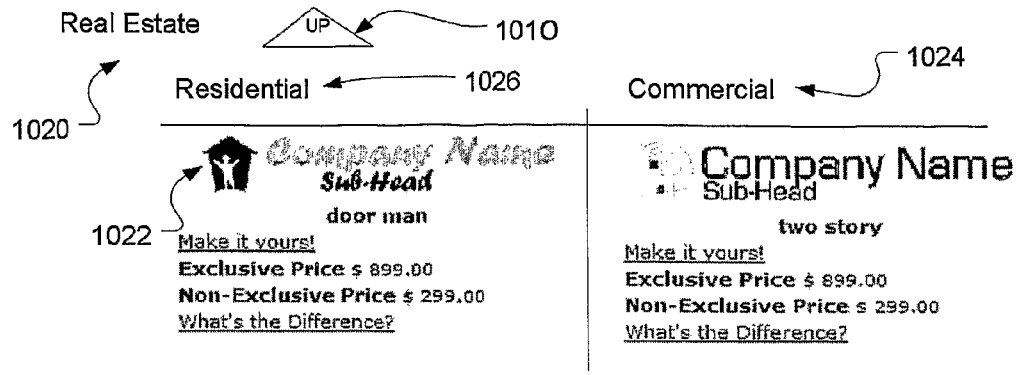
FIG. 20 is a screen display showing a middle-level view state of a logo browsing operation to illustrate various features of embodiments of the invention.

FIG. 20 is a screen display showing a middle-level view state of a logo browsing operation to illustrate various features of embodiments of the invention.

Figure 21:
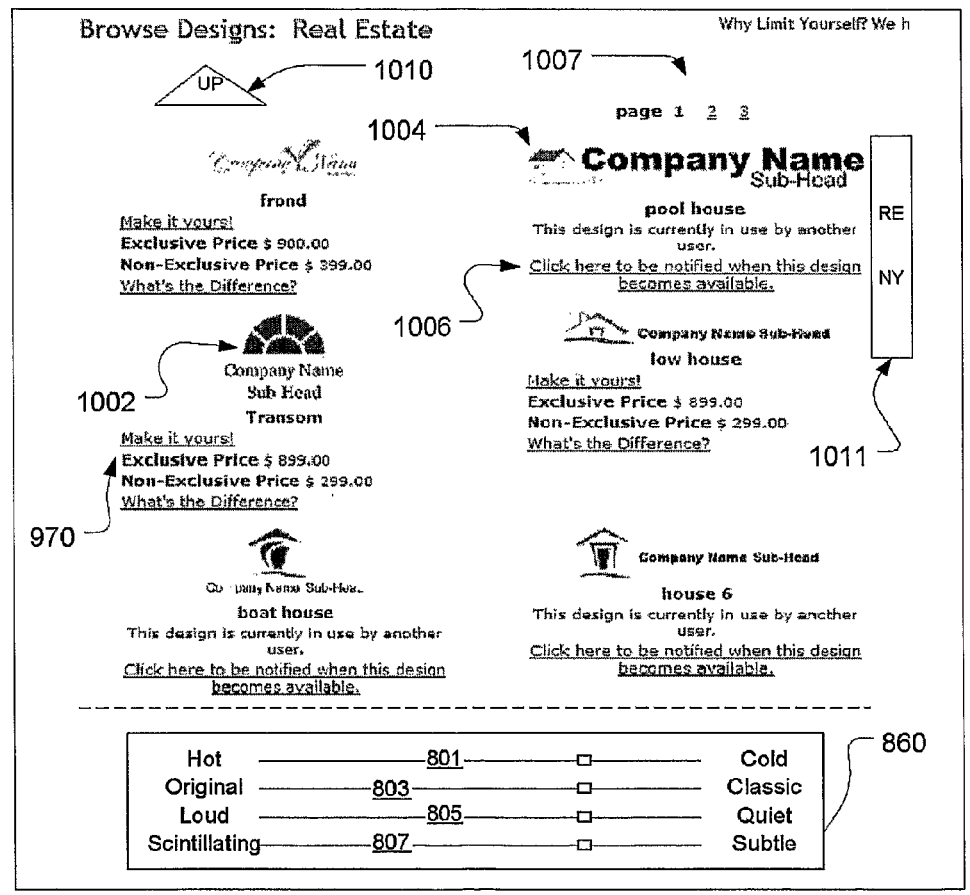
FIG. 21 is a screen display showing a bottom level-view state of a logo browsing operation to illustrate various features of embodiments of the invention.

FIG. 21 is a screen display showing a bottom level-view state of a logo browsing operation to illustrate various features of embodiments of the invention.

Figure 22:
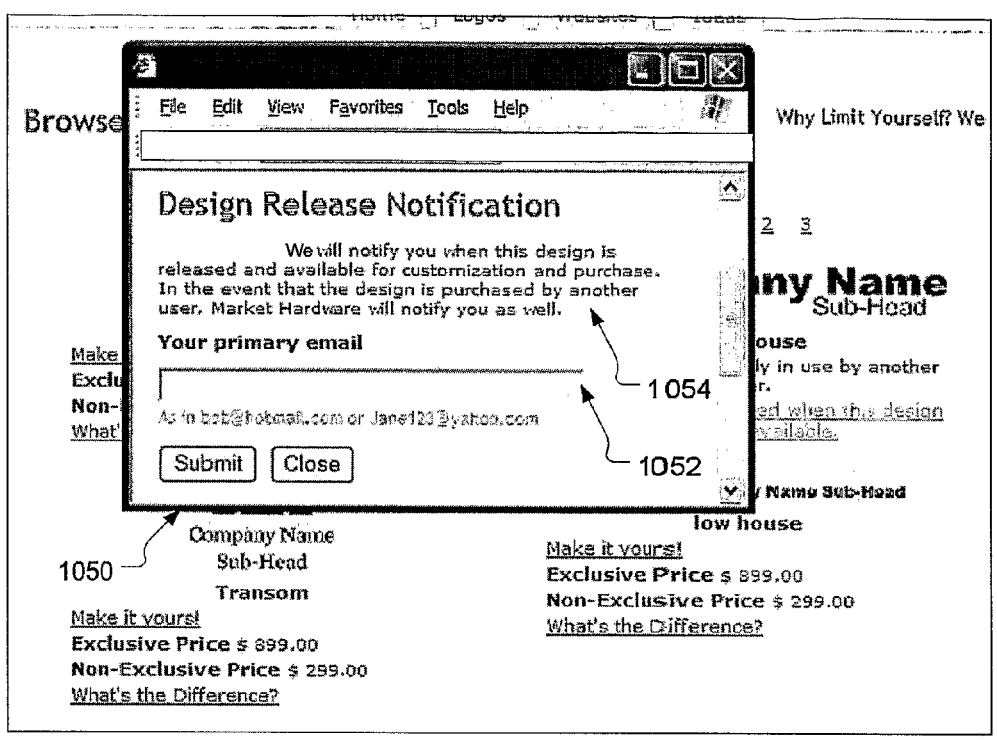
FIG. 22 illustrates a dialog for requesting notifications relating to assets that are currently being reviewed by other users to ameliorate a conflict.

FIG. 22 illustrates a dialog for requesting notifications relating to assets that are currently being reviewed by other users to ameliorate a conflict.

Figure 18A:
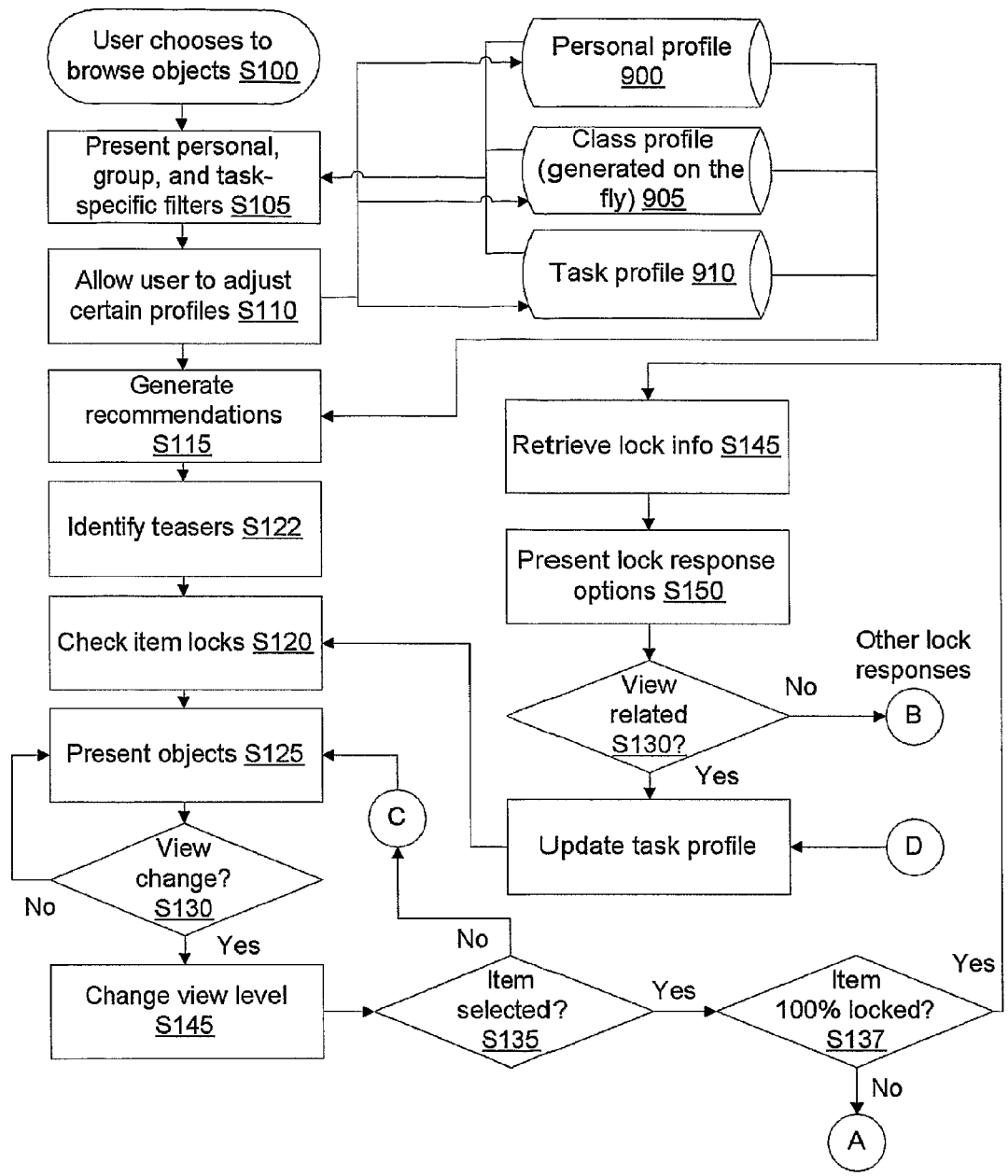
FIGS. 18A, 18B, 18C, 18D illustrate an embodiment of a procedure for allowing users to select, purchase, and temporarily lock or rent assets, such as graphic designs, logos, web site templates, etc.
Figure 18B:
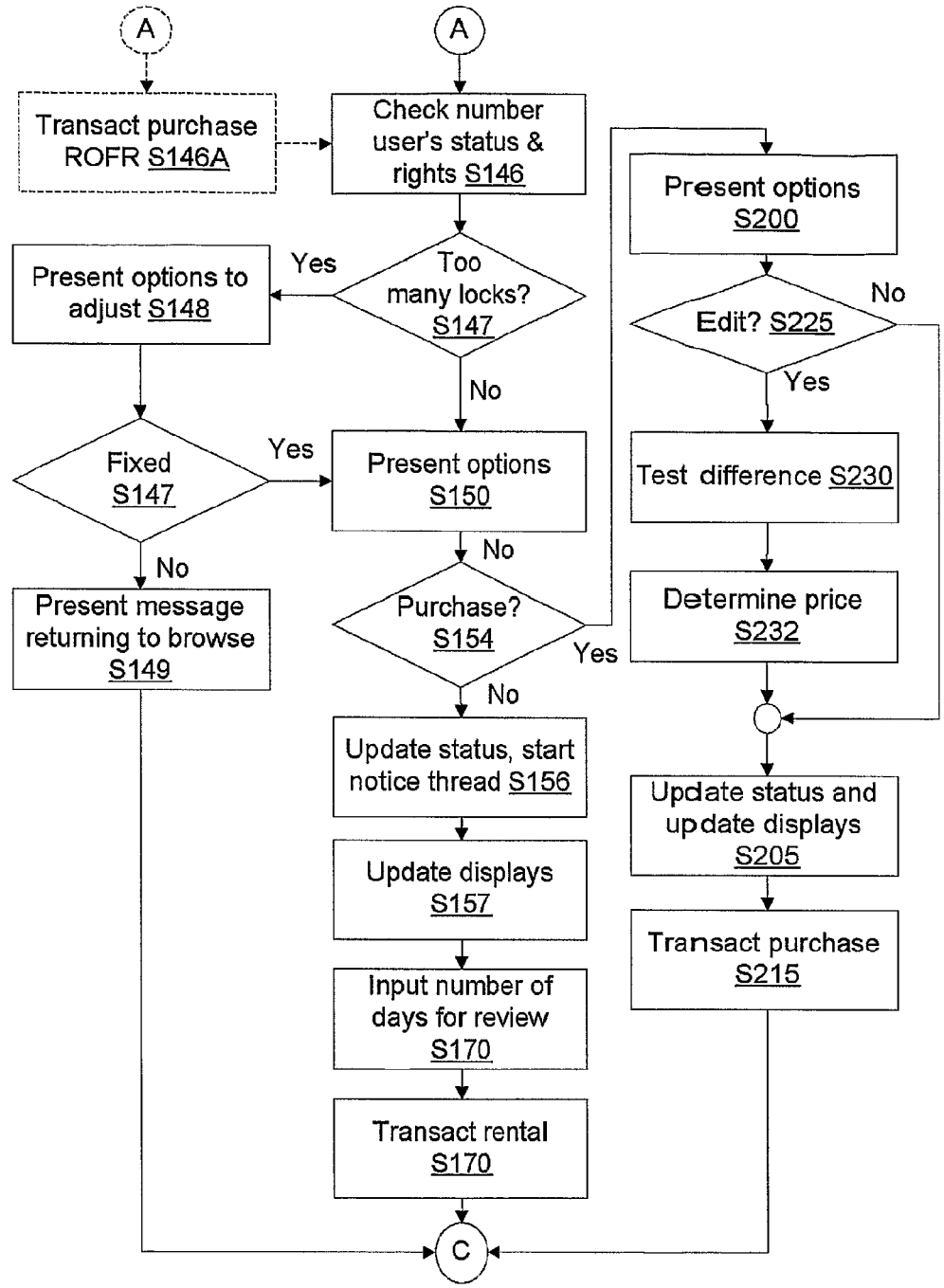

Referring now to FIG. 18A, a user may choose to browse objects at various points in the software system described above. The flow chart of FIG. 18A illustrates an example procedure for illustrating various subprocesses that may be used to manage the sale, renting, review, etc. of objects by customers. As described above, users can select objects for review and/or purchase. For example, as discussed with reference to FIG. 10A, a user may tentatively select a certain object and use it in a mockup design of various assets such as brochures, web sites, etc. However it is undesirable if another user were to purchase that design while the first user was considering it, and in fact putting a lot of time and energy into evaluating it. So a mechanism may be needed to allow an object to be locked to allow one user to work with it and consider it before actually purchasing it. Such a lock would prevent others from making the object unavailable by purchasing exclusive rights to the object from the web site host/vendor.

Before discussing locking and purchasing objects, one alternative approach may be mentioned. This would be a dummy object or place holder that takes the place of an as-yet unselected object for purposes of working out and reviewing an overall scheme for a brochure, truck stencil, postcard, web site, direct mailing campaign, etc. Such a dummy object could, of course, be generic. But a range of dummy designs, which are not available for purchase but free to be used for mockups, could also be provided in the library provided by the web site host/vendor. The user may select one that is moderately close and work with that, as a place-holder, to give the user time to work out other aspects of assets on the site before selecting or creating one for purchase.

In step S100, a user begins by starting a browsing session in which the user reviews objects that are for sale. In step S105, the system presents content from the library of objects filtered by one or more profiles that have been adjusted by the user either directly or passively. The profiles 900, 905, and 910 are discussed with reference to previous embodiments, one being a personal profile 900 indicating various preferences such as the user's industry or style preferences. Another profile is a class profile 905 which may be derived using collaborative filtering from the personal profile 900 information. A third profile is a task profile 910 which is specific to a browsing session (but which may be saved by the user wishing to pause a browsing process). The task profile 910 may be populated with specific selections such as a selection of a branch of a categorical menu tree such as discussed below indicating the user wishes to browse designs for logos that are classified as being well-matched to a particular industry. The latter may not match the industry in the user's personal profile 900, hence the presence of a task profile 910.

As discussed above, each object in the library may be tagged to indicate its characteristics. For example, each may be ranked by a vector having the dimensions industry, temperature, and shape to indicate the industry to which the object may be deemed most suited, the color temperature of the object, and the dominant shape of the object. The three profiles may be used to generated filter that is any of a variety of known types of search filters for selecting and ranking the library contents using the values in this description vector. The values provided in the various profiles may be given various predetermined weights in deriving a filter, for example the search may place the greatest emphasis on the task profile 910 or only use other profiles if the task profile is silent with regard to a dimension of the search vector.

In step S110, the user may be provided with a presentation of any or all profiles 900, 905, and 910 to allow them to be adjusted. In step S115, the search is performed on library contents in anticipation of presenting the results for inspection in step S125. Before presenting results, the system may check to identify any contents in the search result that are currently unavailable due to locking (under consideration by other users), which is discussed below. This may be done at step S120 and in response, the display of locked objects may be modified such that their locked status is indicated, for example by ghosting or displaying them in gray scale rather than a normal colored image. The system may also, in addition to or as an alternative to populating the task profile at steps S105 and S110, present the search results in the form of a hierarchical tree menu with samples (teasers) from each grouping. The latter may be identified (step S122) and displayed along with indications of the menu choices. Examples to better illustrate the idea are shown and discussed with reference to FIG. 19. Step S122 may be selected based on various criteria and this is a design choice of the system implementer. For example, the samples may be selected by a pattern recognition engine that attempts identify features of the most popular objects being reviewed by users in the given category or they may be selected based on manually-added tags.

In step S125, various objects and/or menu controls may be displayed. The controls may allow the user to navigate higher or lower in a menu hierarchy or change filter settings by various means, for example as discussed previously with reference to FIG. 17. If a view change is indicated, in step S130, the display may be updated at step S145. If a view change selection is attended by or indicated by the selection of a particular object, at step S135, the system may determine if the selected object is locked at step S137. If an object is not selected at step S135, after the view update at step S145, step S125 may be re-executed to display a new current view state which may coincide with a different view level or search result depending on the type of view change indicated by the user.

If it is determined at step S137 that the selected object is not locked, at step S146 a current user's rights to review or purchase the object are reviewed prior to presenting options to the user that relate to the purchase or review the object. To prevent a single user from locking up many objects in the library, a limit may be imposed on the number of objects each user may lock at a given time so if as a result of a check at step S146, it is determined in step S147 that the user has reached (or is approaching) his limit on locks, the user may be presented with an indication that his limit has been reached and, at step S148, be given various options. For example, the user may be provided the option of upgrading his account which may provide for review-locking a larger number of objects. This may be suited where the user is a reseller of intangible media assets working on materials for multiple clients. Another option that may be presented in step S148 is to allow the user to drop a currently-locked object in favor of the currently selected object. The user may be presented with a representation of the locked objects and controls to allow an object to be selected for release.

An item may be automatically locked at the time that an editor session is opened to work with an object. Alternatively, the user may be presented with the option of locking the object or not. For example, a user that is just testing the system or not seriously considering a particular design may work with it in an editor without locking it.

User's may be provided the ability to bid on the purchase price of objects. This only makes sense if the object is not immediately available for sale or if it is offered for sale only to bidders. One possibility is for a locked or held object to be unlocked or removed from hold upon a bid of threshold amount which may be determined by the locker or holder based on a fee paid for a right of first refusal paid by the locker or holder. The system could attach a fee to locking or holding or a requirement for a deposit toward a future purchase. The user to specify an amount he will pay to keep the object locked if another user wishes to buy it. For example, this amount could be, say, one dollar, to retain the right of first refusal in the face of a purchaser willing to pay twenty times that amount. Or the user could pay more for a right of first refusal in the face of a higher amount. These may be implemented by conventional programming techniques in an alternative step S146A illustrated with broken lines.

With regard to temporary locking and purchasing of objects, the rights and encumbrances relating to each object may be divided by submarket. A user may purchase or lock an object for purposes of a particular product or service area, for example, residential maintenance services, real estate services, or product areas. The markets may be divided also by geographical region as well. These considerations of markets and rights in objects may or may not have anything to do with trademarks or service marks. The user may purchase rights in an original image provided by the service provider without any rights to use that mark being guaranteed. So just the fact that a user purchased rights in an object does not mean that the user would have a legal right to use it since the use might lead to trademark confusion. Preferably, however, the service provider would use original material and be capable of providing some documentation on the originality of the objects such that assurances against copyright infringement may be given.

Since the nuisance comes from interference with the use of the library by other users, the impact of locking an object can be ameliorated by narrowing the market or range of markets for which rights are contemplated to be purchased, by reducing the number of locked objects, or by reducing the amount of time each object will be locked. So, the options presented in step S148 may include the release of the lock for all but one market contemplated by the user or a change in the amount of time an object is to be locked or by releasing one or more objects from consideration. A total score may be derived from the portfolio of locks by the user through a control panel presented to the user and the user can make adjustments to allow the user to overcome the overage detected in step S147.

If the user overcomes the problem in step S147 by eliminating the overage and/or threat of an overage, step S150 is executed in which the user may select what kind of lock (full or submarket and how many days) is desired. Alternatively, these options may be presented with the portfolio of pending locks in step S148 allowing step S150 be combined with step S148. The options in step S150 or step S148 may include purchase, detected at step S154. If an object is to be purchased, step S200 is executed. If not, at step S156, the lock portfolio is updated according to any changes made and a notice thread is initiated. The purpose of the notice thread is to maintain a countdown timer to limit the amount of time a user can maintain a lock. Also, notifications are given (a countdown) to waiting users and to users who benefit from the locks. These are discussed further below with reference to FIGS. 18C and 18D.

If an object is to be purchased at step S154, various purchase options, such as submarkets, are presented. If, at step S225, it is determined the object has been edited, the difference between the edited version of the library object may be evaluated at step S230. This may be done by image-processing techniques to determine how much of the original object is still present in the edited version. If the user has made a lot of changes, the difference may be substantial and the corresponding diminished impact on the library contents may be reflected in a lower price to the purchaser. The reduced price may be calculated at step S232. The status of the object in the library may then be updated in step S205 and corresponding displays revised accordingly to reflect the changes. Then, at step S215, the purchase may be transacted in a suitable manner for online purchase of goods or services.

Figure 18C:
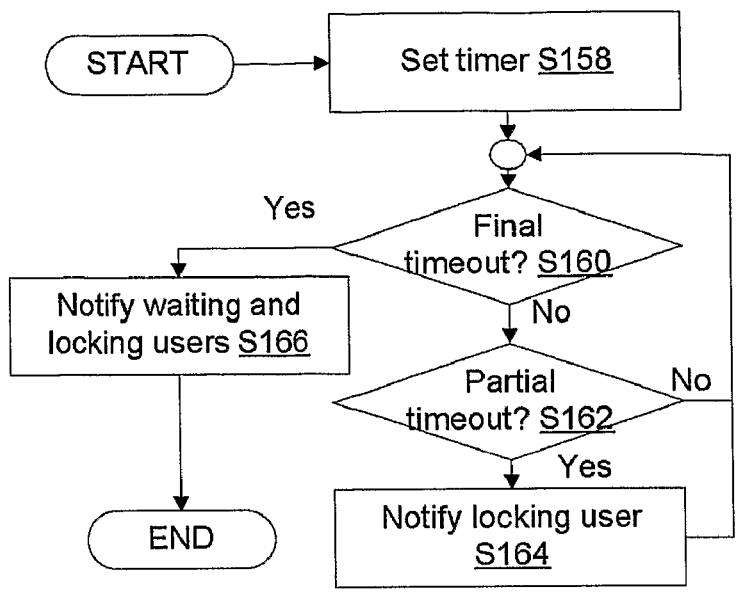

Referring to FIG. 18C at any point that a lock is established or a lock is released or updated, a timer thread may be generated or modified to notify the locking user of the countdown to a time when the lock will be automatically released. In addition, waiting users in a queue, discussed with reference to FIG. 18D, may be notified as well. In step S158, a watchdog timer is reset to zero. In step S160, the timer is compared to a predetermined final time beyond which the object may not be locked. If the timer has reached this predetermined time, at step S166, the waiting and locking users are notified, for example by email or the next time they log into the system. A set of notification reminder times (threshold times) may be established such as one week before the final time for release of an object has elapsed and one day before. A test for reaching these times can be made at step S162. If a threshold time is reached, the users may be notified in step S164. If not flow returns to step S160. If the watchdog timer lapses completely users are notified at step S166 and the thread terminates. This is what happens if the user runs out of time. The timer lapses and other users are notified. The design will then be removed from the user's account and be made available to inventory for other users to lock or purchase. This all happens in the last step S166.

Figure 18D:
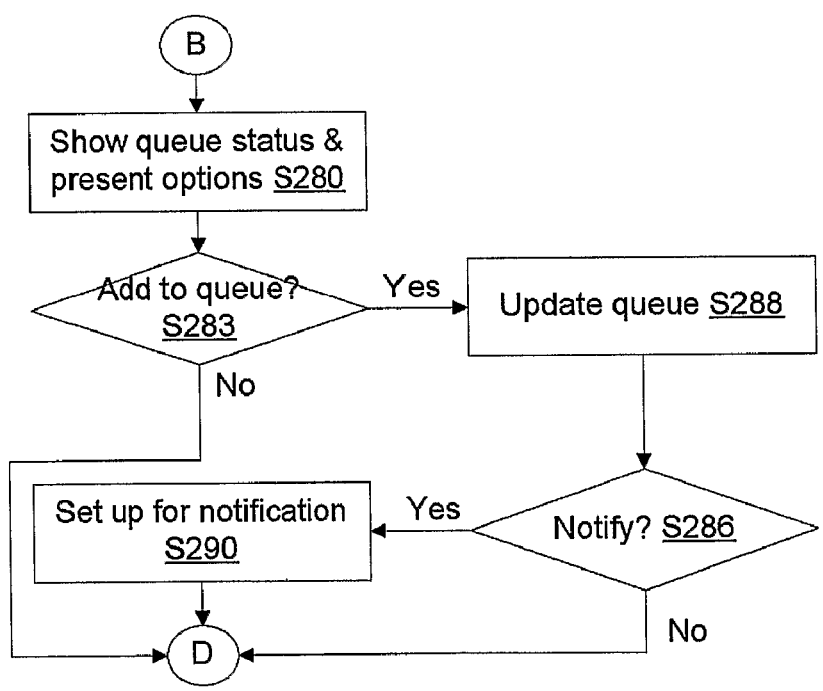

Referring now to FIG. 18D, if at step S130, the user does not wish to view related objects, a queue status for the selected and currently locked object is presented in step S280. The user may register to be added to the queue of waiting users and to be notified in turn as the object becomes available. If the user chooses to be added, at step S283, the queue is updated at step S288. The user is then allowed to request to be notified. The user may be given the option of what points in time the user wishes to be notified in step S290. If the user chooses not to be added, the control flow returns through node D. The decision node S286 may be a decision inputted by the user or made automatically by the system according to a default profile or the user's profile or some other way of setting options or preferences. In embodiments, users may be permitted to pay to be placed on top of a queue or permitted to bid on the places in the queue.

Referring now to FIG. 19, an example of a top level display for a hierarchical browse menu is shown. Links for various categories of objects, in this example, logo designs, are shown at 950, 951, 972, and 980. For example, industry-specific categories are clustered at 950, idioms or themes are grouped at 951, dominant shape and style categories are shown at 972 and 980. These categories are illustrative and not limiting. Several featured designs, e.g., the ones at 954 and 958 and others, may be shown with their respective category headers 952 and 956. Respective controls to expand the categories, for example the ellipses at 980. 962 or the text link at 962 and 964 are provided. The displayed examples (954, 958) are called teasers and are representative of the contents or merely represent a visual queue. If the examples are available for review (lock), purchase, or editing, corresponding controls may be provided. A link for editing is shown at 970. To indicate the an object is locked, the image may be ghosted or some other visual indicator may be shown. Similar links may be shown for purchase and review locking or clicking on the image may expose an additional control layer providing any or all of these functions.

Referring to FIG. 20, a middle menu layer is illustrated which shows a selected category 1020 in the form of text control and two subcategory labels 1026 and 1024. The display of FIG. 20 may be generated, for example, by activating the control in FIG. 19 indicated at 957 ("Real Estate" category). Example objects (teasers) may be shown as indicated, for example at 1022 as well as other incidents of the display of FIG. 19 discussed above. The subcategory labels 1026 and 1024 may provide access to the contents of the respective subcategories. Another navigation control indicated at 1010 may allow the user to move to the layer of the browse hierarchy shown in FIG. 19 or similar. One or more middle layers may or may not be provided.

Referring to FIG. 21, a detail display of objects for a subcategory or category as shown in FIG. 21. Here various objects, e.g., 1002, are shown with respective controls. If the examples are available for review (lock), purchase, or editing, corresponding controls may be provided as discussed above. A link for editing is shown again at 970. To indicate the an object is locked, the image may be ghosted or some other visual indicator may be shown. Similar links may be shown for purchase and review locking or clicking on the image may expose an additional control layer providing any or all of these functions. A control to add the user to a notification queue for a locked object is indicated at 1006. An alternative control indicated at 1011 may be provided to show submarkets that are locked if the differentiation of object locking by market is provided. If either control is selected, a dialog box can be generated to allow a user to be notified. See FIG. 22, for example the dialog at 1050, where a simple text box control 1052 and explanatory text 1054 are provided to enter an email address for notification. More detail can also be provided such as allowing the user to see which markets are locked and to select one or more for locking or purchase. A navigation control for changing pages 1007 may also be provided to review a large "list" of content. In addition to navigating categories, the user can apply a filter (using controls 860) as discussed earlier with reference to FIG. 17 to filter the displayed "list" of objects or to morph them as discussed.

Referring now to FIGS. 23A-23K, the status of objects in the system—with regard to their availability—may be controlled automatically through user interaction. The above figures each shows a transition in the user interface juxtaposed with the possible transitions of a particular object's state, depending on the object's initial state. For example, in FIG. 23A, the states of user interface are shown on the left. The user interface can be in a browse mode as indicated at 1, an inspection mode as indicated at 2, or an edit mode as indicated at 3. Four other transitional modes may be provided, namely, exclusive 6 and nonexclusive 7 purchase of the object and release 4 and save 5 to a user's personal library area. The following list describes the meanings for these states.

Browse—The user interface displays one or more objects and makes some information available about each so that a user can determine if further inspection is desired. The browse mode may be a search query control and search return list or a menu driven format such as described elsewhere in the instant specification or other known format.

Inspect—The user interface provides the ability to indicate a particular object or objects and additionally may show details about it or them. The inspect mode assumes that one or a subset of the objects available in the browse mode has been indicated as a selection for further inspection or another operation, such as editing or purchasing.

Edit—The user interface gives the user the ability to make changes to a selected object indicated in the inspect mode.

Release—A temporary state, such as attended by a dialog box, to allow the user to indicate that an object (or objects) that is (are) currently being held in a reserved area. For example, the user may desire to consider whether to purchase an object and during the time of contemplation, hold the object in reserve such that other users cannot purchase it first. The release state is a transitional state the user may invoke to indicate to the system that the object or objects are to be made available to other users.

Save—The user interface allows the user to place the object in a reserved status as discussed above. This is also a transitional state. The save state may also indicate, depending on context, the user's desire to preserve changes made by editing an object. For example, the latter may correspond to the "selected for use" status discussed with reference to FIG. 10B.

"X-Purch" (Exclusive Purchase)—The user interface provides a temporary transitional state, such as attended by a dialog box, to transact the purchase of the selected object for his/her exclusive use. The presumption is that the host will delete the object from the system once this type of purchase has been made, however, this may or may not involve any guarantees of exclusive rights to the object(s) in a legal sense.

"NX-Purch" (Nonexclusive Purchase)—The user interface provides a temporary transitional state, such as attended by a dialog box, to transact the purchase of the selected object for his/her exclusive use. The presumption is that the host system will not delete the object from the system once this type of purchase has been made so that others can purchase the object non-exclusively as well. Again, this may or may not involve any guarantees of any rights to the object(s) in a legal sense.

The following states apply to the (selected—if one or more are selected) object or objects.

Hold—The object(s) is(are) is being reviewed or edited by a user and is to be made unavailable to other users to avoid interferences with the user's expectations. The purpose of the Hold state is to give a user who is inspecting or editing an object temporary exclusive access to the object so that his expectation of being allowed to purchase is not spoiled by the activities of an interloper. The Hold state is similar to the Locked state except that it is shorter term and maintained automatically and only during pendency of some process such as during editing.

Lock—The object(s) is(are) is being reviewed by a user and deliberately held for exclusive access by the user for a period of time, presumed to be one in which the user is contemplating purchase, setting up a scheme employing multiple objects, etc. In this state, as in the Hold state, the object is to be made unavailable to other users to avoid interferences with the user's expectations. The purpose of the Locked state is to give a user exclusive access to the object so that his expectation of being allowed to purchase is not spoiled by the activities of an interloper. The locked state is similar to the Hold state except that it is longer term and does not necessarily coincide with a particular software process.

Free—The object is available for any use to any user.

"NX sold" (Nonexclusively sold)—The object is nonexclusively sold. When this status pertains, the object is available for nonexclusive purchase, only. Any user trying to edit or view an object in the "NX Sold" state may be provided a message to indicate this encumbrance on the object's availability.

Removed—The object is essentially non-existent. If an object has been purchased exclusively, its status will be changed to removed. The "removed" state is a heuristic and does not have to coincide with a process or state of the host or client software system for the following description to be meaningful. It is a useful state definition for discussing the disposition of objects and the changes thereto. Thus, a purchased object may be deleted and therefore nonexistent and the label of a "removed" state would still apply in such a context.

Figure 23A:
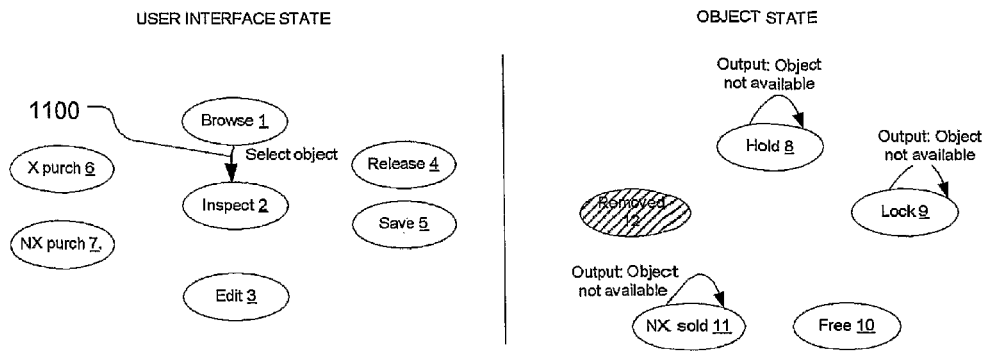

Referring now to FIG. 23A, the arrow indicated at 1100 indicates that a user has selected an object while in the browse state 1 and transitioned the user interface to the inspect state 2. This may occur if the user indicates a selection set or, in addition, takes some other action, such as indicating through a suitable control a command to see more details relating to the selection set. On the right side, the response of the system, with regard to the selected object's state, is shown. If the object is in the Hold state 8, the object will remain in the Hold state 8, but the system may tell the user that the object is in a Hold state. The latter may be done, for example, by generating a message to create a dialog box instance with the appropriate text message. If the object is in the locked state 9, the object will remain in the Locked state 9, but the system may tell the user that the object is in a locked state. Again, the latter may be done in a fashion similar to that for the Hold state 8. If the object is in the locked state 9, the object will remain in the Locked state 9, but the system may tell the user that the object is in a locked state. Again, the latter may be done in a fashion similar to that for the Hold state 8. If the object is in the "NX sold" state 11, the object will remain in the "NX sold" state 11, but the system may tell the user that the object is in that state. Again, the latter may be done in a fashion similar to that for the Hold state 8. In a preferred embodiment, no messages need be generated for the Free 10 and Removed 12 states. In the Removed 12 state, the object may not be available for selection and so this initial state may not be permitted as indicated by the hatching of state Removed 12.

Figure 23B:
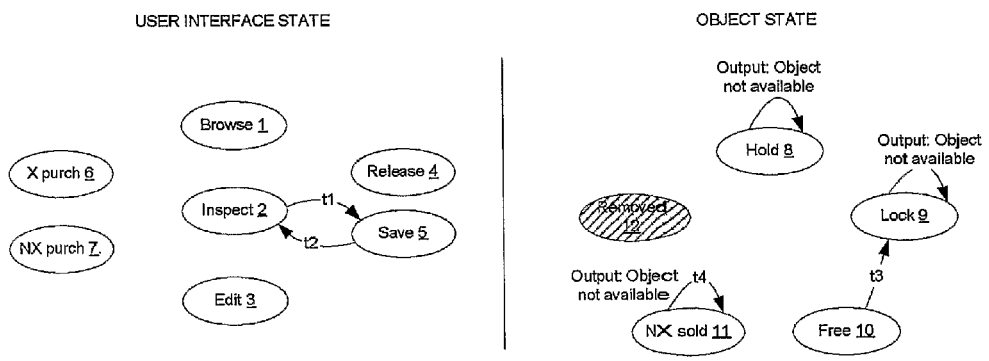

Referring now to FIG. 23B, after an object is selected in the user interface space, a transition t1 to the Save state 5 is indicated and a return transition t2 to the Inspect sate 2. This may correspond, for example, to the invocation of a command by the user to save the selected object to the user's personal area or a command simply to provide exclusive access to the object. As mentioned above this may be useful to give the user breathing room to contemplate whether to purchase the object or otherwise make a commitment with respect to it. The process depicted in the user interface state diagram, from the user interface perspective, may be implemented as a command to invoke a dialog to confirm the user's wish to save the object so that the Save state 3 coincides with the display of a temporary dialog box and the return transition t2 is invoked immediately upon completion of the command.

In the object state diagram, the same events may take place as in the situation depicted in FIG. 23A except that if the object is initially in the Free state 10, the object will be transitioned to the Locked state 9 as indicated by the arrow t3. If the object is in the Hold state 8, the object will remain in the Hold state 8, but the system may tell the user that the object is in a Hold state. If the object is in the Locked state 9, the object will remain in the Locked state 9, but the system may tell the user that the object is in a Locked state. If the object is in the Locked state 9, the object will remain in the Locked state 9, but the system may tell the user that the object is in a locked state. If the object is in the "NX sold" state 11, the object will remain in the "NX sold" state 11, but the system may tell the user that the object is in that state. In a preferred embodiment, no messages need be generated for the Removed 12 state. In the Removed 12 state, the object may not be available for selection and so this initial state may not be permitted as indicated by the hatching of state Removed 12.

Figure 25:
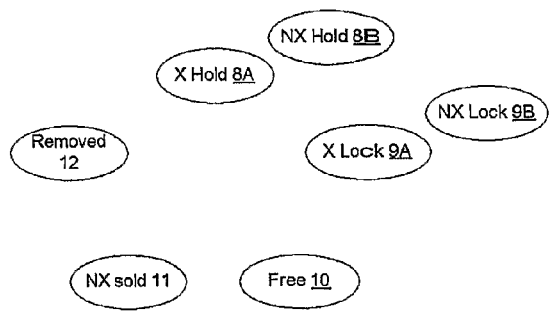
FIG. 25 illustrates set of states for another embodiment of an object.

There are some presumptions that underlie the situations illustrated in FIGS. 23A and 23B. One is that when a user selects an object whose initial state is Free 10, the object is locked (put in the locked state 9). This assumes that the user wishes to reserve for himself the option to obtain exclusive rights to the object; i.e., to purchase it exclusively. In an alternative embodiment, this is not presumed and the user may be given the option of saving the object to his personal user space while he contemplates purchasing it for nonexclusive use. In that case, during the pendency of the locked state 9, other user's may save the same object to their user spaces but they should be notified that the object may not be available for exclusive purchase. The uncertain status only obtains while the first user contemplates purchasing it for nonexclusive use. Referring momentarily to FIG. 25, in such an embodiment, it would be preferred to have nonexclusive hold 8B and locked 9B states in addition to exclusive hold 8A and locked 9A states defined. To simplify discussion, these nonexclusive hold and Locked states are not included. The user is always provided with the option of exclusive purchase if it is available, but in the alternative embodiment, the user would have a choice. In the following discussion, if exclusive purchase is not possible (i.e., the initial state of the object is NX sold 11), there is no state change as indicated at t4, but a message advising the user of the limitation may be generated as indicated in the state diagram.

Figure 23C:
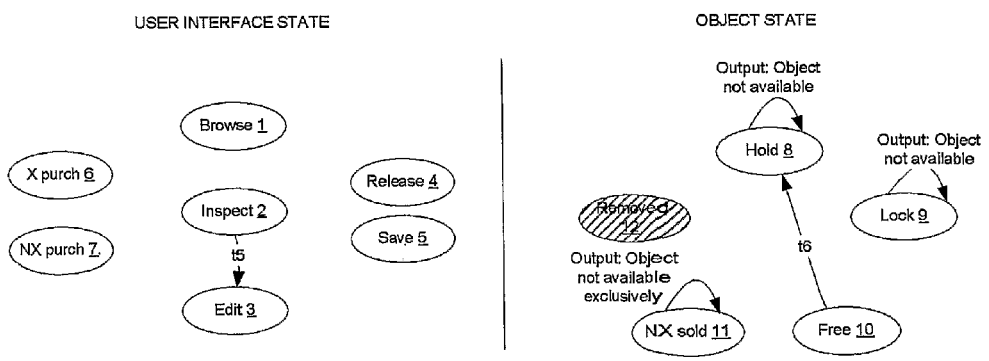

Referring now to FIG. 23C, if a user indicates through the user interface that he wishes to edit the currently selected object(s), an editor (for example as described above) may be invoked and while the object is subject to modification by the user, in the preferred embodiment, the system presumes the user wishes to contemplate exclusive purchase, if possible. Thus, in the object state space, an object that is initially in the Free state 10 is placed in the Hold state 8 as indicated by transition t6. Objects in the Hold and Locked states 8 and 9, remain in those states but messages indicating the unavailability of the object are generated. The Removed state 12 is not permitted as an initial state. If the object is initially in the "NX Sold" state 11, a reminder message may be generated to indicate the object will not be available for exclusive purchase. In the latter case, the object state need not change.

Figure 23D:
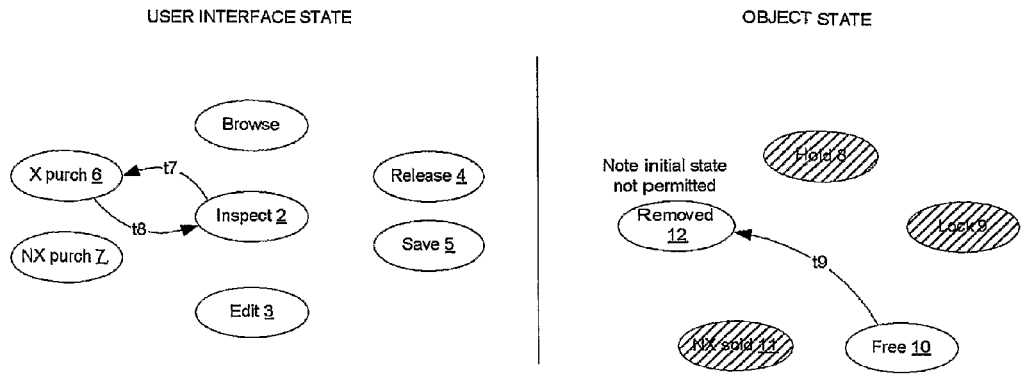

Referring now to FIG. 23D, a selected object is exclusively purchased as indicated by the state transitions t7 and t8. The object state transitions are shown on the right. Initial states for the selected object(s) of hold 8, locked 9, and "NX Sold" 11 may not be permitted. Thus, the user may not be able to select a control to invoke a command to indicate exclusive purchase. The hatching indicates the impermissibility of the initial states. Only if the object is initially in the Free state 10 is it permitted for the user interface transition t7-t8 to occur and in that instance, the object is transitioned, as indicated at t9, from the Free state 10 to the Removed state 12. Again the Removed state 12 may be one in which the object is deleted from the system or it may merely be labeled as (permanently) encumbered by an exclusive purchase.

Figure 23E:
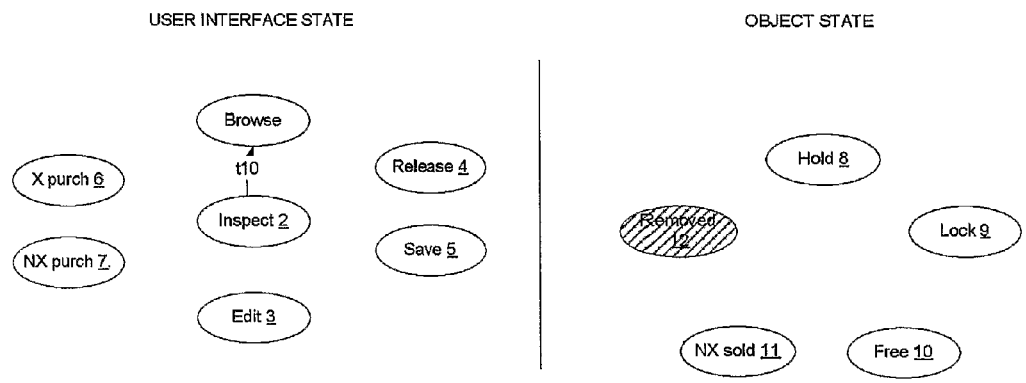

FIG. 23E illustrates a relatively trivial transition t10 in which the user transitions from the Inspect state 2 to the Browse state 1. No changes in object status attends this transition and the initial state of Removed 12 is hatched to indicate that an object in that initial state could not have been selected as presupposed.

Figure 23F:
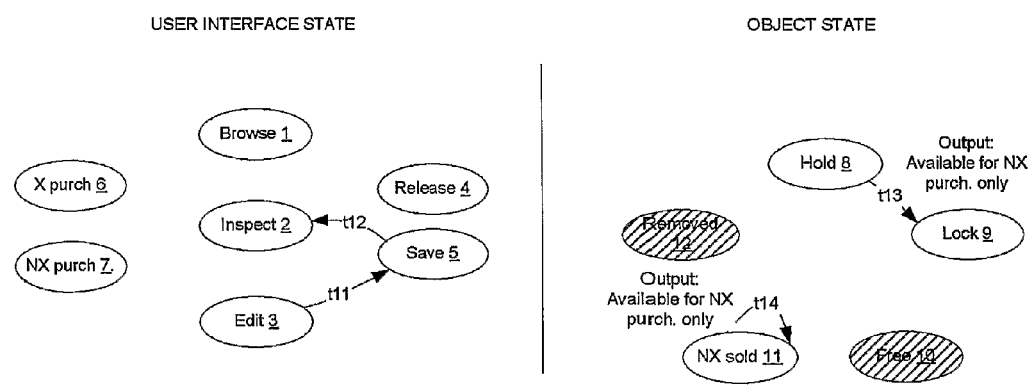

FIG. 23F illustrates a process in which the user is saving a modified version of an object by invoking the Save state 5 (transition t11) and by default, the user interface is automatically taken to the Inspect state 2 (by transition t12). In this figure, the Save state 5 may or may not be the same as discussed with reference to FIG. 23B where an object was "saved" to the user's private area and the user's desire to retain exclusive access to the object was instantiated. In the present case, the user may already have exclusive access to the object so in this respect, the process of invoking the Save state 5 may be dissimilar. However, in the present example, it is presumed the user chose to edit the object by making the transition t5 in FIG. 23C and then, upon saving his edits to the object, also reserved exclusive rights to the object as indicated in the present object state diagram by the transition t13. The hatching indicates that the Removed 12 and Free 10 states are not permitted for the user interface transition illustrated. Note that the diagrams are not comprehensive and that if the object edited is initially in the "NX sold" state 11, the object is not further encumbered by being saved to the user's area or a copy of it being saved there, however, an action would be taken by the system to preserve a copy as altered by an editor. This is not illustrated because the diagrams are intended to teach how the system may control the availability status of objects according to an embodiment. However, the object's initial state may invoke a pertinent reminder as illustrated for loop transition t14.

Figure 23G:
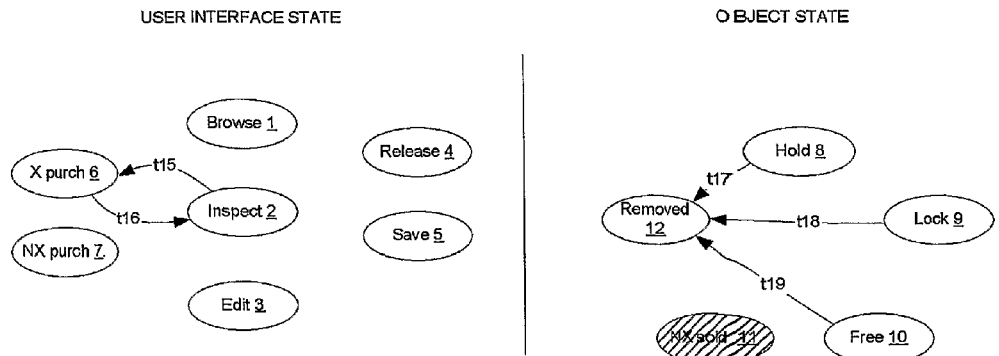

Referring now to FIG. 23G, the user interface is taken from the Inspect state 2 to the exclusive purchase state 6 (transition t15) from which it returns automatically to the Inspect state 2 (transition t1 6). As should be apparent from the above discussion, this would be the situation in which a user upon close inspection of an object has decided to purchase it. The user interface transitions t16-t16 are not permitted if the initial state of the object is Nonexclusively sold 11 so that state is hatched. For all other object states, Hold 8, Locked 9, and Free 10, the state of the object transitions to Removed. The initial states are not possible for any object, however. Only if the user indicating a purchase by the transition illustrated is the same user invoking the Hold 8 or Locked 9 states in the first instance can cause the transitions t17 and t18 as indicated. The alternative is precisely the situation the Hold 8 and Locked 9 states are defined to avoid.

Figure 23H:
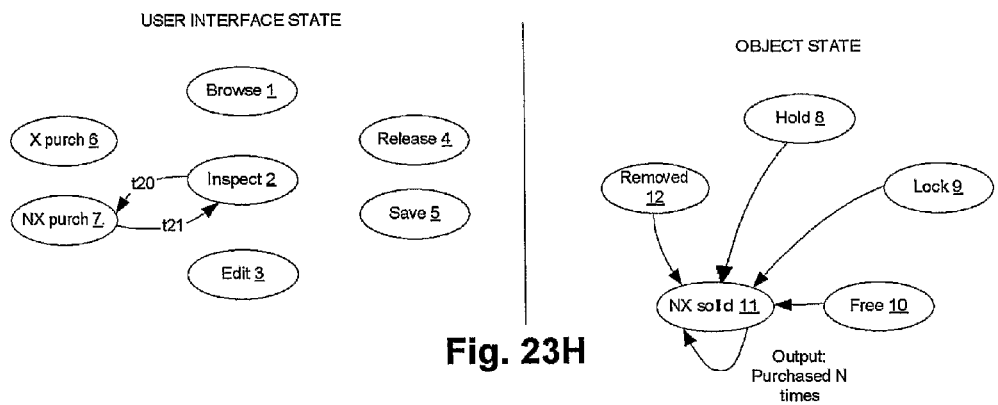

Referring now to FIG. 23H, the user interface is taken from the Inspect state 2 to the Nonexclusive purchase state 7 (transition t20) from which it returns automatically to the inspect state 2 (transition t21). As should be apparent from the above discussion, this would be the situation in which a user upon close inspection of an object, has decided to purchase it. In this case, the user interface transitions t20-t21 are permitted if the initial state of the object is Nonexclusively sold 11. For all the object states, Hold 8, Locked 9, and Free 10, the state of the object transitions to Nonexclusively sold. The initial states are not possible for any object, however. Only if the user indicating a purchase by the transition illustrated is the same user invoking the Hold 8 or Locked 9 states in the first instance can cause the transitions t17 and t18 as indicated. Again, the alternative is precisely the situation the Hold 8 and Locked 9 states are defined to avoid. Note that the Hold 8 and Locked 9 states could not obtain if the object had been previously purchased. If the object had been previously purchased, its state does not change. In an embodiment, the user may be informed of the number of times the object has been Nonexclusively purchased.

Figure 23J:
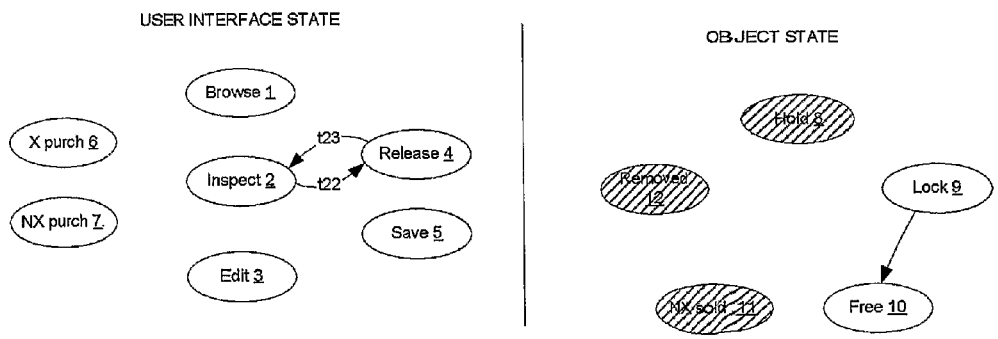

Referring to FIG. 23J, the user indicates a desire to remove an object from his private space or to relinquish exclusive access to an object. The action is illustrated by two transitions from the Inspect state 2 to the Release state 4 (transition t22) and from the Release state 4 to the Inspect state 2 (transition t23), the latter being automatic after a release operation completed during the pendency of the Release state 4. The purpose of the transition is to relinquish the Locked state 9 of the selected object(s) as illustrated on the right side of the figure. The other states are not permitted as initial states.

Figure 23K:
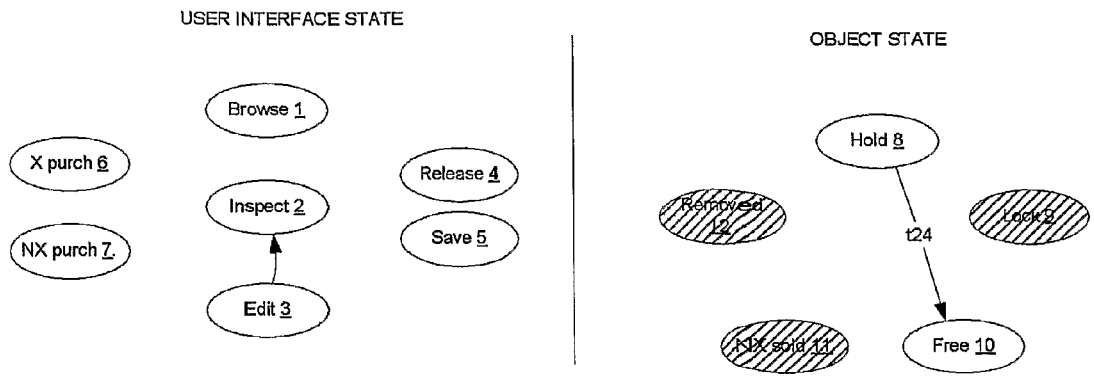

Referring now to FIG. 23K, the user commands the system to take the user interface from the Edit state 3 to the Inspect state 2. The result of this is that the Hold state 8 is released with respect to the object being edited as indicated by the transition t24 from Hold state 8 to Free state 10.

Figure 24:
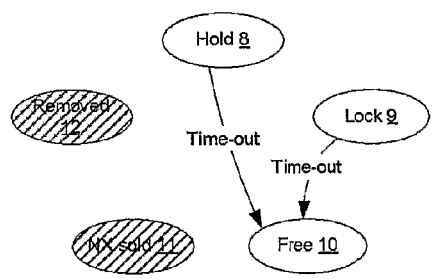
FIG. 24 illustrates a state transition for an object.

Referring to FIG. 24, the Hold 8 and Lock 9 states may be released without direct action on the user's part through the action of a watchdog timer. For example, as discussed above, the period for maintaining exclusive access to an object may be limited. Other limitations may also be defined that cause an automatic transition from the Hold 8 and Locked 9 to Free state 10. For example, if a user attempts to Lock more than a predefined number of objects, they may be progressively transitioned to the Free state 10 according to a First-In-First-Out formula.

Examples of what that may constitute objects for purposes of the above system include: search terms sold by a search engines for banner ad space, advertising pages in a magazine, photo art and other art work, clip art and other media items as used in television, radio, print, etc., options on athletes, The present technique of providing self-administering temporary exclusive rights of may be used in various other contexts. Anything that involves making a commitment, which must be pondered and where the value of the decision to commit will expire unless changes in the decision context is held in abeyance while the decision is made, is an appropriate context for the above approach. Consider some examples.

A brochure or web site is simultaneously being revised by various parties. As each module is opened in an editor, it may be maintained in a Hold state to prevent others from modifying the same module. In addition, an authorized user may place a module or modules in a Locked state to perform a cost analysis or develop a style sheet.

A multiparty complex contract is being developed by various parties on a distributed system. Various parties work on different parts of the contract at different times. The above technique could be used to freeze certain aspects of a contract in progress, thereby preventing changes that would affect a term being revised, from being upset by those changes. This simply ensures that editing events that are related are appropriately staged to allow changes to be properly vetted.

A search engine sells search words to control banner advertising. The search terms (or sets thereof) are examples of the objects discussed above in that each may be unique to some extent. In this context, there can be various levels of exclusive purchase. For example, the search engine search-term sales portal might allow customers to share a search term, giving each a statistical fraction of the same search term.

In the user interface space, the edit state may correspond to another user interface device such as a viewer. Suppose a customer of a vendor wishes to purchase a set of objects that have some relationship to each other such that the customer would wish to purchase one only if other objects were also purchased. The user could place the objects in the viewer which may aid in inspecting them and the system would automatically place the objects in a Hold or Locked state such as described above. For example, as a variation on the embodiments of FIGS. 23A-25, the Hold state may be invoked automatically when the Inspect state is invoked in connection with more than one object. An example of an application is clip art where a user is putting together a design template consisting of many elements.

Figure 26:
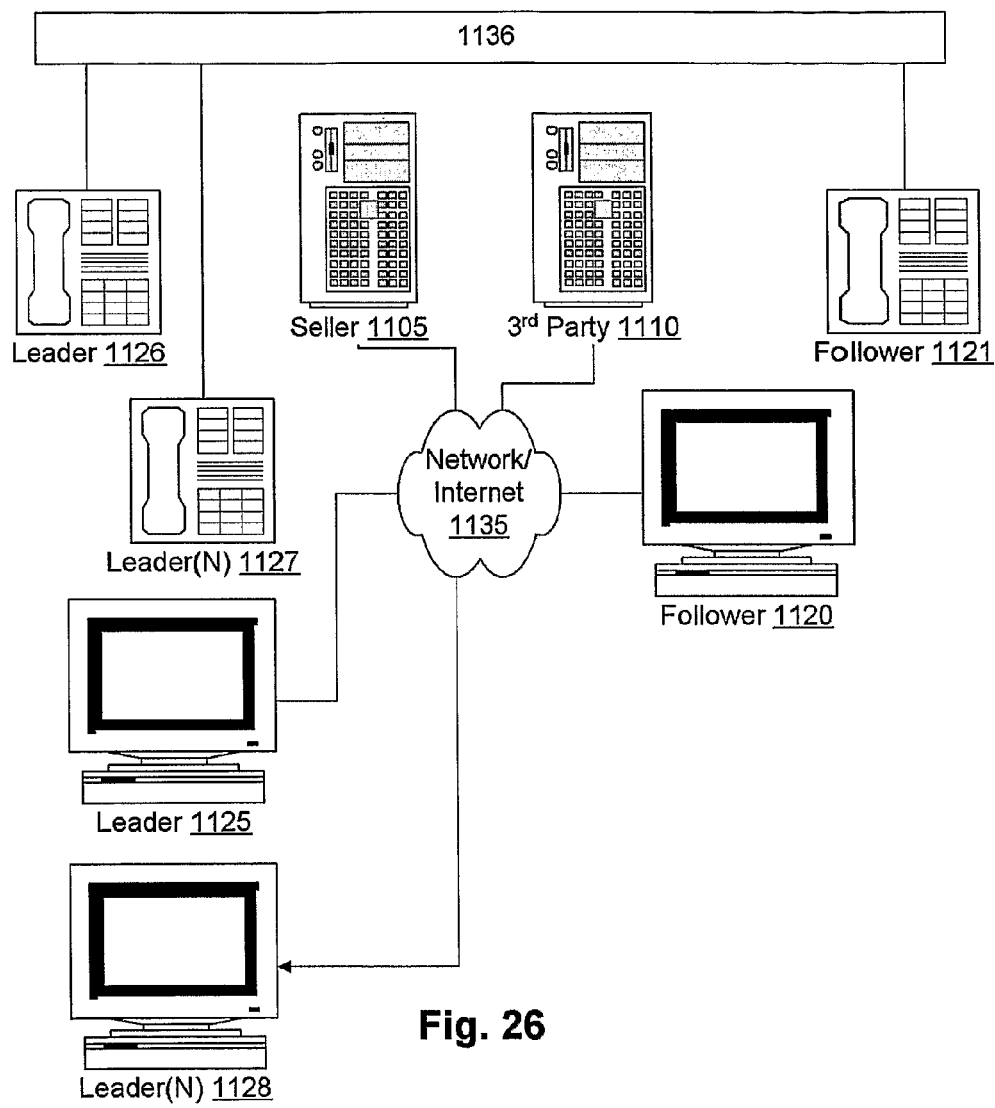
FIG. 26 illustrates a network with leader and follower terminals and servers which may provide an environment to support features of the inventive embodiments.

Referring to FIG. 26, a conventional hardware environment supports features of a collaborative system to support sales of commodities. A network or Internet 1135 connects leader 1125 and follower 1120 terminals and seller 1105 and third party 1110 servers. Leader 1126 and follower 1121 telephones are connected by a switched or packet network 1136. In the discussion below, embodiments are described in which the configurable commodity is a web site. The user of the leader terminal 1125 and telephone 1126 would be, in these embodiments, a salesperson and the user of the follower terminal 1120 and telephone 1121 would be a customer or customer prospect. The leader may be supported by other personnel such as one or more telephone receptionists or other leaders using other terminals and/or telephones which are represented at Leader(N) 1127 and Leader(N) 1128. The purpose of the embodiment is simple: to close a sale, from the salesperson's standpoint, and to establish a founded expectation that the customer's needs will be met, from the customer's standpoint. This is accomplished by the exchange of information by way of the terminals 1120 and 1125 and the telephones 1126 and 1121.

Figure 27:
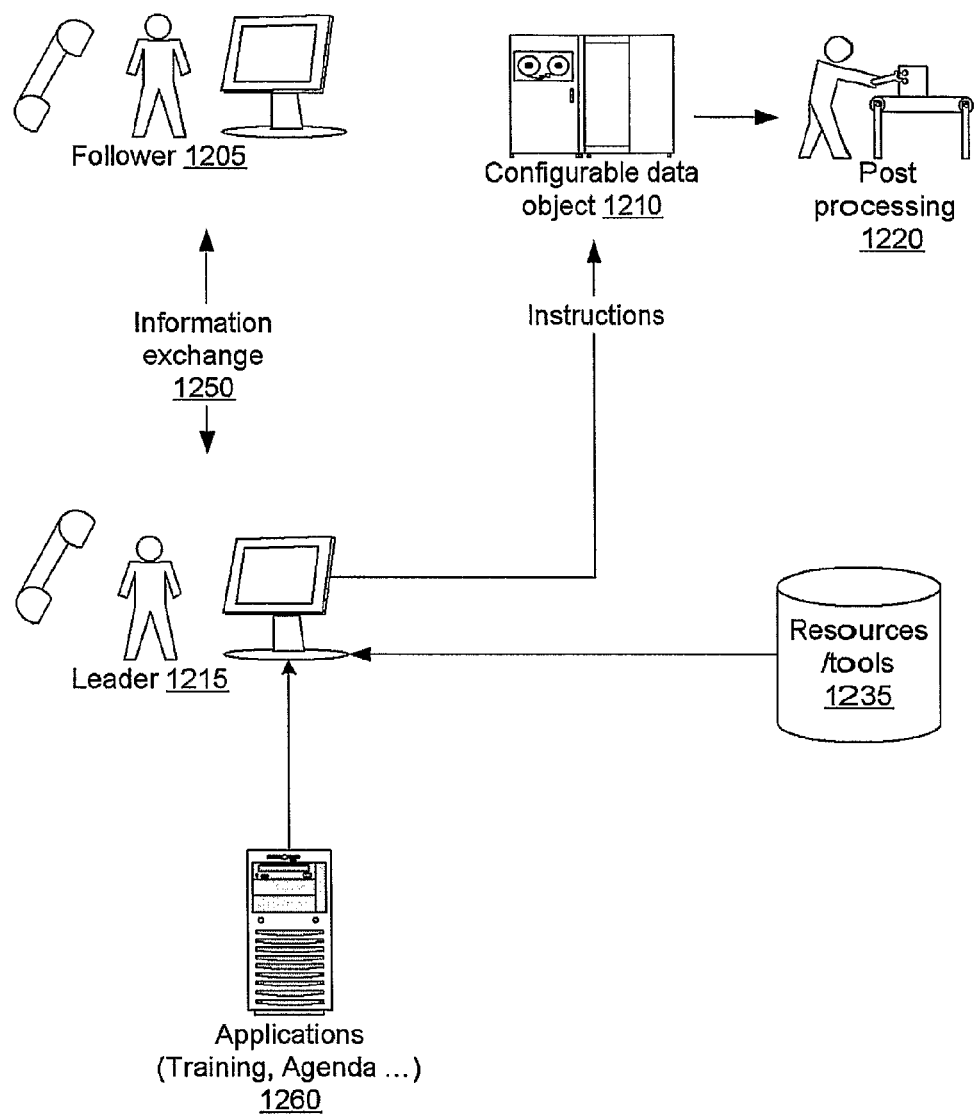
FIG. 27 is an illustration for discussing the overall flow of information and the purposes served by the inventive embodiments.

Referring to FIG. 27, the overall flow of information and goal of the present embodiment is illustrated figuratively. The follower 1205 and leader 1215, in this case, a customer and a salesperson, discuss the various features and options of a commodity that is proposed to be purchased. The commodity may be, for example, a web site the customer (follower 1205) wishes to have implemented for the customer's business. In a simplified embodiment, the leader 1215 exchanges information 250 about the follower's 1205 requirements via the telephone and the leader pushes content to the follower's 1205 terminal to demonstrate the possible features the follower 1205 may choose. The session flows iteratively with the leader 1215 pushing content to the follower 1205 until the two have agreed on the various details of the item to be purchased. For example, the features of the web site may be agreed upon. In the course of pushing content, selections are also made within the system by actuating software controls indicating the results of the discussion thereby sending instructions to configure a data object 1210; essentially the substance of all the features that are agreed to. Ultimately some post processing 1220 to complete the purchased item and this may involve further transactions with the follower 1205. The leader 1215 may make use of various resources and/or tools 1235 from a host system. For example, in identifying a structure for the follower's 1205 proposed web site, the leader may browse various templates supplied by a server operated by the leader. In addition, the system may interface with third party applications or systems 1260. For example, a dictionary of terms that may be used to construct a relevant uniform resource locator (URL) for the proposed web site may be accessed by the leader 1215.

Figure 28A:
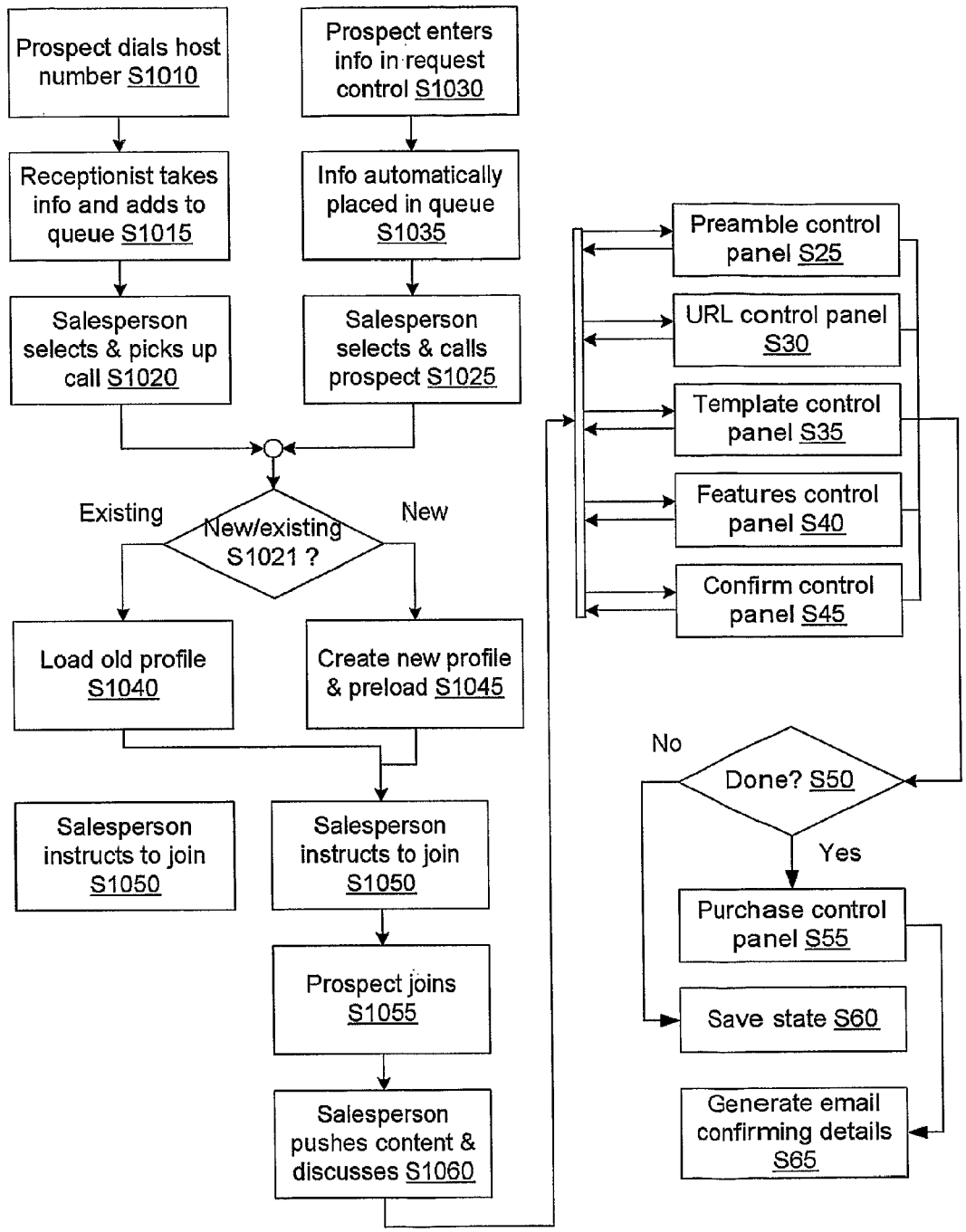
FIG. 28A is a flow chart that illustrates a typical process for using the inventive embodiments.

Referring now to FIG. 28A, a flowchart illustrates the flow of an interaction such as discussed with reference to FIG. 27. To initiate the session, a follower either calls into a call center S1010 or enters a request through a web site S1030. In either case, the follower is entered into a queue by either giving information to a receptionist on the phone S1015 or, having entered his personal information into a control to make the request at step S1030, an identifier is placed in a waiting queue. S1035 to be viewed and "picked up" by an available leader. The leader may call the follower back using information entered in a suitable control by the follower in step S1030 in the case of a web-initiated session S1025 or picks up a waiting follower who has dialed in S1020.

If the follower has never been profiled until the current session, a new profile is created at step S1045 adding any information entered into the control at step S1030 or taken by the receptionists at step S1015. The leader may communicate over the telephone to the follower a URL to bring the follower to an appropriate web site which supports the session to be joined S1050. Alternatively, if the contact was initiated by the follower through a web site, this step is skipped. The follower then joins the session S1055 at which points the terminals of the leader and follower are linked via the Internet (or other network) S1055.

After the follower and leader are connected, the linking by the follower causes the follower's browser to load an applet or plug-in that supports the pushing of content by the leader to his browser. The follower thereafter may sit back and talk to the leader without taking any action at all, with the leader selecting, accessing, and causing to be displayed on the follower's terminal specific information the leader desires to discuss. As the session evolves and various elements of the issue or item being discussed are settled, such as the sale of a web site, the follower's terminal may display an evolving summary of what has been decided and what remains to be discussed.

Figure 28B:
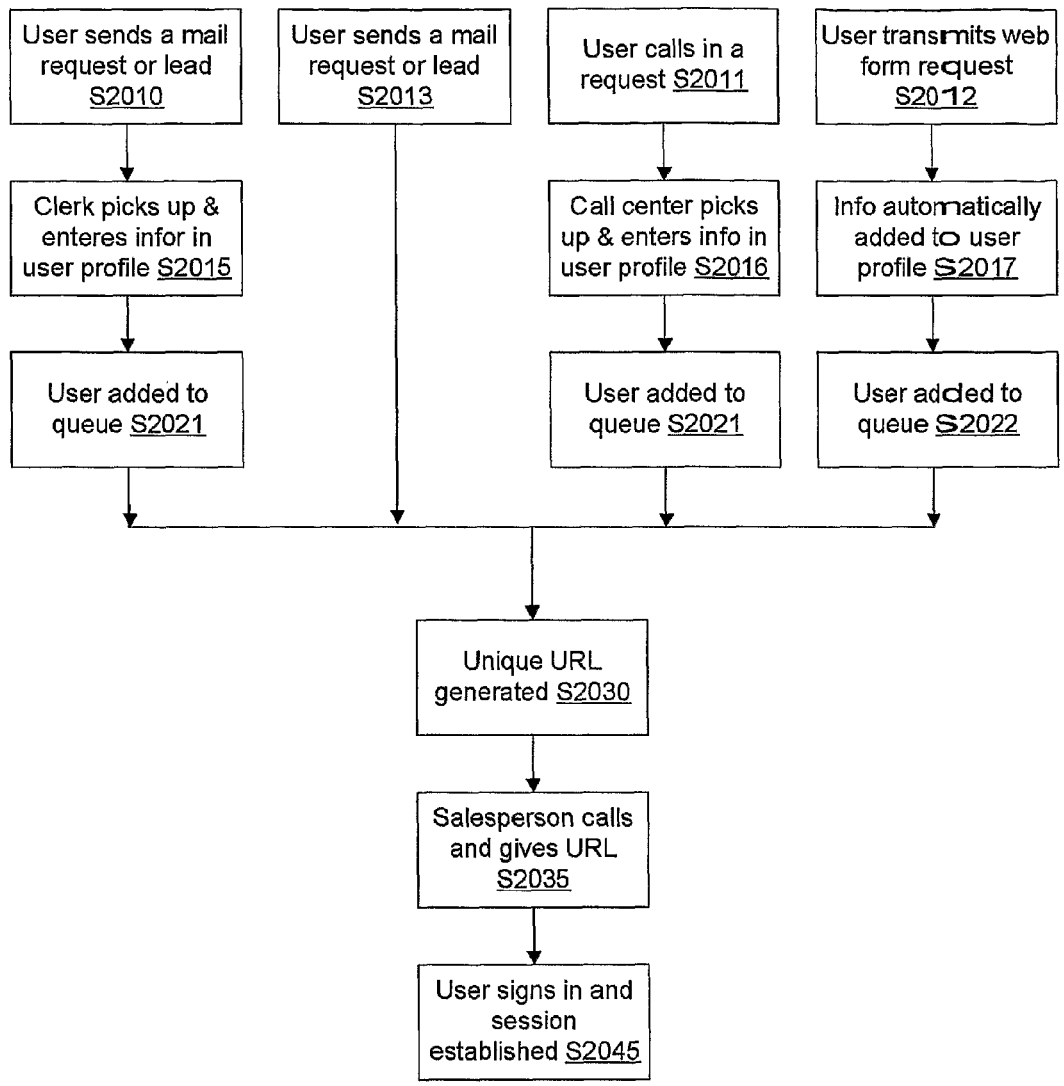
FIG. 28B illustrates alternative paths to establishing a session similar to those of FIG. 28A.

Referring now to FIG. 28B, some alternative ways of establishing a session between a leader and a follower are illustrated in the context of a session between salesperson and a user who may be a customer prospect. There are four possible entry points, each beginning with the transmission of a lead. A user may mail a lead or request for a conference S2010 or S2013, call a call center S2011, or transmit a request by a filling out a web-based form and sending it in S2012. A mailed request can be picked up immediately by a salesperson as indicated at S2031 and a unique URL generated for use by the user. Alternatively, a mailed lead may be picked up at a processing center and user information entered by a clerk into a user profile S2015 and an identifier of the user added to a queue S2021 for subsequent selection by a salesperson.

A user may call a call center S2011 and a receptionist requests information of the user and prepares a profile S2016 which is then added to a queue S2021 for selection by a salesperson S2021. In a similar manner, a web-form-based request may be transmitted by a user and the form data automatically processed to generate a profile for the user S2017 and the user added to a queue S2022.

Step S2030 is common to all of the four alternatives in FIG. 28B. A unique URL is generated for each user to use to link up in a session with a salesperson. This can be generated by a salesperson when the salesperson selects a user from a queue or it can be automatically generated for each entry in the queue. The salesperson calls the user and gives the user the unique URL S2035. Then, the user uses the unique URL to link to the salesperson's online session and the session begins.

The particular means that may be selected by a system designer for allowing information to be pushed by the leader to the follower's terminal are varied. In one embodiment, an applet is loaded by the follower which generates requests from a particular IP address for URLs holding flash content, the URL's being made available through the activities of the leader on the leader's terminal. The details are not important to the inventive embodiments since there many ways to provide the functionality described above and below.

The leader's display shows content and controls configured around various functions, each of which is associated with an element of the item to be configured. In the example of a web site sales system, the system may generate five screens or control panels: a preamble control panel S25, a URL selection control panel S30, a template control panel S35, a feature selection control panel S40, and a confirmation control panel S45. Preferably, the leader, in this example, a salesperson, is permitted to randomly access each of these screens from a toolbar or menu so that the follower, in this case, a customer prospect ("prospect," for short) can guide the discussion as the prospect wishes.

The preamble control panel S25 provides a facility for selecting initial content that the salesperson can use to present his organization's capabilities or provide background information in a context other than a sales system. In this control panel, the salesperson has an index of many different pieces of content that he can push to the prospect's terminal. Referring also to FIGS. 29A and 29B, the salesperson display 1300 on the leader's terminal 1125 contains various controls to allow content to be pushed to a follower's display 1305 (for example one generated within the main viewing area of a browser window) on the follower's terminal 120. The leader's display 1300 contains a summary bar 1330 which shows the status of selection of several different elements of the good to be sold, in the present example, a web site. The status of each element is indicated by a corresponding subdisplay labeled A, B, C, and D. Each subdisplay may show a selection or status such as a text label to indicate the extent to which the selections attending the element associated with it has been completed. One of the subdisplays is highlighted by an arrow, indicated at S, which indicates a current control panel. A similar summary bar 1335 may be provided on the prospect's terminal as indicated at 1335. The salesperson's terminal may show various samples of content that may be pushed to the prospect's terminal as indicated at 1310. A tool 1340 may also be provided to aid in searching for and identifying content to be selected and pushed. The selection and querying of databases of content are not discussed here in detail since the means for providing these are well known in the context of networked computing.

In the prospect's screen, a selected piece of content 1315 is shown after being loaded by the applet and browser running on the prospect's terminal. For example, if B URL selection S30 (FIG. 28) represents the current control panel being selected and used by the salesperson, the content being pushed to the prospect relates to the selection of URLs. The current control panel selected by the salesperson represents a current "topic," i.e., URL selection, which is therefore indicated by the arrow S on the prospect's display 1305.

Referring to FIGS. 30A and 30B, a tool that may be used to support the sale of web sites, a URL selection/generation tool, is shown at 1450. A text control 1405 and submit button 1400 allow a key word or phrase to be entered. A result list consisting of check box controls 1415 and results words or phrases 1420 is generated by an engine (not illustrated) that may include a dictionary, word expander such as a thesaurus or lexical dictionary. A term submitted in the tool S100 will generate a query may be filtered through a term dictionary S110 that provides words and phrases that are related to the terms submitted and the relationships can include typical thesaurus terms such as synonyms, but may also include, other related terms. So related terms are generated and listed with controls S120. For example, hypernyms, terms indicating where or how a thing characterized by a search term is normally used, antonyms, meronyms (a word that names a part of a given word), holonyms (a word that names the whole of which a given word is a part), attributes, entailments, causes (if the term can be translated as an effect), and other types of related words. Lexical dictionaries for such purposes are well known in the statistical natural language field.

The tool returns a set of related terms which are then listed and may inspire URLs. Certain terms can be selected by the salesperson to push to the prospect for review and discussion S125. This may be done by selecting the check box controls 1415 next to the selected terms and clicking a button control 1425 to push the terms to the prospect's display. When a term is found the term may be selected by the check box control 1415 and another button control 1430 activated to indicate the final selection or a term inspired by the interaction between the salesperson and the prospect may be entered into a text box control 1406 and a button control 1401 activated to indicate the selection. Once the final selection is made, the corresponding element may be indicated as completed in the summary bars 1330 and 1335 in the leader and follower displays 1300 and 1305 discussed above with reference to FIGS. 29A and 29B.

The FIGS. 30A and 30B model may be appropriate for the presentation and selection of other features and options. For example, in the template control panel S35 (FIG. 28), a library of templates may be searched. These may be indexed by vertical market or industry as well as other keys that may be entered in the prospect's profile such as geographic area, cost category of goods sold by prospect, and other such criteria. Also, search terms may be automatically obtained from the prospect's profile without being entered in the text box control 1405.

FIG. 31 shows a tool to allow the leader to see the current status of the follower's display. A display 1460, which may be a region of the leader's control panel (200 in FIG. 29A) may include a view of the pushed content 1465 and a status indicator 1425 which indicates whether the content has been entirely loaded by the follower's browser. The status may be achieved by a "heartbeat" signal from the follower's applet or by other means.

Figure 32A:
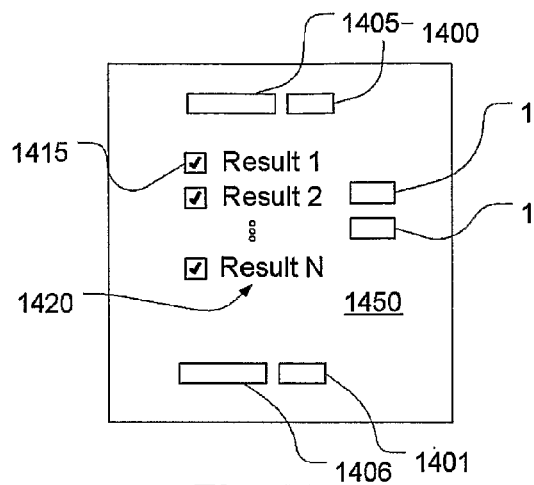
FIGS. 32 and 33 illustrate graphical templates with filled and ghosted content to illustrate deliverable features that may be used or purchased by the follower.
Figure 33:
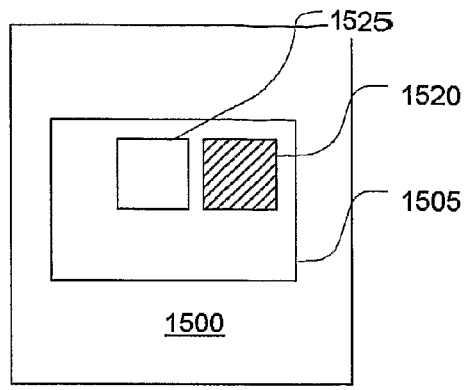
Figure 32B:
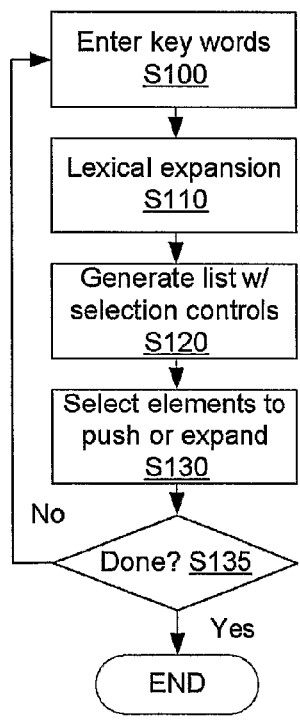

One of the difficulties with the display web page templates is that it is desirable to show the look of a template with all the content filled in so as to make a realist impression. On the other hand it is useful for a prospect to distinguish the customizable regions of the template. The template view may be pushed to the follower's display for discussion purposes. Referring to FIG. 32, to provide both an indication of the look of a template in use and to indicate the customizable parts in a way that is very clear, a template view 1500 with regions 1505, 1510, and 1515 that are completely filled-in with standard sample content may be pushed to the follower. Referring to FIG. 33, in a separate view, the same template 1500 may be shown with customizable regions, represented by the box at 1520, and non-customizable regions 1525. The regions may be distinguished with some sort of highlighting such as ghosting (reduced color contrast of the content).

Figure 34:
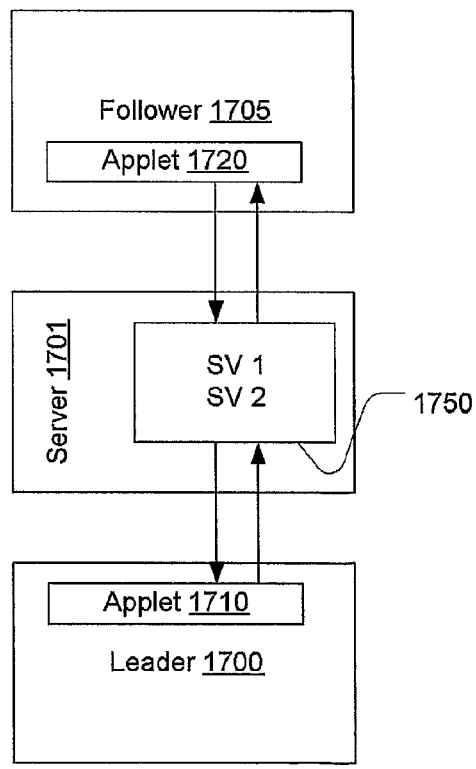
FIG. 34 illustrates schematically a polling method for maintaining synchronization information on both leader and follower terminal applications.

Referring to FIG. 34, there are many ways to maintain synchronization and to transfer the required information between the leader and follower browsers (or other suitable shell applications), but one example is shown in FIG. 34. Leader and follower browsers 1700 and 1705 run respective applets 1710 and 1720. The applets 1710 and 1720 update respective state vectors 1750 stored by a server 1701 when an appropriate event occurs such as a push of an image by the leader or the completion of the generation of a particular display by the follower. The applets 1710 and 1720 regularly poll the state vectors 1750 by requesting the vectors from the server 1701 to maintain an internal model of the other of the leader and follower's current state.

Note that although the term "applet" can be construed as meaning something that is very particular, such as an embedded program written in a particular virtual machine high level language, its use in the present specification is nothing so specific. It is intended and used to refer to any kind of application that can provide the functionality described or features thereof.

Figure 35:
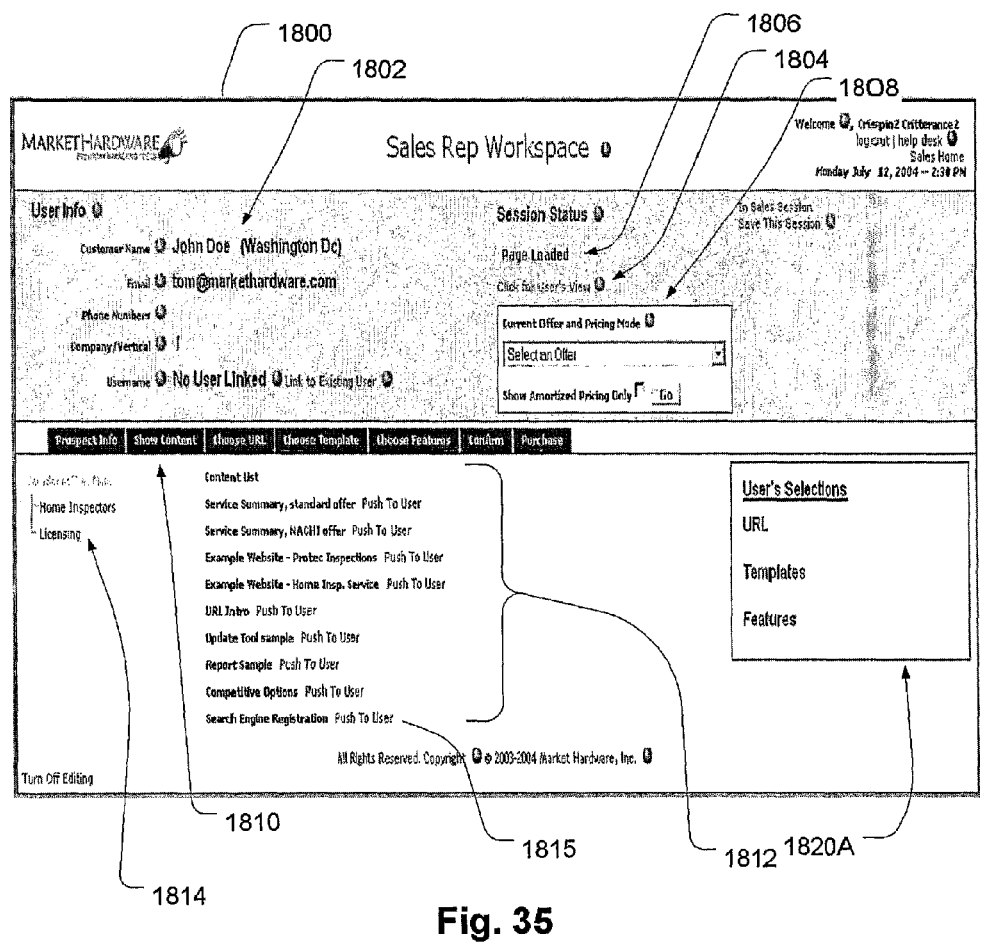
FIG. 35 is an embodiment of a control panel for a leader showing a follower information area.

Referring to FIG. 35, a sample of how a control panel 1800 for a leader might look. The control panel display 1800 shows a follower information area 1802 which may detail information about a currently participating follower, in this case a customer prospect. This information may include address, email, phone number, etc. A status indicator control 1806, in this example a simple text control, indicates the current status of the follower's applet. In the illustrated example, the control indicates the follower's page is fully loaded. A selection control 1808 allows the leader to select an applicable promotion for filtering available options or pricing. A selection tab bar 1810 allows the leader to move at will to various sessions for the control panel such as discussed (item 1330 in FIGS. 29A and 29B).

A tree-structured control 1814 indicates a selected filter for the various items to be selected. In the illustrated example, the filter is the class of vertical market the follower business occupies. This control allows the leader to reduce what might otherwise be a massive quantity of options to a predetermined set based on the business area of the follower. It will be readily apparent that other class-based filter could be used as well. In other contexts, such as an application for recommending courses to a student, a similar classification could be obtained by requesting information from the follower about interests and career goals. In such a case, a suitable class might not have a particular name, such as if a collaborative filtering approach were used. But the key questions used to determine the classification could be shown at 1814.

The example display shown in FIG. 35 is for a system used to sell a web site service. It is an initial screen that allows the salesperson to select from a list 1812 of boiler-plate content which the salesperson can select to push to the prospect. The material might include such things as teaser samples, user agreements and other boiler plate, background information, references, comparisons of the leader's offerings to those of competitors, outlines of the market for the leader's services, technology trends in the leader's industry or the follower's, and other prefatory material. These may be in the form of vignettes that can be reviewed in a matter of seconds during the course of a telephone conversation. To push a selection to the follower's screen, the leader simply clicks a corresponding button or link control (e.g.) 1815 in the list 1812. A user's selection area 1812A displays all the selected items for the current session. In the current example, nothing is yet selected, but category labels indicate what remains to be selected.

Figure 36:
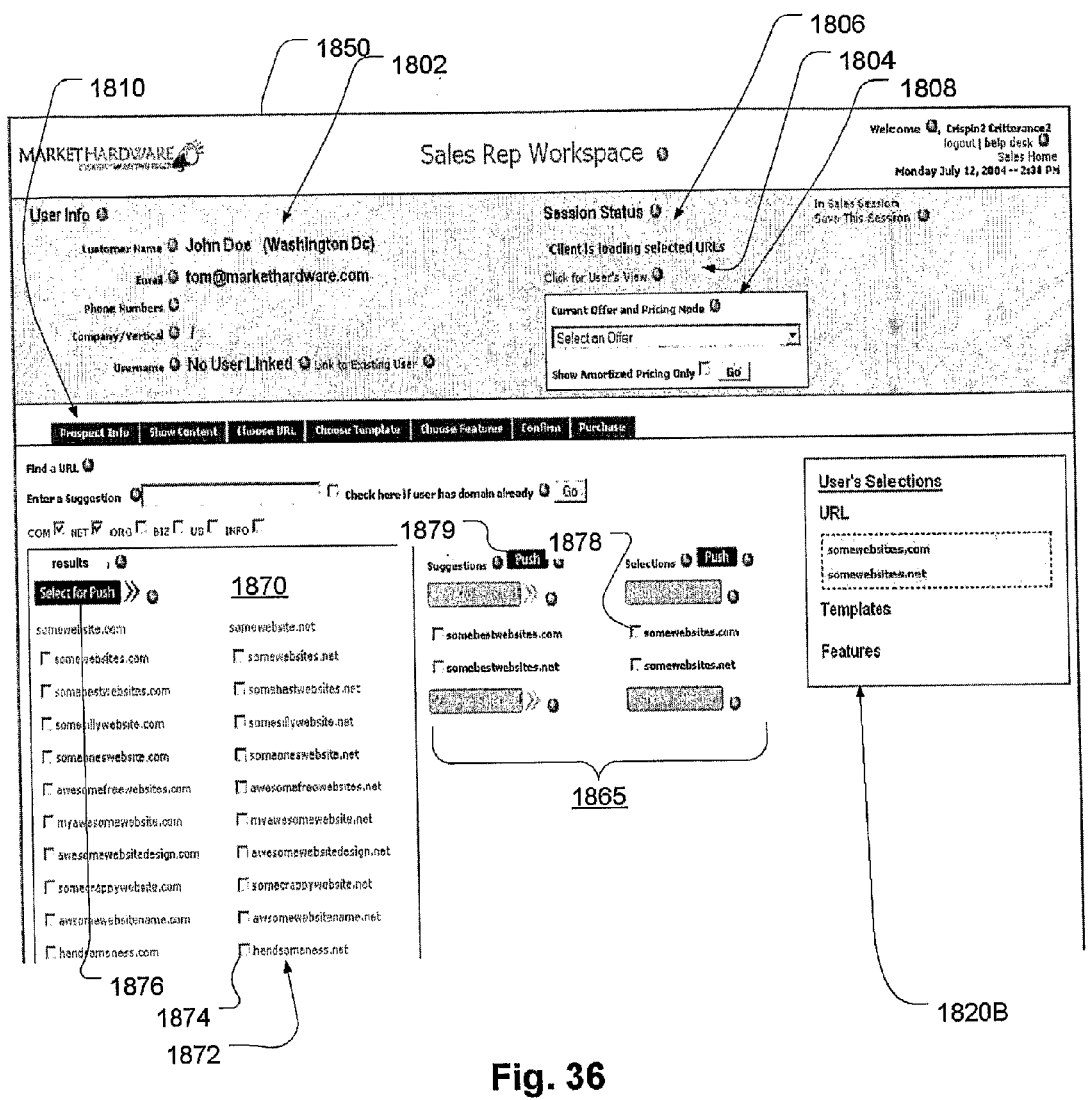
FIG. 36 illustrates a control panel configuration to support the creation and review of URL choices.

FIG. 36 illustrates a control panel configuration to support the creation and review of URL choices. At 1870, a list of proposed URLs 1870 has been generated by a semantic engine. Each entry, e.g. 1872, has an associated check box control 1874. The salesperson in the example context may select one or more URL's and click a control 1876 to push them to the prospect's display. A central area 1865 shows URLs that have been selected for closer review and discussion (and which have been previously pushed and therefore show on the prospect's display). The URLs in the area 1865 may be selected as final selections by selecting an associated check box control 1878 and activating another button control 1879 to mark it as selected. Finally-selected URL(s) may be displayed in a "user's selections" area 1820B. Although not shown, the tree-structure control 1814 may be included in the control panel configuration of FIG. 36.

Figure 37:
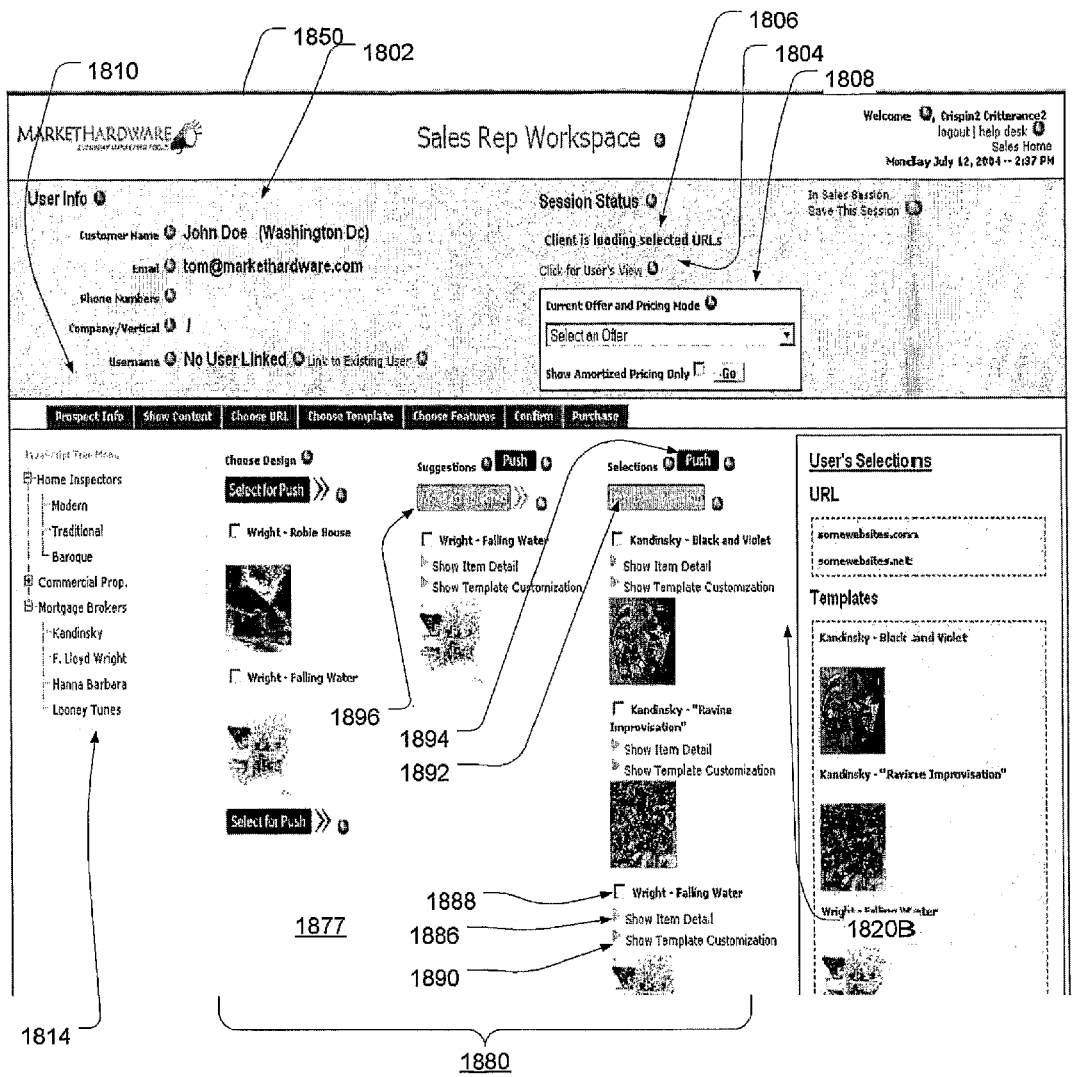
FIG. 37 shows a configuration of a salesperson's control panel which is designed to assist in the selection of a web-site template.

FIG. 37 shows a configuration 1851 of the salesperson's control panel which is designed to assist in the selection of a web-site template. A template area 1877 shows thumbnails of samples of templates each with an associated set of controls 1886, 1888, and 1890. The set of controls includes 1886, 1888, and 1890 a check box control 1888 which may be used to select the associated template to be pushed to the prospect upon selection of a button control 1894. The set 1886, 1888, and 1890 also includes a link control 1886 to show a large scale preview of the template which displays the template in a realistic size and with sample content. A third control 1890 in the set 1886, 1888, and 1890 shows the same expanded view with highlighting, such as ghosting, to indicate what parts can be customized. Button control 1892 allows a template selected by text box control 1888 to be removed from the selection set represented in the prospect's selection area 1820C. Button control 1896 allows a selected template to be moved to the prospect's selection area 1820C and identified as selected.

Figure 38:
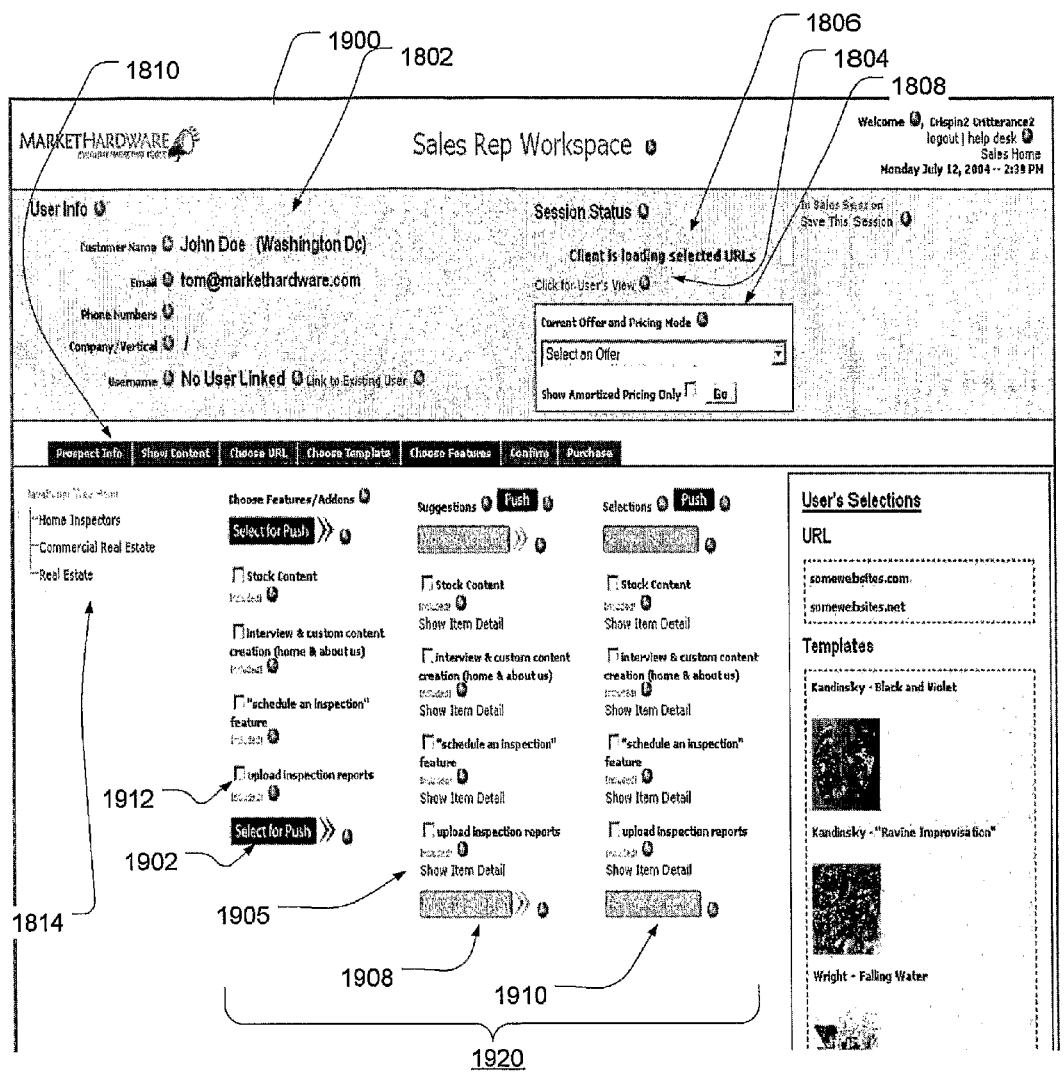
FIG. 38 shows a feature selection configuration of a leader's control panel showing, principally, a feature selection.

FIG. 38 shows a feature selection configuration 1900 of the leader's control panel showing, principally, a feature selection area 1908. In the feature selection area 1908, a number of different optional add-on components 1905 of the web site may be selected, pushed to the user, selected, or removed from the selection set indicated in a selection area 1820D. This may be accomplished with corresponding controls for selecting, a check box control 1912, a button control to push 1902, a button control to make a final selection of a feature 1918 and thereby show it in the selection set 1820D, and a removal button control 1910.

Figure 39:
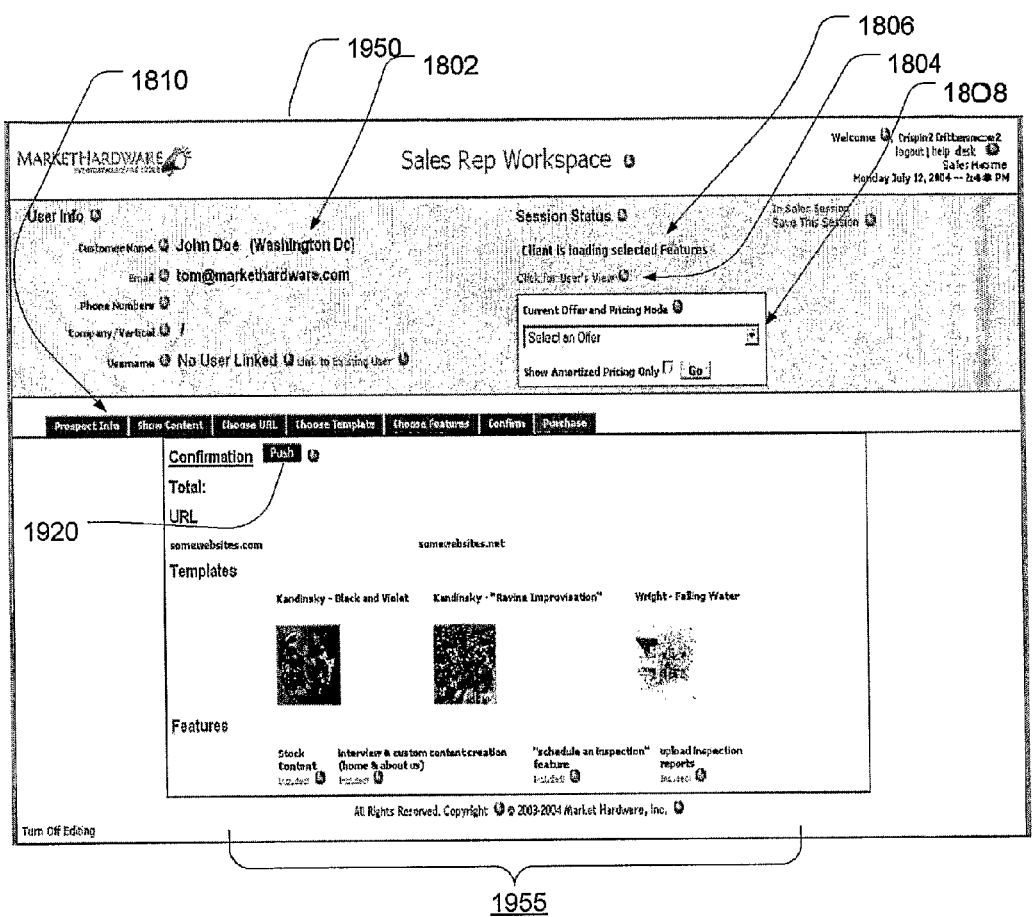
FIG. 39 shows a final confirmation configuration of a leader's control panel.

FIG. 39 shows a final confirmation configuration 1950 of the leader's control panel. A summary 1955 of all the selections made by the follower and leader is shown, The summary may be pushed to the follower using a button control 1920. Any adjustments to be made may be done by selecting from the selection tab bar 1810 and going to the appropriate configuration, for example, the template selection configuration for modifying the template selected. A final control panel configuration in the selection tab bar 1810, which is not shown, gives a summary of costs and purchase information and approval.

Figure 40:
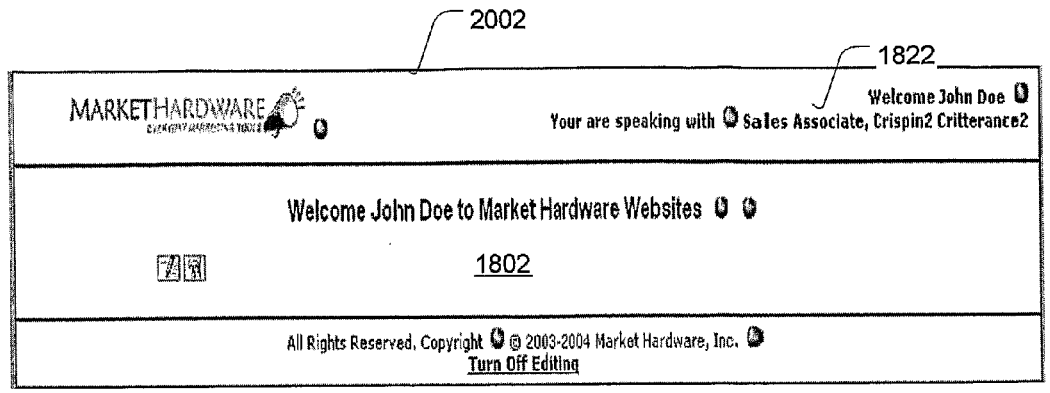
FIGS. 40 and 41 show a welcome screen and a piece of boiler plate pushed by the leader on the follower's display.
Figure 41:
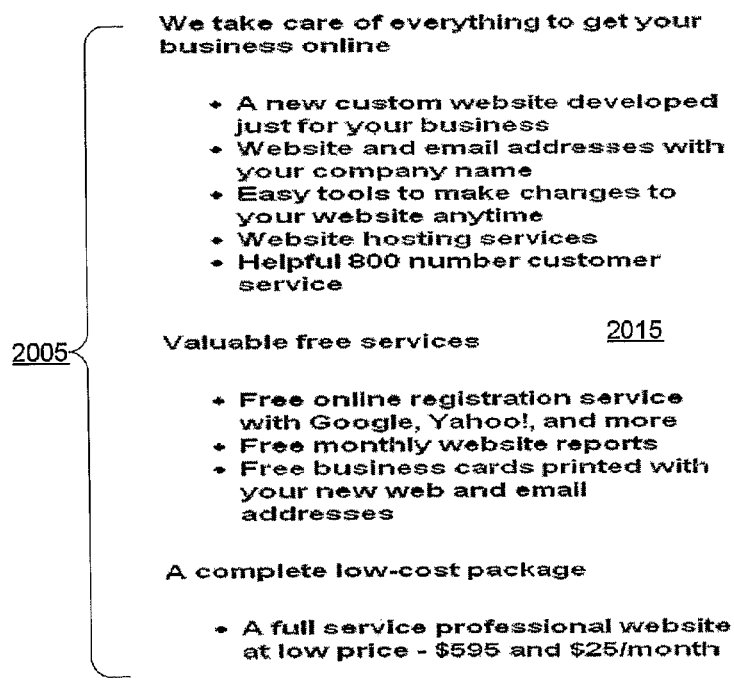

FIGS. 40 and 41 show a welcome screen 2002 and a piece of boiler plate 2005 pushed by the leader on the follower's display 2005, 2015. These may appear on the same screen or on different screens. At 2022, the leader's name and other information about the conference between the leader and follower may be shown. These and the following screens are illustrations of previously-discussed features of the follower's applet in communication with the leader's applet.

Figure 42:
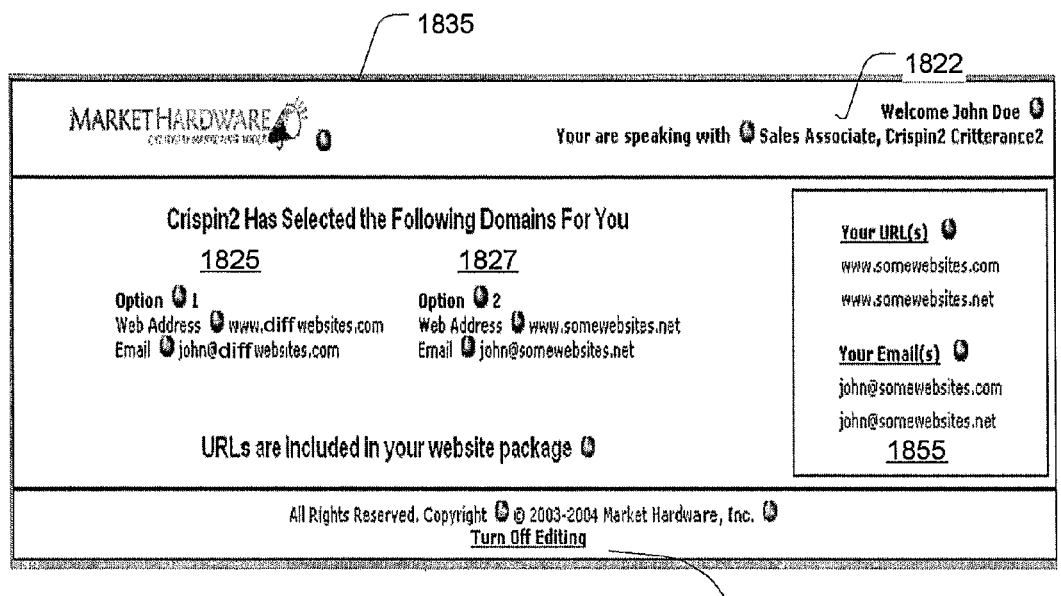
FIG. 42-45 show summaries of final selections for a web site on a follower display.
Figure 43:
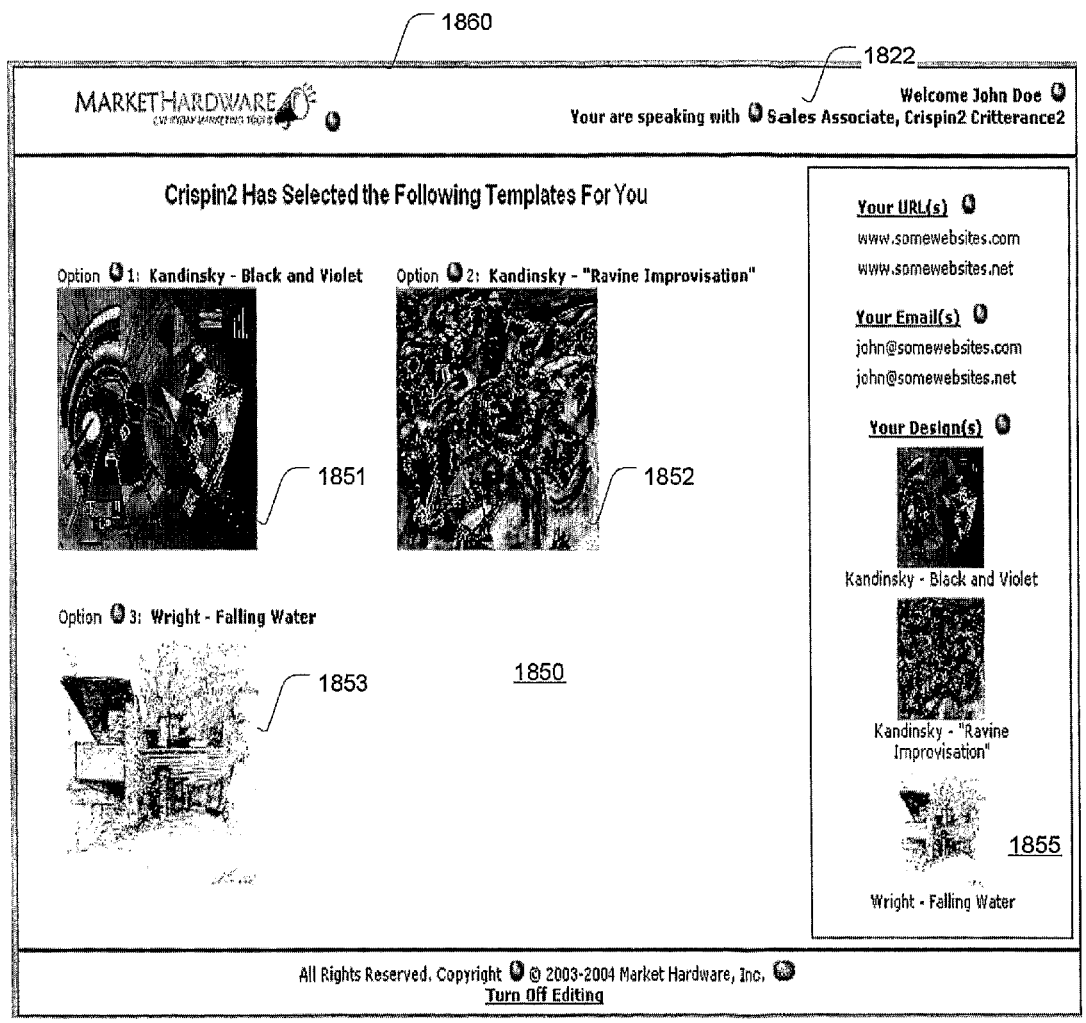
Figure 44:
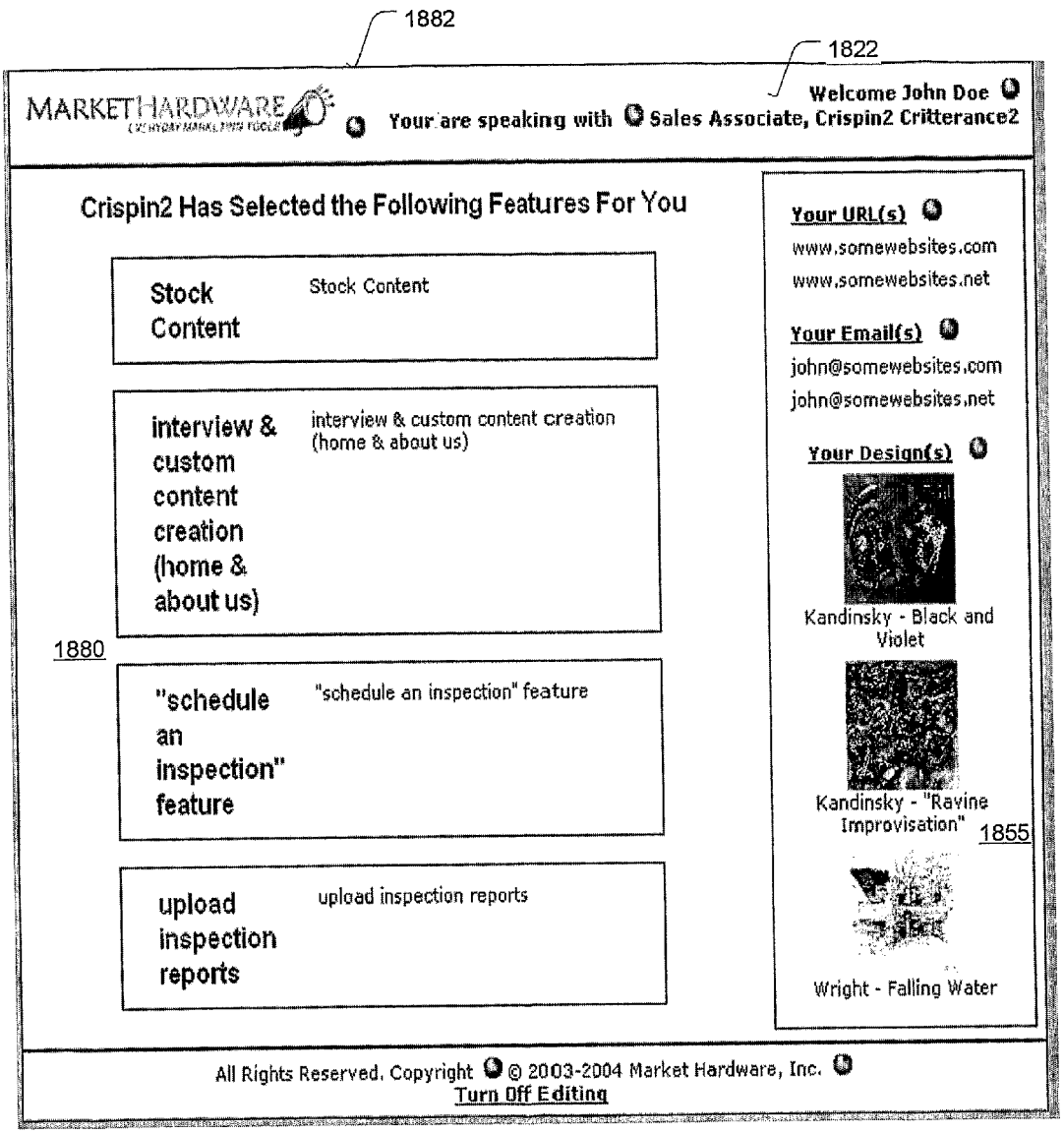
Figure 45:
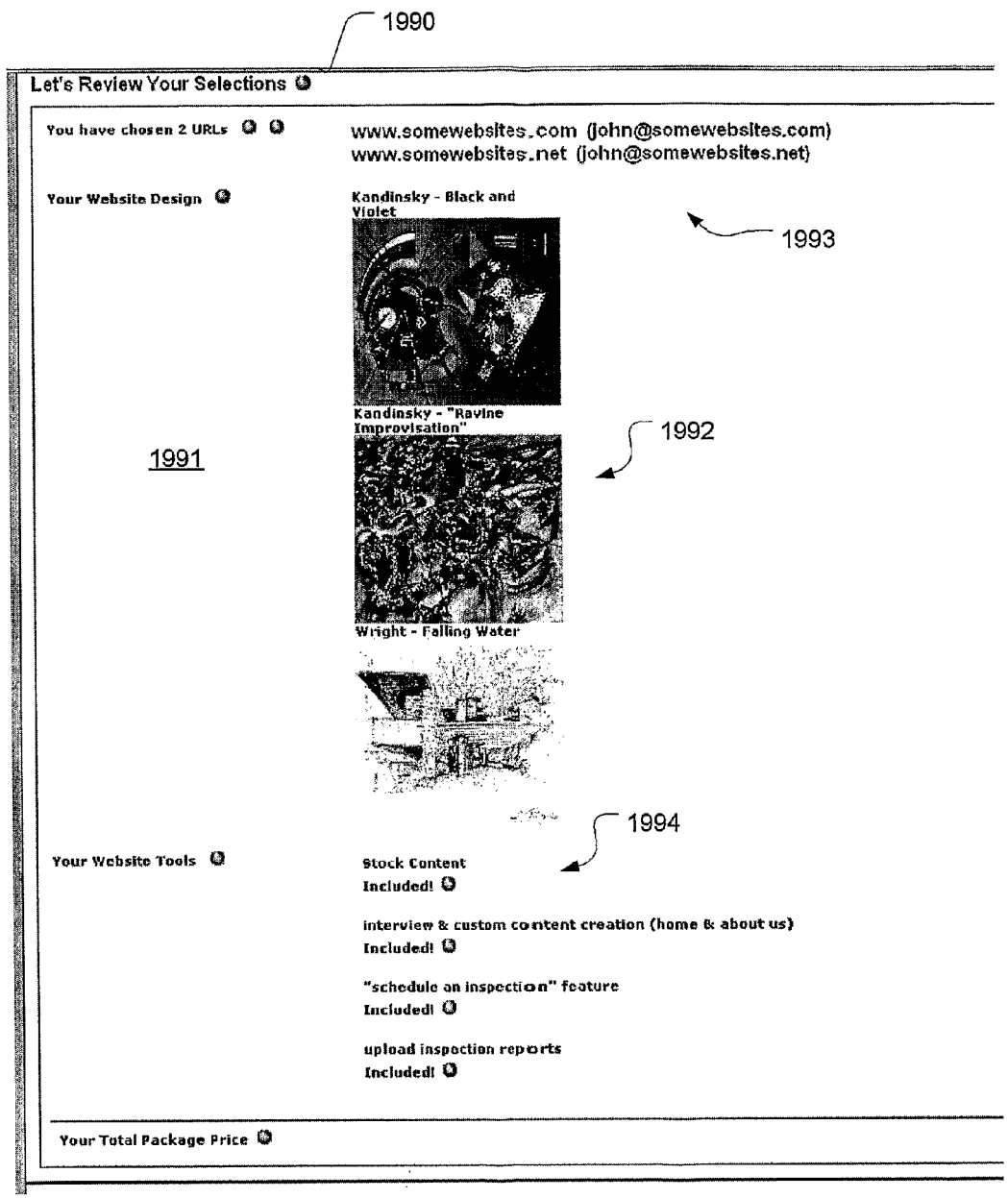

FIGS. 42-45 show summaries of final selections for a web site on a follower display. FIG. 42 shows a follower display showing two choices for domain names illustrated as web addresses and email addresses at 1825 and 1827, respectively. Summaries of selections that have been made are shown in the bar 1855. FIG. 43 illustrates an area of the follower screen showing multiple selections 1851-1853 for web site templates in a selection area 1850 of the follower's display 1860. Again completed selections are shown in a bar 1855 at right. FIG. 44 illustrates a follower display 1882 showing various web site features 1880 that may be selected by the follower and a summary display of completed selections in the bar at right 1855. Features may include tools such as visitor counters, e-commerce shopping cart, professional customization package, an upload tool, newletter tool, forum application, database, etc. FIG. 45 illustrates a follower's summary display 1990 showing chosen template elements 1992, domain name 1993 and web site features 1994.

Figure 46A:
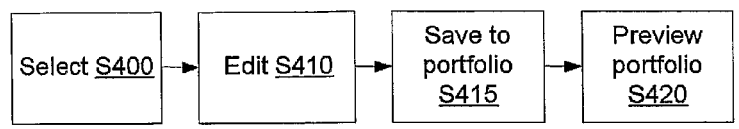
FIGS. 46A and 46B illustrate a process of selecting, editing, and storing objects for use in customizing various products that can ultimately be delivered in a final fulfillment step.
Figure 46B:
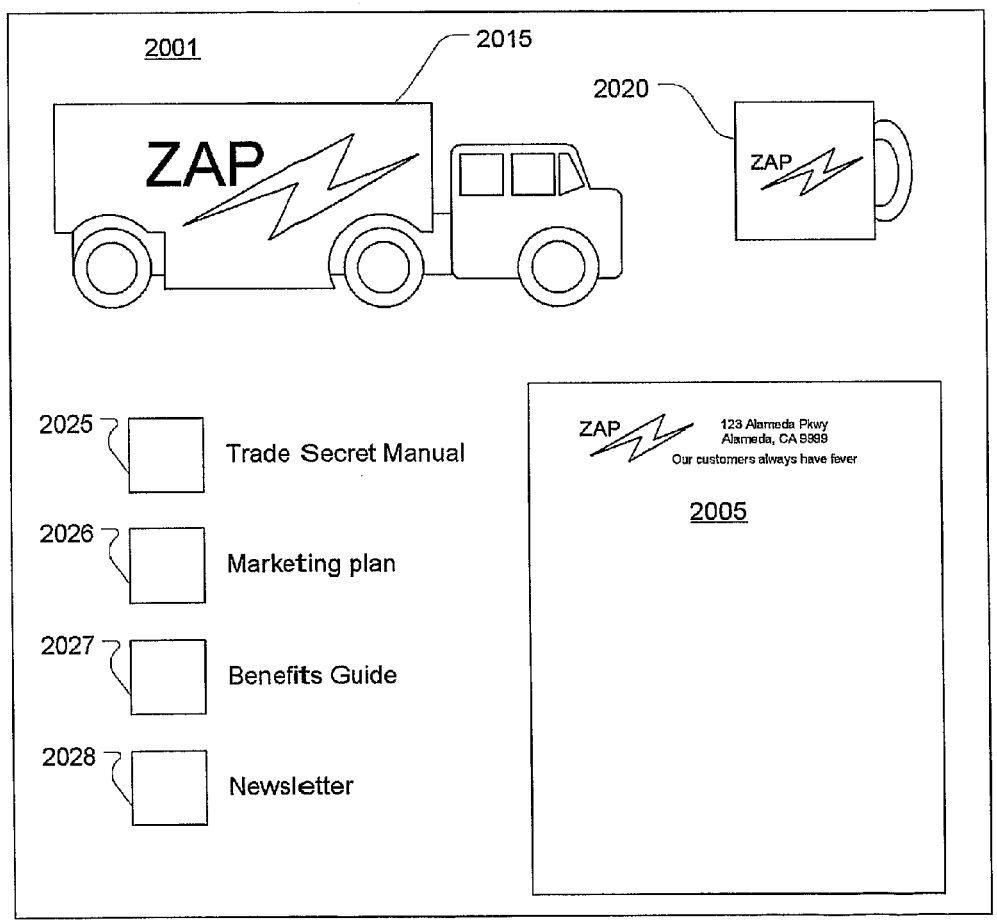

FIGS. 46A and 46B illustrate a process of selecting, editing, and storing objects for use in customizing various products that can ultimately be delivered in a final fulfillment step. As discussed above with respect to the logo editor, various objects can be selected S400 and data added to a profile S415. Some of the data, such as logos, can be edited S410 as well before adding to the profile. At any time, the profile may be in various states of completion. The combined data in the portfolio, to the extent possible, can then be used with standardized rules to generate specific variants for use on customized products such as illustrated in FIG. 46B. A preview display 2001 may be generated using the stored data. Data that is incomplete for some products can be rendered (visually represented) in a standard format until the required additional data is filled in. For example, a truck 2015 representation may be a standard step-van until a more specific choice is made as to size and layout for a truck stencil. Similarly a promotional item, such as a coffee cup 2020, may be arbitrarily selected to display an example until a particular promotional item is selected. Other examples of products are stationery and various manuals such as trade secret manual 2025, marketing plan 2026, employee guide to benefits 2027, newsletter 2028. Each of these may make use of standardized manuscripts which are customized based on information about the user's industry, the user's logo, and other particulars. The items indicated at 2025 to 2027 may represent download links for digital documents which can be rendered on the fly from the portfolio data or concretized at one point in time and permitted to be edited in detail from that point on.

The display 2001 may provide links (e.g., clicking on a corresponding image) to all individual products to expose detailed customization options for each. Also purchase options and other fulfillment options may be provided.

Figure 47A:
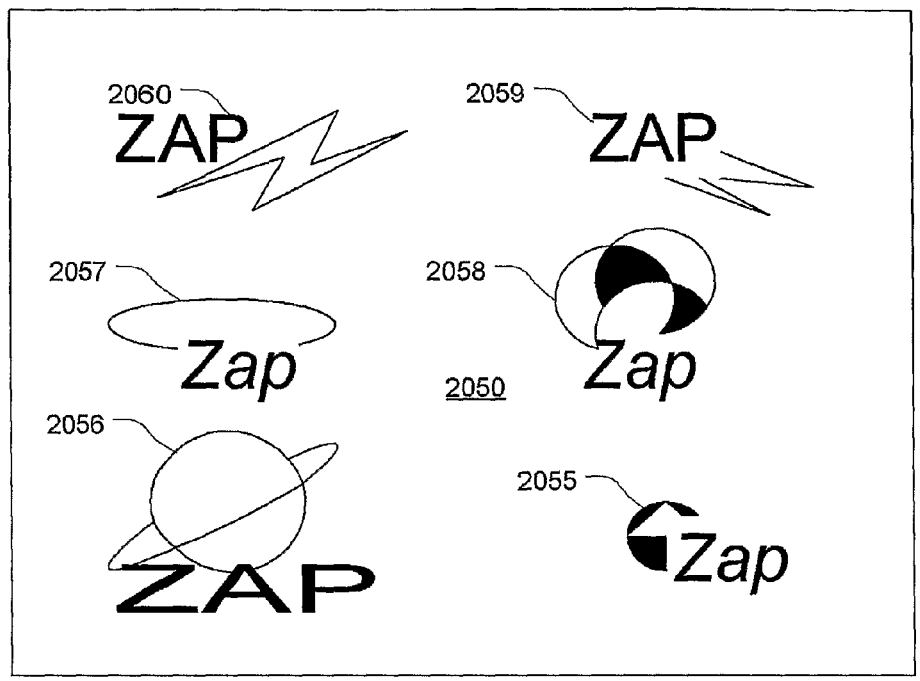
FIG. 47A shows a set of logos that have been customized with the user's company name in a browse display.

In the context of searching, it may be beneficial for the renderings of graphical objects, such as logos, to be pre-customized based on information in the user's profile. For example, referring to FIG. 47A, a set of logos has been customized with the user's company name in a browse display 2050 which may be combined with the logo search embodiments discussed above in this document. As the user browses the logos, all that are rendered for display 2055-2060 are similarly customized.

Figure 47B:
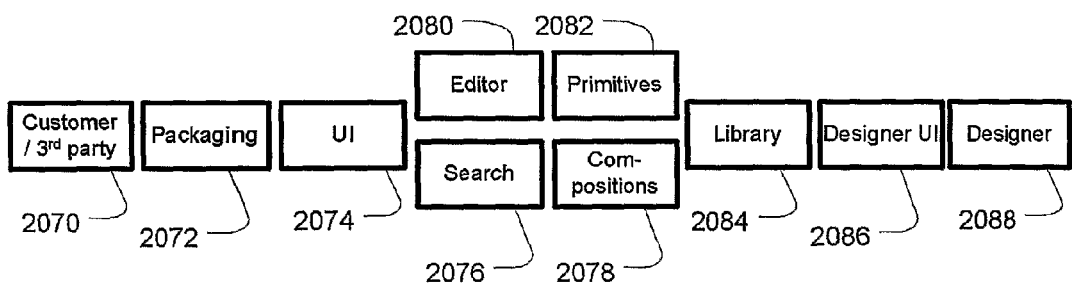
FIG. 47B is an end to end block diagram of a design editing and portfolio storing and delivery system.

Referring to FIG. 47B, in an embodiment, the system described with reference to FIGS. 1-25 provides an end to end service from a source of design materials, namely human designers 2088 to customers 2070. A designer user interface, 2086, which may be substantially as described with reference to FIGS. 1-25, allows designers to make contributions to a library 2084 using online editing tools or, more likely, simple upload tools since desktop applications are generally more suited to the work of professional designers. By adding content to the library 2084, via a registration system, the designer may sell works, for example, on a consignment basis. If a design sells, the designer gets paid by the host of the overall system. If a design does not sell, the system host does not have to pay for the inventory. Other payment models are, of course, possible.

As described with reference to FIGS. 1-25, users can access the library 2084, whose content may include design assets at various levels, from primitives 2082 to compositions 2078 as explained above. Each may be modified or accessed via search 2076 and edit 2080 functions provided by the server. As will be clear, in the present context, both search and edit functions can provide very similar results with the high level type of editing contemplated in the present system. For example, searching for similar alternatives using a slider control as discussed with reference to FIG. 15 can produce the same results as morphing a current design using the same controls.

The edit and search interfaces may be provided with a control to allow a user to hand off a project to a professional associated with the system host. Such a "User Rip-Cord" feature would benefit greatly from a record of the user's work up to the point where the user decided to give up. To that end, an event recorder may be provided to keep track of a user's activity with an editor. The event record may then be transmitted to the professional who relieves the user. Events may be recorded at the detailed level of mouse movements or at a higher level showing editor states at various points in time to create a movie. From such a record, a professional may surmise what was giving the user difficulty allowing the professional to give assistance, but had the work back to the user. Another possibility is for the user interface 2074 to allow for tandem sessions, as described with reference to FIGS. 26-45 in which a professional associated with the system host takes control of the user interface 2074 (preferably one more elaborate in terms of functionality than the one designed for use by end-users) and the user simply sees pushed results, such as the workspace without the controls. As described with reference to FIGS. 26-45, the user may communicate his/her wishes via voice communication or chat window or other suitable mechanism.

Figure 47C:
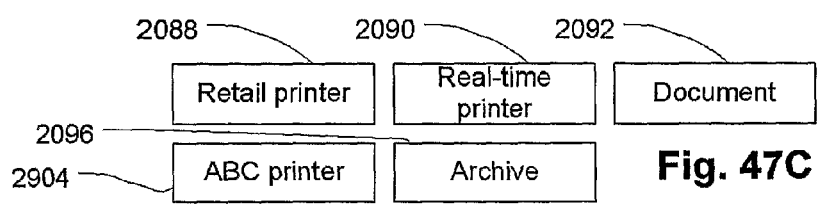
FIG. 47C illustrates a set of controls for invoking end use commands in the system of FIG. 47B.

Deliverables may be provided by various alternative packaging functions 2072. The type of deliverable may be generated specifically for the particular end user and may be generated and transmitted to a designated recipient via a single command by the user to a third party 2070 or the user 2070. For example, as shown in FIG. 47C, a dialog may present recipients such as a generic retail printing company 2096 or a particular branded one 2904. In such case, items from the portfolio may be generated for the particular kind of commodity to be created. For example if the user wants to obtain business cards from ABC company, the user selects control 2904 and the system generates the types of files, including format, resolution, etc. that are most suitable for printing business cards. Thus, a bundle including page layout and graphic files may be sent in a format that is popular with printers. The user need not be aware of what types of files are required. He simply designates the product and the recipient. In this way, products can be sent to third parties conveniently. A similar operation may be performed for real-time printing 2090 (discussed in the kiosk example with reference to FIG. 49B, below). Documents 2092 (page layout or pdf-type document) and archive file 2096, the latter containing data from which all possible formats may be generated and/or which may be placed back in the user's portfolio and edited at any time in the future. An example of a document is a pdf of a trademark application for the particular logo designed in the system, which could be delivered bundled with instructions. Of course, all of these are examples, only, and not intended to be a comprehensive list of deliverables.

Figure 48A:
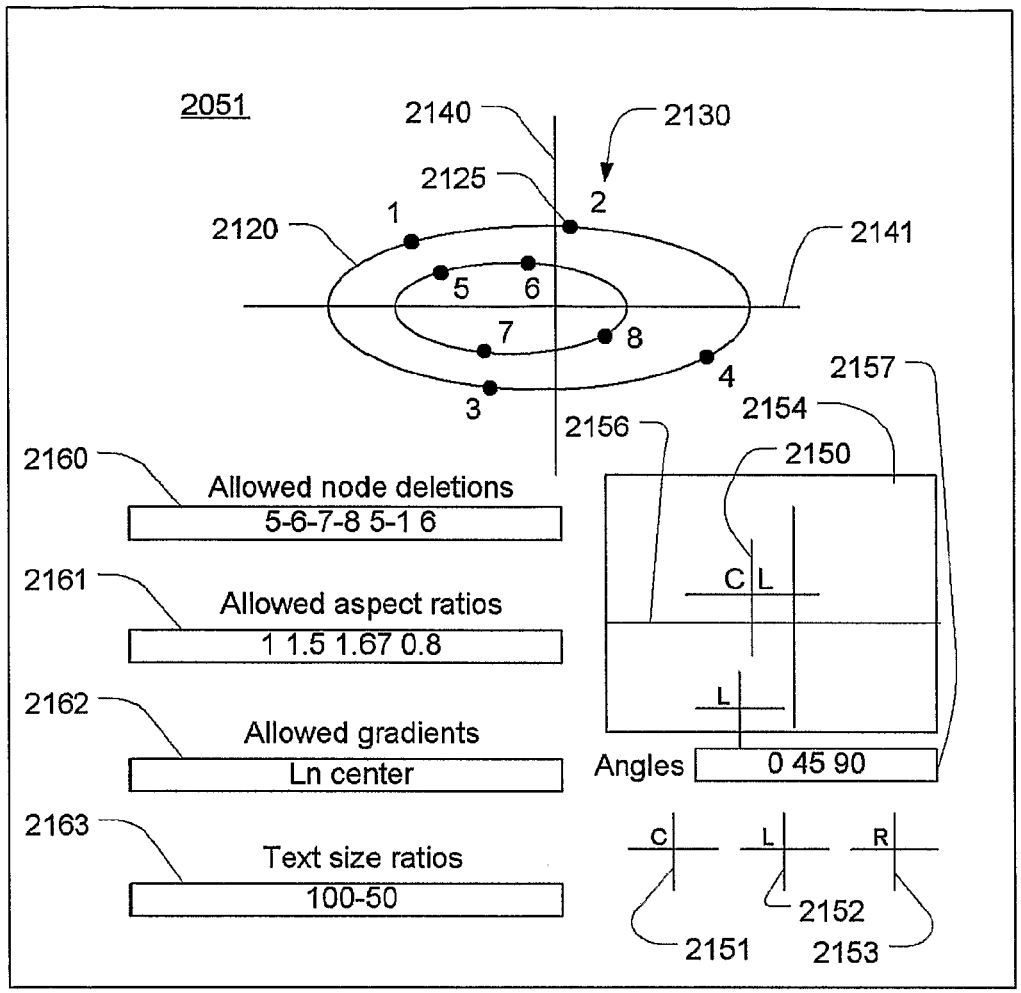
FIG. 48A illustrates a user interface for designer to be used adding editing constraints or rules to a graphical object.
Figure 48B:
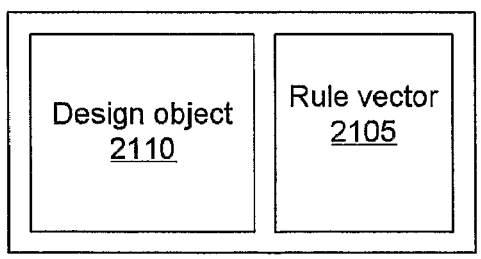
FIG. 48B illustrates a graphical object with an associated rule vector, the latter being editable with the user interface of FIG. 48A.

Referring now to FIGS. 48A and 48B, as discussed above with reference to FIG. 15, there is a need to allow inexperienced users to modify designs while helping them avoid making bad designs due to a lack of suitable training. In other words, users commonly fail to apply basic rules of design ending up with a lack of consistency such as a letterhead that looks different from a web site, palettes that differ from one product to the next, or awkward-looking or inconsistent compositional relationships among design elements. To allow designers the ability to impose constraints on how objects are edited, a rule vector 2105 may be associated with each design object 2110. For example, the design object 2110 may be a vector graphic element 2130 such as shown with annotations in a designer's user interface display 2051 for creating the rule vector.

In FIG. 48A, a vector graphic element 2130 is shown with control points 1 through 8 labeled with identifying numerals. Also crosshairs 2140 and 2141 indicate a center of mass of the object which has an open center (shaped roughly as a donut). A series of text box controls 2160 through 2163 is shown which allow a designer to specify various allowed changes in the element 2130. The text control 2160 indicates the control points ("nodes") that the designer will permit to be deleted. The first series of numbers "5-6-7-8" is connected has dashed connecting its member numerals indicating it is a set and are to be deleted or retained as a unit. Thus, if all nodes 5 through 8 are deleted, the inner circle of the donut-shaped element 2130 disappears and the element 2130 becomes solid. The pair of nodes 5 and 1 can also be deleted as can the single node 6. The text control 2161 shows allowed aspect ratios that can be permitted if the user attempts to reshape the object using "side" control handles that are a common convention in graphics editors. The text control 2162 indicates permitted gradients, which are identified by writing the name in the text box. Here two are shown, representing log and center-burst gradients. The allowed ratios of the size of associated text to the size of the design element 2130 are entered into text control 2163. Other design constraints are also possible and may be defined dependently or as selectable combinations using suitable controls. Note, the use of the text controls 2160 through 2163 and the other conventions discussed are just ones of many possible and are used to illustrate the concepts discussed.

Also shown is a tool for defining rules constraining how text may be placed around the graphical element 2130. Three icons 2151, 2152, and 2153 indicate controls that may be dragged onto a subdisplay 2154 that represents the crosshairs 2140/2141 as indicated at 2156. The controls contain mini-crosshairs that locate where text may stem and whether it stems from the left ("L" i.e., left-justified), the right ("R" i.e., right-justified), or the center ("C" i.e., centered) of the location indicated by the mini-crosshairs. So for example, the mini-crosshairs 2150 indicate a location of left-justified or centered text located above and the left of the center of mass of the graphic element 2130. A text control 2157 allows a designer to enter allowed angles of the text relative to the graphic element 2130. A similar control could be used to indicate allowed angles of the graphic element 2130. Using this interface, the rule vector 2105 may be populated with rules that, once in an editor, force the design modifications to be constrained.

Figure 49A:
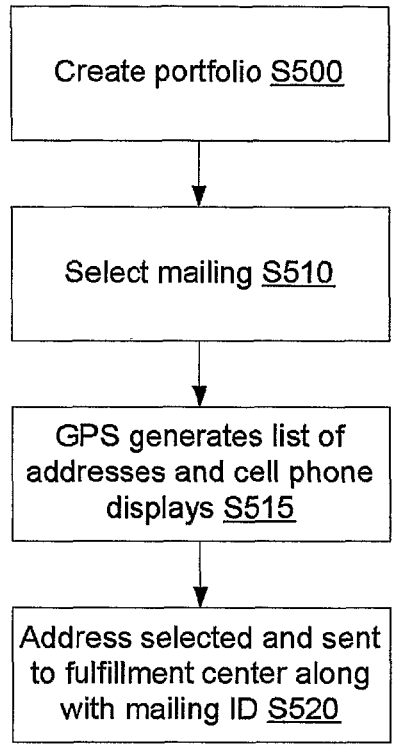
FIGS. 49A and 49B illustrate processes for using a product portfolio in the field.

An example of how a use of a predefined portfolio of publication-related products is illustrated in FIG. 49. A user creates a predefined portfolio that includes a solicitation letter S500. A cell phone with global positioning system (GPS) receiver and a special application accesses, via the Internet, a server storing a roofer's portfolio. As the roofer drives through a neighborhood, the user sees a roof in need of repair. The user stops near the house with the troubled roof and activates the application to select S510, in a client-server process, a particular letter offering the user's services which has been drafted for precisely this situation. The GPS receiver accesses S515 a database of addresses, either internally or on a server and lists those closest to it. The user selects the address of interest and the address, along with the owner's published name, accessed from a county government site, are sent to a fulfillment center along with an identifier of the letter requested to be mailed S520. The letter is mailed with the resident's name.

Figure 49B:
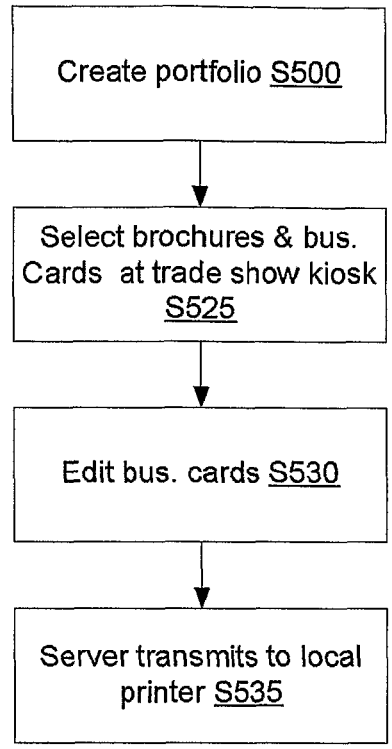

Referring now to FIG. 49B another example of a use of a predefined product portfolio that is maintained and edited on a server is illustrated by the use of a real-time printing service at a trade show, airport, or other public place. A user creates a portfolio S500. At a public kiosk terminal connected to the Internet and accessible to a real-time printer, a known technology described in, for example, U.S. Pat. No. 6,247,011; and US Published Application Nos. 2003/0160819 and 202/0161603 all of which are incorporated by reference as if incorporated in their entirety herein. Business cards and brochures are selected S525 at the kiosk via an http session at the kiosk hosted by the service maintaining the user's portfolio. The same host provides online editing as described above, which the user employs to edit or create S530 a product such as business cards. A command is then sent by the user to direct designated products directly to a real-time printer S535, which may be one provided near the kiosk terminal.

Figure 50:
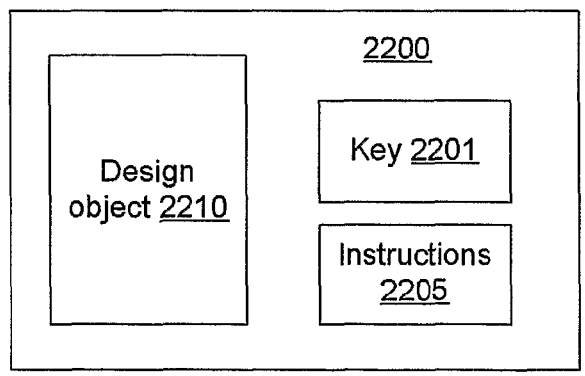
FIG. 50 illustrates a data object that is configured to be sold outside the framework of a system such as that of FIG. 47B.

Referring to FIG. 50, rather than having designers sell their graphical objects directly to a host of the system as discussed with reference to FIG. 47B, the designer's work can be sold as a data bundle 2200 that provides access to the editing, portfolio storage, and other features of the system described above. The data bundle includes instructions 2205, graphical data defining the design 2210, and a key 2201. The instructions explain how the user may access the design defined by the design data 2210 using the system, for example that of FIG. 47B. The key 2201 may be a code that is issued by the owner of the system to the designer to associate with his works. When the user buys the bundle from the designer, he may log into the system of FIG. 47B as an end user and upload the design along with the key. Associated with the key is set of rights that may permit the user to use the design in some way. Note that the key may also serve as a device for unlocking the design object 2210 so that the designer can permit only certain actions to be performed with the object, such as printing business cards, but not incorporation into web sites. The bundle 2200 allows the designer to sell the design and associated rights on a system such as an auction site and also allows the definition and control of certain uses of the design 2210.

Figure 51:
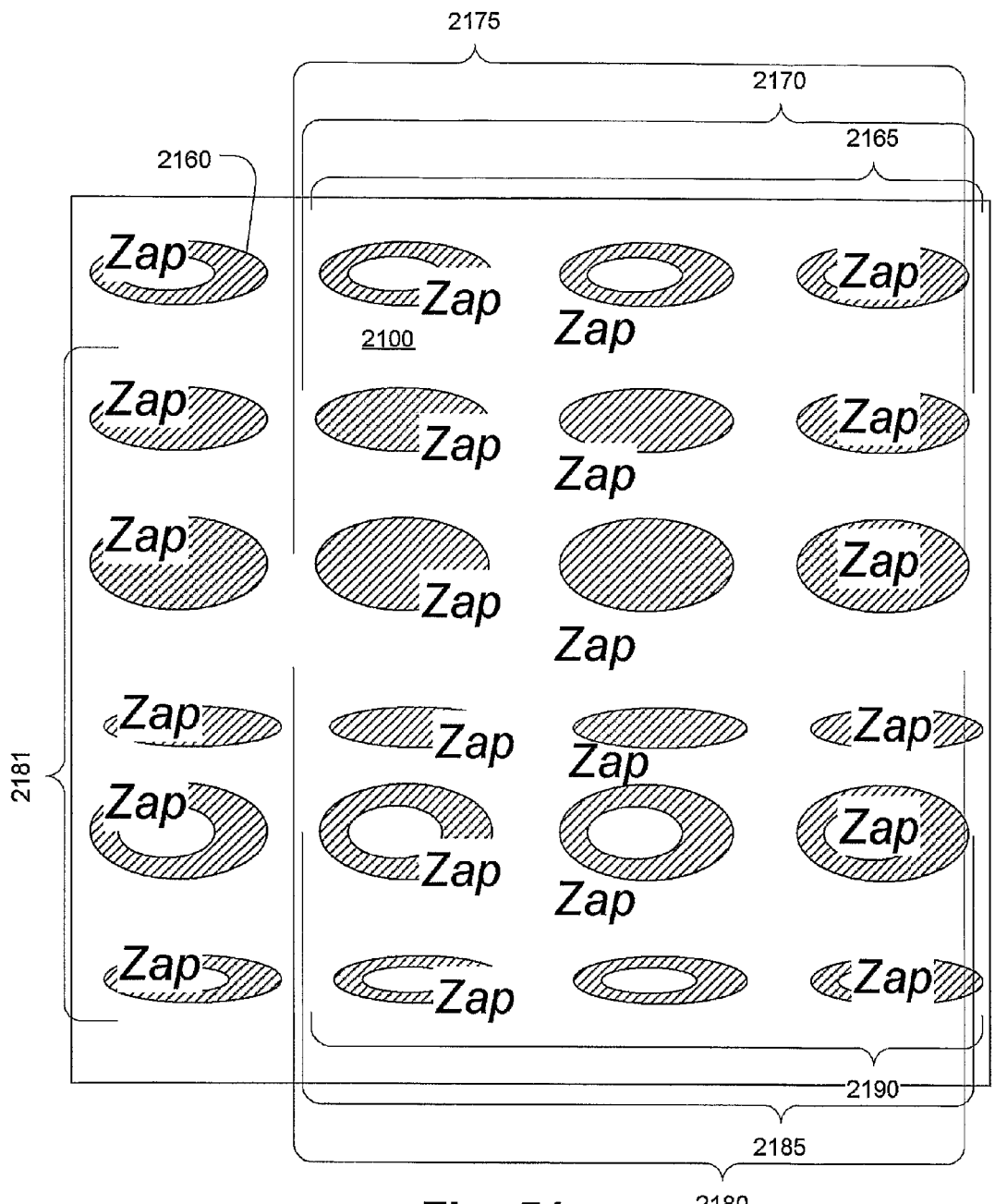
FIG. 51 illustrates a set of designs that have been expanded from a single design using rules that define constraints on how the designs may be edited.

Referring to FIG. 51, the rules discussed with reference to FIGS. 48A and 48B may be used to expand a design 2160 into a set of variations as indicated in the display at 2100. A first set 2181 shows variations in the aspect ratio and the with deletion of the inner nodes making the donut into a solid shape. The sets 2165-2190 going out to the right from the first set 2180 show variations in the text position. The display 2100 may be generated using a command from a browse mode so that a user can see variations of a selected design while browsing. For example, it could be invoked upon selection of a design in a view such as that of FIG. 9.

Figure 52:
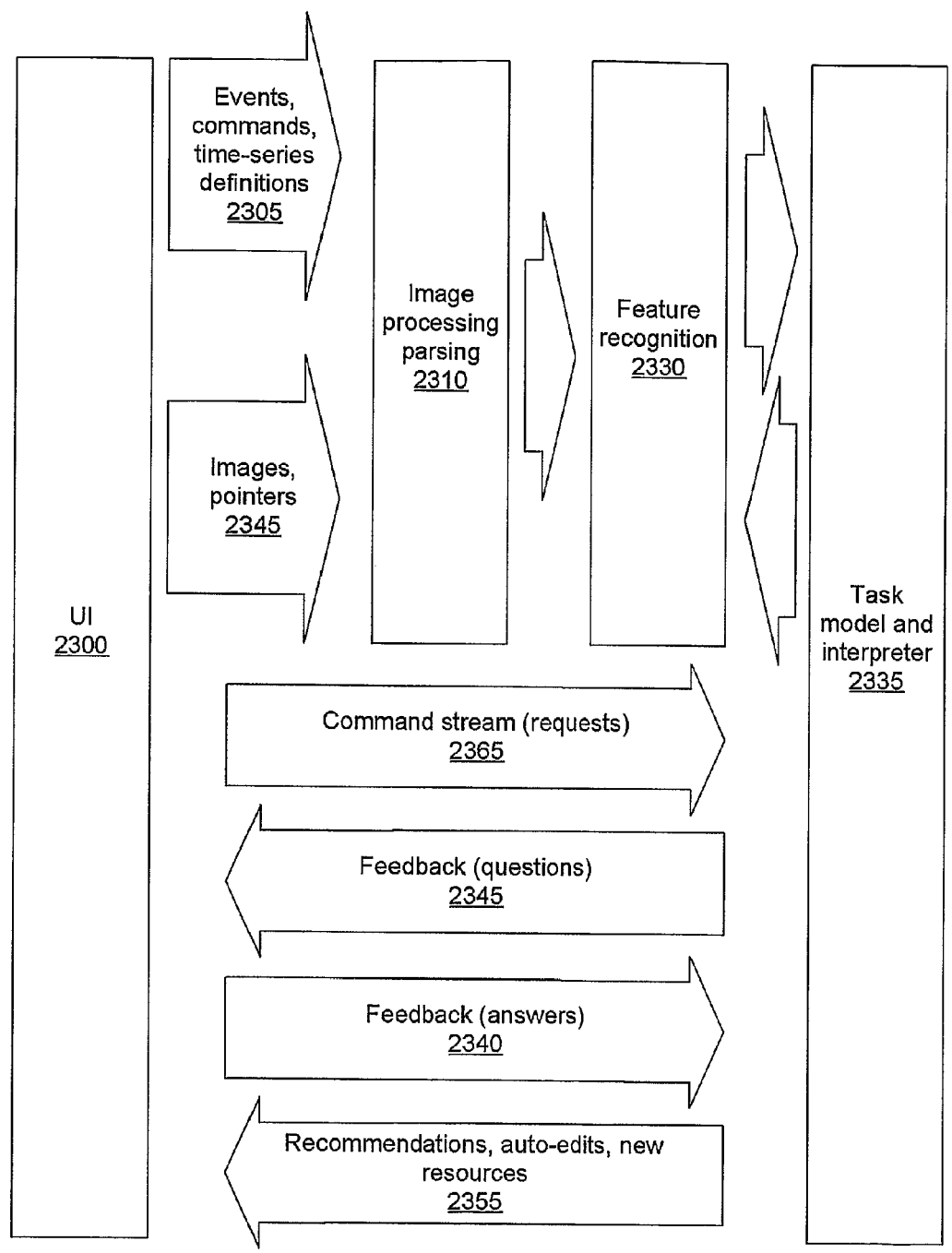
FIG. 52 illustrates an assistant system for the editor described with reference to FIGS. 1-25.

Referring to FIG. 52, a subprocess of the user interface 2300 used by end users may generate information about the user's activities, the shapes and colors, the user has applied to his work, the iterative steps of moving and reshaping shapes, and other events indicated generally by the arrow 2305. The generated information may be parsed or subjected to image processing as required by a suitable process 2310 and applied to feature recognition process 2330. In addition, the user may upload or point 2345 to subject matter such as graphic files or web pages that contain features the user wishes to use as a guide or to integrate into his work. A command stream 2365 indicates to a task model and interpreter, a software assistant such as a context sensitive help process, what the user want to have done. For example, the user may send a command to use an image in a designated (via a pointer indicated generally at 2345) web page. The image processing parsing engine may load the indicated web page, subject it to a clean-up process, such as removing text and minor graphical objects such as icons, and preprocess images to enhance the process of feature recognition. The feature recognition process 2300 then identifies certain features in the information being sent from the parsing/image processing engine 2310 and sends characterizations of these to the task model and interpreter 2335. In the example, the latter may identify a number of graphical objects in the web page and ask 2345 the user to identify the one of interest. This may be done, for example, by extracting the images and showing a thumbnail of each or, alternatively by using navigation data such as text indicating location on the screen. The user may thus provide feedback 2340 to refine the interpreter/task model 2335 interpretation of the command 2365. The task model/interpreter 2335 and the feature recognition engine 2300 and the image processing parsing engine 2310 may be used to further refine any raw material submitted 2345.

The result of the above may be the recommendation or creation of new material to be used by the user. For example, the user may like a particular graphic element, but only be interested in a particular shape. The shape might be a photograph of a building which is partly obscured by trees. The image processing 2310 may reduce the color spectrum of the image and enhance outlines allowing the feature recognition process 2300 to separate the trees and the building. The may include filling in broken portions of the building portion of the image and replacing the building with a vectorized element that is close to the original. The vector model may then be sent 2355 to the user interface 2300 allowing the user to work with it. Another example is where the user points to a web page that uses a color palette the user likes. The above processes may identify the colors and create or locate a stored palette that is close to it and send the recommended palette to the user.

Another way the above elements may be employed is to "watch" the user in the manner of a helper known in certain word processors. The actions taken, the shapes and colors created and used, the commands invoked, etc. are parsed and "watched" by the feature recognition engine 2330 which sends a stream to the task model interpreter 2335. The latter uses this stream to make recommendations to the user directly from the resource stream created by the user's activities. So, for example, if the user fills in various colors on a design, the system may recommend a palette that is close to what the user is using thereby giving the user a more professional design element (the palette) to work with. The same process could refine shapes or suggest substitutes. A simple example is to suggest some stored caricatures when the user is trying to draw a face. The system may be invoked passively like the paperclip or by way of a command by the user.

Such processes as the image recognition and feature recognition are described in a number of prior art publications, for example in U.S. Pat. Nos. 6,804,414, 5,220,619, US Patent Publication Nos. 2004/0199497, 2004/0062520, 2004/0001615, 2003/0164764, 2003/0154084, 2003/0123734, 2003/0117428, 2003/0063780, 2003/0058111, hereby incorporated by reference as if fully set forth in their entireties herein.

The invention claimed is:

1. A method of sending a mailing, executed on a portable programmable device that incorporates a transceiver and a Global Positioning System (GPS) comprising the steps of:
    positioning a portable programmable device at a specified location, wherein the portable programmable device incorporates a transceiver and a Global Positioning System (GPS);
    displaying on the portable programmable device commands and receiving on the device a selected command to request a mailing to be sent to an address designated by said GPS receiver;
    providing a server having a data store storing predefined documents;
    transmitting a position determined by said GPS receiver by said transceiver to a server and an command to send a mailing to the address said mailing being a specified one of said predefined documents;
    transmitting, over a network, a command by said server, along with data containing information relating to said mailing, to print and mail said mailing to a fulfillment service terminal.

2. A method as in claim 1, further comprising the step of transmitting multiple addresses to said transceiver from said server, receiving at said transceiver a selection of one of said multiple addresses, and transmitting a selected address to said server.

3. A method as in claim 2, further comprising determining a name of an occupant of said selected address and including said name in said data containing information relating to said mailing.

4. A server configured to implement the method of claim 1.

5. A method as in claim 1, wherein the portable programmable device includes a cell phone.

6. A method as in claim 1, wherein the documents include solicitations for home repair.

7. A method as in claim 1, wherein the address is a residential address.

8. A method as in claim 1, further comprising receiving by the portable programmable device data responsive to the address from a government server.

\* \* \* \* \*